(12) United States Patent
Fukushima et al.

(10) Patent No.: US 10,197,972 B2
(45) Date of Patent: Feb. 5, 2019

(54) DRIVE CIRCUIT FOR TWO-COIL STEP MOTOR

(71) Applicant: CITIZEN WATCH CO., LTD., Tokyo (JP)

(72) Inventors: Toshiaki Fukushima, Tokorozawa (JP); Toshinari Maeda, Tokorozawa (JP); Yu Takyoh, Nishitokyo (JP); Daisuke Iri, Nishitokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 15/538,658

(22) PCT Filed: Dec. 24, 2015

(86) PCT No.: PCT/JP2015/086142
§ 371 (c)(1),
(2) Date: Jun. 22, 2017

(87) PCT Pub. No.: WO2016/104660
PCT Pub. Date: Jun. 30, 2016

(65) Prior Publication Data
US 2017/0357216 A1 Dec. 14, 2017

(30) Foreign Application Priority Data
Dec. 26, 2014 (JP) .................................. 2014-264383

(51) Int. Cl.
*G04C 3/14* (2006.01)
*H02K 37/16* (2006.01)
(Continued)

(52) U.S. Cl.
CPC ............... *G04C 3/14* (2013.01); *H02K 37/16* (2013.01); *H02P 8/02* (2013.01); *H02P 8/30* (2013.01); *H02P 8/34* (2013.01); *H02P 6/182* (2013.01)

(58) Field of Classification Search
CPC .................................. G04C 3/14; H02K 37/16
See application file for complete search history.

(56) References Cited

U.S. PATENT DOCUMENTS 4,587,468 A * 5/1986 Hotta ........................ H02P 6/24
318/254.1
5,909,070 A * 6/1999 Taghezout ............. H02K 16/00
310/40 MM
(Continued)

FOREIGN PATENT DOCUMENTS

JP    H02-016679 B2    4/1990
JP    2006-101618 A    4/2006
(Continued)

OTHER PUBLICATIONS

English translation of the International Search Report for PCT/JP2015/086142.
(Continued)

*Primary Examiner* — Muhammad S Islam
(74) *Attorney, Agent, or Firm* — HEA Law PLLC

(57) ABSTRACT

Provided is a drive circuit for a two-coil stepper motor, including a rotor that is magnetized to an N-pole and an S-pole, first, second, and third stator magnetic-pole portions, a coil A, and a coil B. The drive circuit includes a drive pulse generation circuit configured to output a drive pulse (SP) for driving the coil A and the coil B, a detection pulse generation circuit configured to output a detection pulse (CP) to the coil A and the coil B in order to detect counter-electromotive currents generated in the coil A and the coil B along with a movement of the rotor after the rotor is driven based on the (Continued)

drive pulse, and a detection circuit configured to receive a detection signal (CS) generated based on the detection pulse as input, to thereby detect the movement of the rotor. At least one of the detection pulse to the coil A or the detection pulse to the coil B is output.

16 Claims, 39 Drawing Sheets

(51) Int. Cl.
    *H02P 8/34*     (2006.01)
    *H02P 8/02*     (2006.01)
    *H02P 8/30*     (2006.01)
    *H02P 6/182*     (2016.01)

(56) References Cited

U.S. PATENT DOCUMENTS

| | | | |
|---|---|---|---|
| 6,020,700 A * | 2/2000 | Tien | H02P 6/14 318/400.26 |
| 6,140,782 A * | 10/2000 | Chin | H02P 6/08 318/400.26 |
| 6,349,075 B1 * | 2/2002 | Miyauchi | G04B 25/04 368/230 |
| 2004/0104696 A1 * | 6/2004 | Oe | H02P 6/34 318/400.14 |
| 2007/0115760 A1 | 5/2007 | Kitazawa et al. | |

FOREIGN PATENT DOCUMENTS

| | | |
|---|---|---|
| JP | 4751573 B2 | 8/2011 |
| JP | 2012-002533 A | 1/2012 |
| JP | 2014-195371 A | 10/2014 |

OTHER PUBLICATIONS

Search Report dated Jul. 10, 2018, for corresponding EP Patent Application No. 15873228.9.

\* cited by examiner (a)

| | REFERENCE SYMBOL | TRANSISTOR TYPE | SW STATE 1 (N-POLE 0°) | SW STATE 2 (N-POLE 180°) |
|---|---|---|---|---|
| COIL A SIDE | N 1 | N c h | O F F | O F F |
| | N 2 | N c h | O F F | O F F |
| | P 1 | P c h | O F F | O N |
| | P 2 | P c h | O N | O F F |
| | T P 1 | P c h | O N | O F F |
| | T P 2 | P c h | O F F | O N |
| COIL B SIDE | N 3 | N c h | O F F | O F F |
| | N 4 | N c h | O F F | O F F |
| | P 3 | P c h | O F F | O N |
| | P 4 | P c h | O N | O F F |
| | T P 3 | P c h | O N | O F F |
| | T P 4 | P c h | O F F | O N |

| | REFERENCE SYMBOL | TRANSISTOR TYPE | SW STATE 1 (N-POLE 0°) | SW STATE 2 (N-POLE 180°) |
|---|---|---|---|---|
| COIL A SIDE | N1 | Nch | OFF | OFF |
| | N2 | Nch | OFF | OFF |
| | P1 | Pch | OFF | OFF |
| | P2 | Pch | OFF | OFF |
| | TP1 | Pch | ON | ON |
| | TP2 | Pch | ON | ON |
| COIL B SIDE | N3 | Nch | OFF | OFF |
| | N4 | Nch | OFF | OFF |
| | P3 | Pch | OFF | OFF |
| | P4 | Pch | OFF | OFF |

FIG.31

| | REFERENCE SYMBOL | TRANSISTOR TYPE | SW STATE 1 (N-POLE 0°) | SW STATE 2 (N-POLE 180°) |
|---|---|---|---|---|
| COIL A SIDE | N1 | Nch | OFF | OFF |
| | N2 | Nch | OFF | OFF |
| | P1 | Pch | OFF | OFF |
| | P2 | Pch | OFF | OFF |
| | TP1 | Pch | ON | ON |
| COIL B SIDE | N3 | Nch | OFF | OFF |
| | N4 | Nch | OFF | OFF |
| | P3 | Pch | OFF | OFF |
| | P4 | Pch | OFF | OFF |
| | TP4 | Pch | ON | ON |
| | SW1 | N/A | ON | ON |

FIG.36

| | REFERENCE SYMBOL | TRANSISTOR TYPE | SW STATE 1 (N-POLE 0°) | SW STATE 2 (N-POLE 180°) |
|---|---|---|---|---|
| COIL A SIDE | N1 | Nch | OFF | OFF |
| | N2 | Nch | OFF | OFF |
| | P1 | Pch | OFF | OFF |
| | P2 | Pch | OFF | OFF |
| | TP1 | Pch | ON | ON |
| | TP2 | Pch | ON | ON |
| COIL B SIDE | N3 | Nch | OFF | OFF |
| | N4 | Nch | OFF | OFF |
| | P3 | Pch | OFF | OFF |
| | P4 | Pch | OFF | OFF |
| | SW2 | N/A | ON | ON |
| | SW3 | N/A | ON | ON | ial
DRIVE CIRCUIT FOR TWO-COIL STEP MOTOR

CROSS REFRENCE TO THE RELATED APPLICATIONS

This application is a National Stage of International Application No. PCT/JP2015/086142 filed on Dec. 24, 2015, which claims priority from Japanese Patent Application 2014-264383, filed on Dec. 26, 2014. The contents of the above document are incorporated herein by reference in their entirety.

TECHNICAL FIELD

The present invention relates to a drive circuit for a stepper motor including two drive coils, and more particularly, to a drive circuit for a two-coil stepper motor, which includes means for preventing the stepper motor from getting out of order due to a mechanical impact applied from the outside.

BACKGROUND ART

Hitherto, in general, an electronic clock including analog indication means has hands that are driven by a stepper motor (also referred to as "stepping motor" and "pulse motor"). This stepper motor includes a stator to be magnetized by a coil, and a rotor that is a disc-shaped rotary member magnetized into two poles. For example, the stepper motor is driven for each second to indicate the time with the hands.

Further, the electronic clock obtaining multiple functions in recent years is capable of presenting indication depending on various situations by revolving the hands not only clockwise but also counterclockwise with use of a forward/reverse stepper motor capable of obtaining forward rotation and reverse rotation. Further, a wristwatch is required to be reduced in size and thickness and also in power consumption. There has been commercialized an electronic clock including load compensation means for detecting a rotational state of the rotor to supply an optimum drive pulse based on load fluctuations and the like of the stepper motor in order to improve the drive efficiency of the stepper motor.

There has been proposed such a technology of driving a reversible stepper motor for achieving multiple functions, reduction in size and thickness, and reduction in power consumption of the electronic clock, and also capable of rotating the forward/reverse stepper motor at high speed (for example, see Patent Literature 1).

The reversible stepper motor of Patent Literature 1 includes a rotor that is magnetized to an S-pole and an N-pole in a radial direction of the rotor, a first stator magnetic-pole portion and a second stator magnetic-pole portion that are formed to be substantially opposed to each other through intermediation of the rotor, a third stator magnetic-pole portion formed between the first and second stator magnetic-pole portions, a coil A to be magnetically coupled to the first stator magnetic-pole portion and the third stator magnetic-pole portion, and a coil B to be magnetically coupled to the second stator magnetic-pole portion and the third stator magnetic-pole portion.

Then, while one of the coil A and the coil B is driven, the other of the coil A and the coil B is operated as a detection coil for detecting a counter-electromotive current that is generated in accordance with a rotational angle of the rotor. That is, the reversible (forward/reverse) stepper motor includes two drive coils with respect to one rotor.

Such a two-coil forward/reverse stepper motor can be driven for forward rotation and reverse rotation with a drive waveform of the same timing, as compared to the related-art one-coil forward/reverse stepper motor. Therefore, there are advantages in that the drive speed in forward rotation is equal to that in reverse rotation, and thus high-speed drive is enabled.

Further, as another technology of the electronic clock using the stepper motor, there has been proposed an electronic clock including impact compensation means capable of preventing irregular motions of hands due to a mechanical impact applied from the outside (for example, see Patent Literature 2).

In this case, a wristwatch of an analog indication type using hands is required to be reduced in size as a matter of course in order to wear the wristwatch on the arm. As a result, a problem of visibility arises due to the small hands (second hand, minute hand, hour hand, and the like). In order to improve the visibility of the wristwatch of the analog indication type, it is conceivable to use thick hands to facilitate visualization, for example. However, the thick hands cause increase in weight, and there has been a problem in that, even when a small impact is received by the hands from the outside, the impact is transmitted to the stepper motor to move (rotate) the rotor of the stepper motor, resulting in deviation of the indicated time.

In order to solve this problem, the holding force of the stepper motor may be increased, but when the holding force is increased, the drive power of the stepper motor is increased. Thus, this method cannot be adopted from the viewpoints of downsizing of the electronic clock and battery life.

The electronic clock of Patent Literature 2 includes the impact compensation means for detecting such an impact applied from the outside based on a counter-electromotive current generated from the stepper motor to output a lock pulse for braking the stepper motor when the impact is detected, to thereby prevent irregular motions of the hands. With this, the stepper motor can be braked when the impact is detected. Therefore, for example, the hands can be upsized to improve the visibility of the indicated time. Further, the restrictions on the design of the hands can be relaxed, and thus various designs can be proposed.

CITATION LIST

Patent Literature

[Patent Literature 1] JP 2006-101618 A (page 9 and FIG. 1)
[Patent Literature 2] JP 4751573 B2 (page 5 and FIG. 1)

SUMMARY OF INVENTION

Technical Problem

Although the stepper motor presented in Patent Literature 1 is a two-coil forward/reverse stepper motor and capable of achieving high-speed drive in forward and reverse rotation, no countermeasure is implemented against deviation of the time indicated by the hands, which is caused by a rotation error of the rotor due to an impact applied from the outside, and there is a problem in resistance to impact.

Further, although the analog electronic clock presented in Patent Literature 2 includes the impact compensation means, the impact is detected by one coil in the one-coil stepper motor, and thus there is a problem in that the impact applied from the outside cannot be detected with high accuracy. That is, the clock receives various types of impact from the outside, and the impact applied to the hands and the stepper motor varies in magnitude and direction. Therefore, the magnitude and the direction of the movement (rotation) of the rotor change depending on the magnitude and the direction of the impact. For example, the rotor may be rotated in a clockwise direction due to the impact, or may be rotated in a counterclockwise direction instead.

Therefore, the impact is required to be detected accurately regardless of the rotational direction of the rotor, but the impact may not be detected through one-coil detection depending on the rotational direction because of the characteristics of the stepper motor. For example, when the rotor is rotated in a clockwise direction due to the impact, the impact can be detected at high sensitivity based on the direction of the counter-electromotive current, but when the rotor is rotated in an opposite direction, phenomena such as reduction in detection sensitivity may occur.

Further, as described in detail later, when the rotor is rotated by 180° or more from a stationary position due to a strong impact, a different lock pulse is required to be supplied in accordance with the stationary position and the rotational direction of the rotor, but when the impact is detected by one coil, the rotational direction of the rotor cannot be detected accurately, and thus an appropriate lock pulse cannot be supplied in accordance with the rotational direction.

As a result, by the technology in the second Patent Literature, the rotor that has been rotated due to a strong impact is operated so as to be further rotated forward instead of being rotated reversely to return to the normal stationary position. In this case, the indicated time may be further deviated, and there is a problem in that the deviation of the drive caused by the impact cannot be accurately corrected.

The present invention has an object to solve the above-mentioned problems, and to provide a drive circuit for a two-coil stepper motor capable of accurately detecting an impact applied from the outside with use of a two-coil stepper motor, to thereby prevent deviation of drive caused by the impact.

Solution to Problem

In order to solve the above-mentioned problems, a drive circuit for a two-coil stepper motor according to one embodiment of the present invention employs configurations described below.

The drive circuit for a two-coil stepper motor according to one embodiment of the present invention includes: a rotor that is magnetized into at least two poles in a radial direction of the rotor; a first stator magnetic-pole portion and a second stator magnetic-pole portion, which are formed to be substantially opposed to each other through intermediation of the rotor; a third stator magnetic-pole portion formed between the first stator magnetic-pole portion and the second stator magnetic-pole portion so as to face the rotor; a first coil to be magnetically coupled to the first stator magnetic-pole portion and the third stator magnetic-pole portion; a second coil to be magnetically coupled to the second stator magnetic-pole portion and the third stator magnetic-pole portion; a drive pulse generation circuit configured to output a drive pulse for driving the first coil and the second coil; a detection pulse generation circuit configured to output a detection pulse to at least one of the first coil or the second coil in order to detect a counter-electromotive current generated in at least one of the first coil or the second coil along with a movement of the rotor after the rotor is driven based on the drive pulse; and a detection circuit configured to receive a detection signal generated based on the detection pulse as input, to thereby detect the movement of the rotor.

According to the above-mentioned configuration, the detection pulse is output to at least one of the first coil or the second coil. In this manner, at least one of the first coil or the second coil can function as a detection coil for detecting the counter-electromotive current caused by an impact. As a result, the drive circuit for a two-coil stepper motor capable of detecting the impact regardless of a rotational direction of the rotor can be achieved.

Further, the detection pulse generation circuit is configured to output the detection pulse to any one of the first coil and the second coil.

According to the above-mentioned configuration, the drive circuit for a two-coil stepper motor capable of detecting the impact regardless of the rotational direction of the rotor can be achieved with a small-scale circuit configuration.

Further, the detection pulse generation circuit is configured to output the detection pulse to both of the first coil and the second coil.

According to the above-mentioned configuration, the drive circuit for a two-coil stepper motor capable of detecting the impact more accurately with use of the two coils can be achieved.

Further, the detection pulse generation circuit is configured to output the detection pulse to the first coil and output the detection pulse to the second coil independently and simultaneously.

According to the above-mentioned configuration, the counter-electromotive currents generated in the two coils can be detected simultaneously. As a result, regardless of whether the rotor is rotated in a clockwise direction or in a counterclockwise direction due to the impact, the counter-electromotive currents caused by the impact can be detected immediately at the same timing, and the rotor can be braked without delay.

Further, the detection pulse generation circuit is configured to output the detection pulse to both ends of the first coil and the second coil connected in series or in parallel. At this time, when the detection pulse generation circuit outputs the detection pulse, the first coil and the second coil may be connected in series in a direction for forming a closed loop in which a magnetic flux generated by a current flowing in series through the first coil and the second coil passes through the first stator magnetic-pole portion and the second stator magnetic-pole portion. Further, when the detection pulse generation circuit outputs the detection pulse, the first coil and the second coil may be connected in parallel in a direction for forming a closed loop in which a magnetic flux generated by a current flowing in parallel through the first coil and the second coil passes through the first stator magnetic-pole portion and the second stator magnetic-pole portion.

According to the above-mentioned configuration, the sensitivity of impact detection can be enhanced.

Further, the drive circuit for a two-coil stepper motor further includes a lock pulse generation circuit configured to output a lock pulse for braking the rotor, and, when the detection circuit detects output of the detection signal, the lock pulse generation circuit outputs the lock pulse.

According to this configuration, the lock pulse output from the lock pulse generation circuit causes the rotor of the stepper motor to be braked, and thus the rotor can be prevented from getting out of order due to the impact.

Further, the drive pulse includes a plurality of small drive pulses, and the lock pulse has the same specification as a specification of one of the plurality of small drive pulses that is output at an end in the drive pulse.

According to this configuration, the lock pulse can be supplied to the stepper motor in accordance with the stationary position of the rotor after the stepper motor is driven based on the drive pulse, and hence the rotor that has been erroneously rotated due to the impact can be reliably returned to the original stationary position.

Further, the lock pulse includes a first lock pulse and a second lock pulse, and, in any one of the first coil and the second coil, the first lock pulse and the second lock pulse are used to cause a current to flow through the one of the first coil and the second coil in different polarities.

According to this configuration, even when the rotor is rotated by 180° or more due to the impact, the lock pulse including the first lock pulse and the second lock pulse can be supplied to the stepper motor, to thereby brake the rotor at two stages based on the first lock pulse and the second lock pulse to reliably return the rotor that has been erroneously rotated due to the impact to the original stationary position.

Further, the second lock pulse has the same specification as a specification of one of the plurality of small drive pulses that is output at an end in the drive pulse.

According to this configuration, the second lock pulse is supplied to the stepper motor in accordance with the stationary position of the rotor after the drive based on the drive pulse to brake the rotor, and hence the rotor that has been rotated by 180° or more due to the impact can be reliably returned to the original stationary position.

Further, the detection circuit includes switching means for switching a detection direction of the counter-electromotive current generated in the first coil and the second coil in accordance with a stationary position of the rotor of the two-coil stepper motor.

According to this configuration, even when the directions of the counter-electromotive currents generated in the two coils change due to the stationary position of the rotor, the counter-electromotive currents can be reliably detected. Further, based on which of the two coils has detected the counter-electromotive current, the rotational direction of the rotor that has been rotated due to the impact can be recognized. As a result, the lock pulse corresponding to the stationary position and the rotational direction of the rotor can be supplied to the stepper motor, and the rotor that has been rotated due to the impact can be reliably returned to the original stationary position.

Advantageous Effects of Invention

As described above, according to the present invention, at least one of the first coil or the second coil can function as the detection coil for detecting the counter-electromotive current caused by the impact. As a result, the impact can be reliably detected regardless of the stationary position of the rotor or the rotational direction of the rotation caused by the impact, and the rotor can be braked based on the lock pulse. Therefore, a drive circuit for a two-coil stepper motor excellent in resistance against impact can be provided. Further, when the present invention is applied to an analog indication electronic clock, an electronic clock excellent in visibility in analog indication can be provided.

BRIEF DESCRIPTION OF DRAWINGS

FIG. 10 is an operation table for showing an ON/OFF operation in a SW state 1 and a SW state 2 of each transistor in the driver circuit and the detection circuit according to the first embodiment of the present invention.

FIG. 27 is an operation table for showing an ON/OFF operation in a SW state 1 and a SW state 2 of each transistor in the driver circuit and the detection circuit according to the third embodiment of the present invention.

FIG. 31 is an operation table for showing an ON/OFF operation in a SW state 1 and a SW state 2 of each transistor and an analog switch in the driver circuit and the detection circuit according to the fourth embodiment of the present invention.

FIG. 36 is an operation table for showing an ON/OFF operation in a SW state 1 and a SW state 2 of each transistor and each analog switch in the driver circuit and the detection circuit according to the fifth embodiment of the present invention.

DESCRIPTION OF EMBODIMENTS

Now, embodiments of the present invention are described in detail with reference to the accompanying drawings.

[Feature of Each Embodiment]

A feature of a first embodiment of the present invention resides in a basic configuration of the present invention, and corresponds to a configuration including a lock pulse generation circuit, which supports a case where a rotor of a stepper motor is rotated by 180° or less due to a relatively weak impact. A feature of a second embodiment of the present invention resides in a configuration including a lock pulse generation circuit, which supports a case where the rotor of the stepper motor is rotated by 180° or more due to a strong impact.

[First Embodiment]

Figure 1:
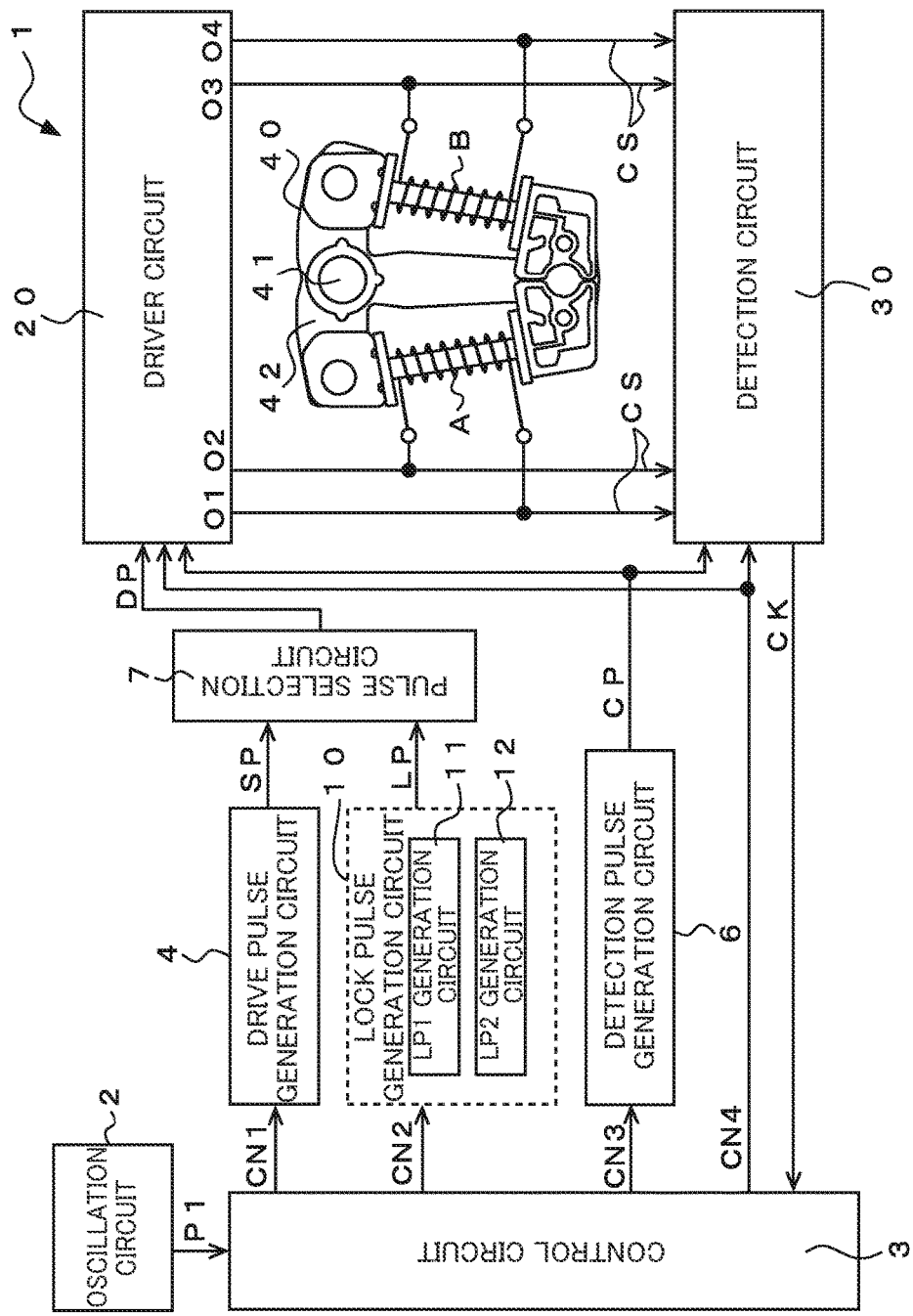
FIG. 1 is a configuration diagram for illustrating a schematic configuration of a drive circuit for a two-coil stepper motor according to a first embodiment of the present invention.

[Description of Configuration of Drive Circuit for Two-Coil Stepper Motor of First Embodiment: FIG. 1]

A schematic configuration of a drive circuit for a two-coil stepper motor according to the first embodiment is described with reference to FIG. 1. In FIG. 1, reference symbol 1 denotes the drive circuit for a two-coil stepper motor (hereinafter abbreviated as "drive circuit 1") according to the first embodiment.

The drive circuit 1 includes an oscillation circuit 2 configured to output a predetermined reference signal P1 with use of a quartz crystal unit (not shown), a control circuit 3 configured to receive the reference signal P1 as input to output control signals CN1 to CN4 for controlling respective circuits, a drive pulse generation circuit 4, a lock pulse generation circuit 10, a detection pulse generation circuit 6, a pulse selection circuit 7, a driver circuit 20, and a detection circuit 30.

Reference symbol 40 denotes a two-coil stepper motor (hereinafter abbreviated as "stepper motor 40"), which includes a coil A as a first coil and a coil B as a second coil. Details of the stepper motor 40 are described later.

The drive pulse generation circuit 4 is configured to receive the control signal CN1 as input, to thereby output a drive pulse SP for driving the stepper motor 40 to the pulse selection circuit 7.

The lock pulse generation circuit 10 includes an LP1 generation circuit 11 and an LP2 generation circuit 12, and is configured to receive the control signal CN2 as input, to thereby output a lock pulse LP to the pulse selection circuit 7. The operation of the lock pulse generation circuit 10 is described later, but depending on the stationary position of a rotor 41 of the stepper motor 40, the LP1 generation circuit 11 generates a lock pulse LP1, and the LP2 generation circuit 12 generates a lock pulse LP2. The lock pulses LP1 and LP2 are collectively referred to as "lock pulse LP".

The detection pulse generation circuit 6 is configured to receive the control signal CN3 as input, to thereby output a detection pulse CP at a predetermined cycle to the driver circuit 20 and the detection circuit 30. When this detection pulse CP is output to the coil A and the coil B of the stepper motor 40, the two coils A and B function as a detection coil for detecting an impact.

The pulse selection circuit 7 is configured to receive the drive pulse SP and the lock pulse LP as input, to thereby select one of the drive pulse SP and the lock pulse LP to output the selected pulse as a driver control pulse DP to the driver circuit 20.

The driver circuit 20 is configured to receive the driver control pulse DP, the detection pulse CP, and the control signal CN4 as input, to thereby supply drive waveforms O1, O2, O3, and O4 that are based on the respective pulse signals to the coil A and the coil B of the stepper motor 40 to drive the stepper motor 40.

The detection circuit 30 is configured to receive the control signal CN4 output from the control circuit 3, the detection pulse CP, and detection signals CS generated in the drive waveforms O1 to O4 as input to detect the movement (rotation) of the rotor based on the counter-electromotive currents from the stepper motor 40, to thereby output an impact signal CK to the control circuit 3. Detailed configurations of the driver circuit 20 and the detection circuit 30 are described later.

Figure 2:
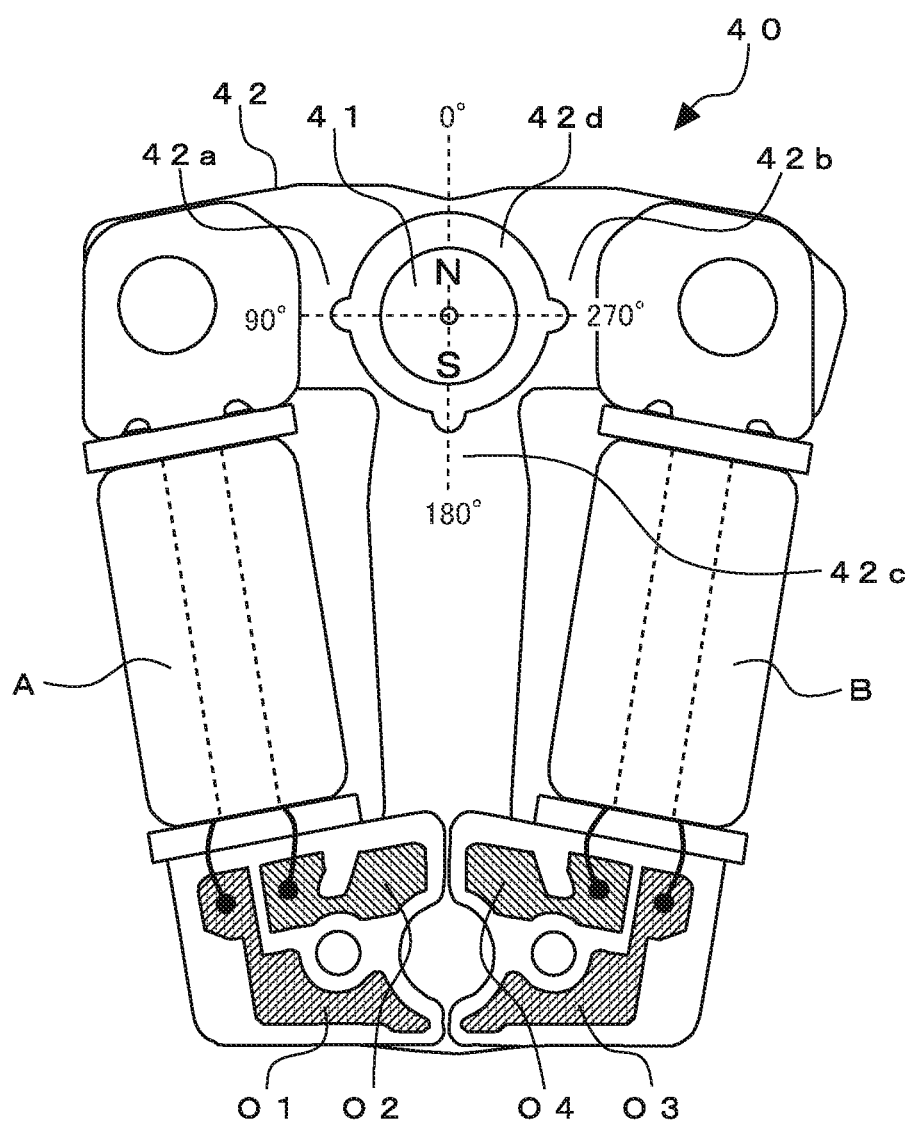
FIG. 2 is a plan view for illustrating a schematic configuration of a stepper motor according to the first embodiment of the present invention.

[Description of Schematic Configuration of Stepper Motor: FIG. 2]

Next, the schematic configuration of the stepper motor 40 is described with reference to FIG. 2. In FIG. 2, the stepper motor 40 includes the rotor 41, a stator 42, and the two coils A and B. The rotor 41 is a disc-shaped rotary member magnetized into two poles, and is magnetized to an S-pole and an N-pole in a radial direction of the rotor 41.

The stator 42 is made of a soft magnetic material, and has a rotor hole 42d for allowing the rotor 41 to be inserted therethrough. The rotor 41 is arranged in this rotor hole 42d. The stator 42 includes a first stator magnetic-pole portion 42a (hereinafter abbreviated as "first magnetic-pole portion 42a") and a second stator magnetic-pole portion 42b (hereinafter abbreviated as "second magnetic-pole portion 42b") that are formed to be substantially opposed to the rotor 41. Further, the stator 42 includes a third stator magnetic-pole portion 42c (hereinafter abbreviated as "third magnetic-pole portion 42c") formed at a position between the first magnetic-pole portion 42a and the second magnetic-pole portion 42b so as to face the rotor 41.

Further, the coil A to be magnetically coupled to the first magnetic-pole portion 42a and the third magnetic-pole portion 42c, and the coil B to be magnetically coupled to the second magnetic-pole portion 42b and the third magnetic-pole portion 42c are provided.

The coil A includes coil terminals O1 and O2 on an insulating substrate, and both ends of winding of the coil A are connected to the coil terminals O1 and O2. Further, the coil B includes coil terminals O3 and O4 on an insulating substrate, and both ends of winding of the coil B are connected to the coil terminals O3 and O4. The drive waveforms O1 to O4 output from the above-mentioned driver circuit 20 are supplied to the coil terminals O1 to O4, respectively. For easy understanding of the description, the same reference symbol is used for each coil terminal and each drive waveform.

Further, the rotor 41 illustrated in FIG. 2 is in a stationary state. The upper side of FIG. 2 is defined as 0°, and 90°, 180°, and 270° are defined therefrom in a counterclockwise direction. When the N-pole of the rotor 41 is positioned at 0° and at 180°, the rotor 41 is at a stationary position (statically stable point). Thus, the N-pole of the rotor 41 illustrated in FIG. 2 is at a stationary position of 0°. The definition of the rotational angle of the rotor 41 described here is applied to all of the rotors 41 described later.

Figure 3:
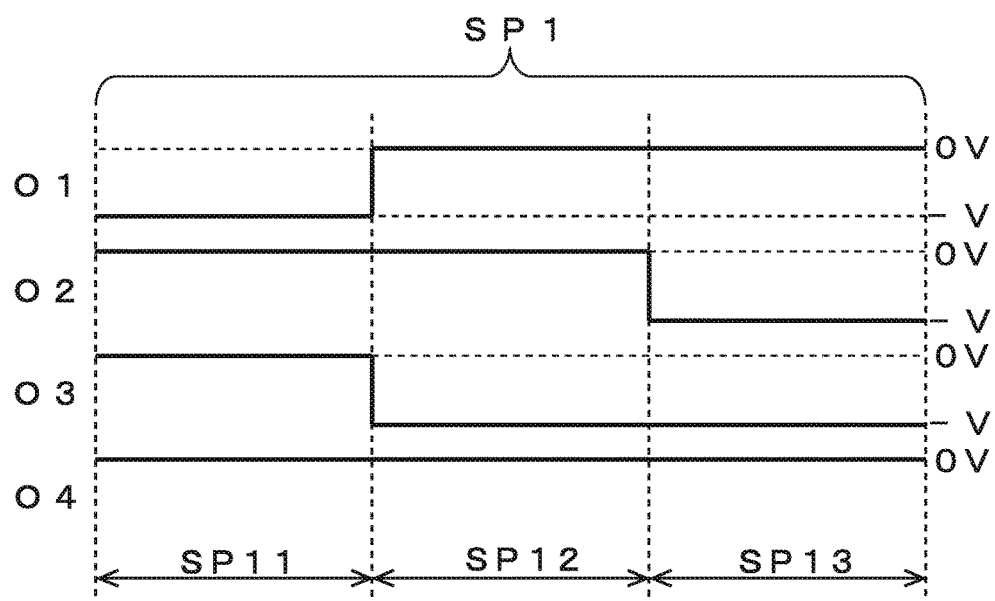
FIG. 3 are a drive waveform chart and explanatory diagrams of rotation of a rotor, for illustrating drive when an N-pole of a rotor of the stepper motor according to the first embodiment of the present invention is at a stationary position of 0°.
Figure 3:
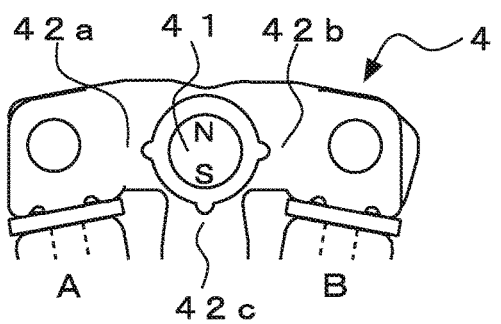
Figure 3:
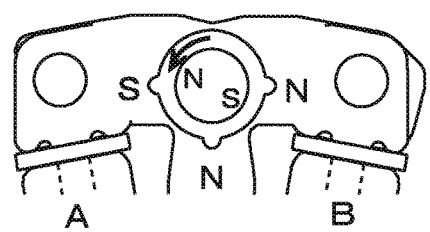
Figure 3:
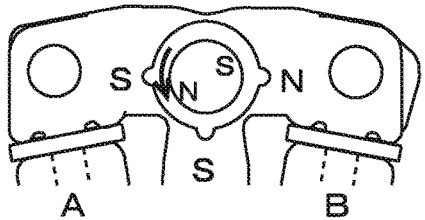
Figure 3:
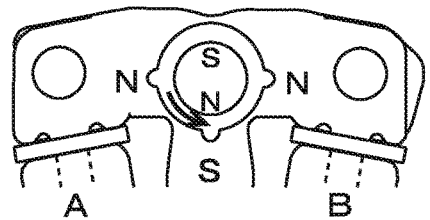
Figure 4:
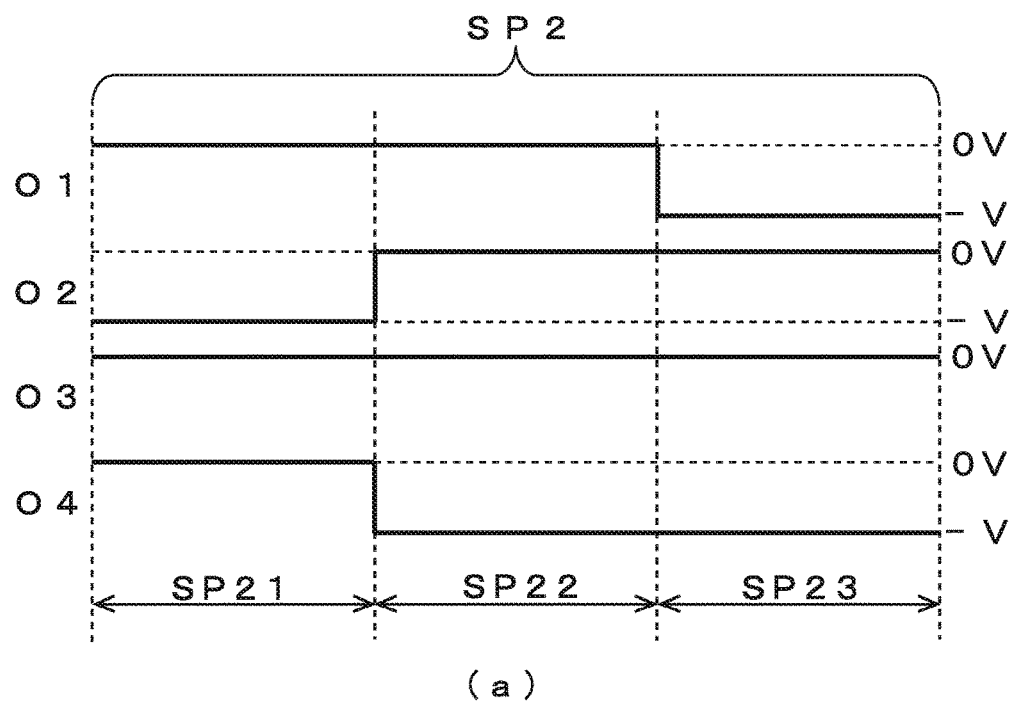
FIG. 4 are a drive waveform chart and explanatory diagrams of rotation of the rotor, for illustrating drive when the N-pole of the rotor of the stepper motor according to the first embodiment of the present invention is at a stationary position of 180°.
Figure 4:
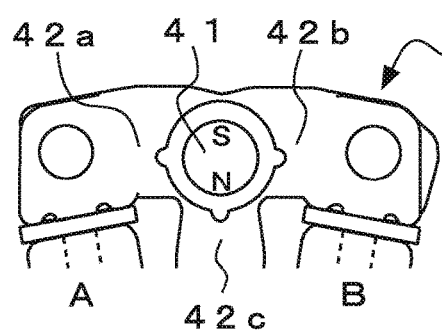
Figure 4:
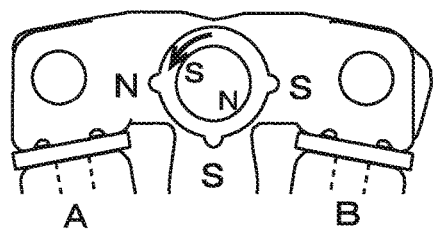
Figure 4:
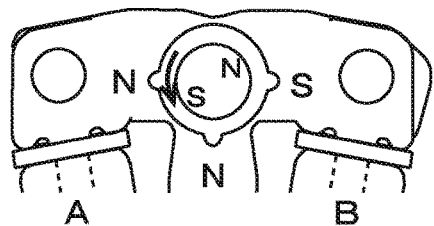
Figure 4:
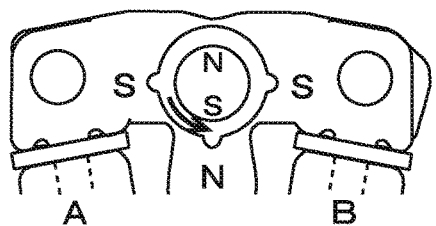

[Description of Basic Operation of Stepper Motor: FIG. 3 and FIGS. 4]

Next, although the drive operation of the two-coil stepper motor including two coils is known, an example of the drive waveform for driving the stepper motor 40 and the summary of the rotational operation of the rotor 41 are described with reference to FIGS. and FIG. 4 because such description is necessary for understanding the present invention.

FIG. 3(a) is a drive waveform of a drive pulse SP1 for rotating the N-pole of the rotor 41 of the stepper motor 40 from the stationary position of 0° in a forward direction (counterclockwise direction). FIG. 3(b) represents a state in which the N-pole of the rotor 41 is at the stationary position of 0°. FIG. 3(c) to FIG. 3(e) represent a rotational state of the rotor 41 based on the drive pulse SP1. In FIG. 3(b) to FIG. 3(e) and FIG. 4(b) to FIG. 4(e) to be described later, only a part of the stepper motor 40 in the vicinity of the rotor 41 is illustrated.

First, with reference to FIG. 3, description is given of the drive pulse SP1 and the rotational operation of the rotor 41 when the N-pole of the rotor 41 is rotated from the stationary position of 0° in the forward direction (counterclockwise direction). In FIG. 3(a), when the N-pole of the rotor 41 is at 0°, the drive pulse SP1 includes three small drive pulses SP11, SP12, and SP13 for rotating the rotor 41 by one step (180°) in the forward direction. The small drive pulses SP11, SP12, and SP13 have potentials of 0 V (VDD) and −V (for example, −1.5 V).

The small drive pulses SP11 to SP13 are sequentially supplied to the coil A and the coil B of the stepper motor 40. First, when the small drive pulse SP11 is supplied, the potentials at the coil terminal O1 and the coil terminal O2 of the coil A become −V and 0 V, respectively, and the potentials at the coil terminals O3 and O4 of the coil B both become 0 V. With this, a drive current flows from the coil terminal O2 to the coil terminal O1 of the coil A, but no drive current flows through the coil B.

As a result, as illustrated in FIG. 3(c), a magnetic flux is generated in the coil A, and the first magnetic-pole portion 42a and the third magnetic-pole portion 42c are magnetized to the S-pole and the N-pole, respectively. Further, no magnetic flux is generated in the coil B, and hence the second magnetic-pole portion 42b has the N-pole as in the third magnetic-pole portion 42c. In this manner, the N-pole of the rotor 41 and the S-pole of the first magnetic-pole portion 42a attract each other to rotate the rotor 41 by about 60° in the counterclockwise direction.

Next, when the small drive pulse SP12 is supplied to the stepper motor 40, the potentials at both of the coil terminals O1 and O2 of the coil A become 0 V, and the potentials at the coil terminal O3 and the coil terminal O4 of the coil B become −V and 0 V, respectively. With this, no drive current flows through the coil A, but a drive current flows from the coil terminal O4 to the coil terminal O3 of the coil B.

As a result, as illustrated in FIG. 3(d), a magnetic flux is generated in the coil B, and thus the second magnetic-pole portion 42b and the third magnetic-pole portion 42c are magnetized to the N-pole and the S-pole, respectively. Further, no magnetic flux is generated in the coil A, and hence the first magnetic-pole portion 42a has the S-pole as in the third magnetic-pole portion 42c. In this manner, the N-pole of the rotor 41 and the S-poles of the first magnetic-pole portion 42a and the third magnetic-pole portion 42c attract each other to further rotate the rotor 41 by about 60° in the counterclockwise direction.

Next, when the small drive pulse SP13 is supplied to the stepper motor 40, the potential at the coil terminal O1 of the coil A becomes 0 V, the potential at the coil terminal O2 of the coil A becomes −V, and the potential at the coil terminal O3 and the coil terminal O4 of the coil B become −V and 0 V, respectively. With this, a drive current flows from the coil terminal O1 to the coil terminal O2 of the coil A, and a drive current flows from the coil terminal O4 to the coil terminal O3 of the coil B.

As a result, as illustrated in FIG. 3(e), magnetic fluxes having the same direction are generated in both of the coils A and B, and thus the first magnetic-pole portion 41a and the second magnetic-pole portion 42b are magnetized to the N-pole, and the third magnetic-pole portion 42c is magnetized to the S-pole. In this manner, the N-pole of the rotor 41 and the S-pole of the third magnetic-pole portion 42c attract each other to further rotate the rotor 41 by about 60° in the counterclockwise direction. Thus, the rotor 41 is rotated from the stationary position of 0° (see FIG. 3(b)) by 180° (one step) so that the N-pole of the rotor 41 reaches the stationary position of 180°.

Next, with reference to FIG. 4, description is given of a drive pulse SP2 and the transition of the rotation of the rotor 41 when the N-pole of the rotor 41 is further rotated from the stationary position of 180° in the forward direction (counterclockwise direction). FIG. 4(a) is a drive waveform of the drive pulse SP2 for rotating the N-pole of the rotor 41 of the stepper motor 40 from the stationary position of 180° in the forward direction (counterclockwise direction). FIG. 4(b) represents a state in which the N-pole of the rotor 41 is at the stationary position of 180°. FIG. 4(c) to FIG. 4(e) represent a rotational state of the rotor 41 based on the drive waveform SP2.

In FIG. 4(a), when the N-pole of the rotor 41 is at 180°, the drive pulse SP2 includes three small drive pulses SP21, SP22, and SP23 for rotating the rotor 41 by one step (180°) in the forward direction. The small drive pulses SP21, SP22, and SP23 have potentials of 0 V (VDD) and −V (for example, −1.5 V).

The small drive pulses SP21 to SP23 are sequentially supplied to the coil A and the coil B of the stepper motor 40. First, when the small drive pulse SP21 is supplied, the potentials at the coil terminal O1 and the coil terminal O2 of the coil A become 0 V and −V, respectively, and the potentials at the coil terminals O3 and O4 of the coil B both become 0 V. With this, a drive current flows from the coil terminal O1 to the coil terminal O2 of the coil A, but no drive current flows through the coil B.

As a result, as illustrated in FIG. 4(c), a magnetic flux is generated in the coil A, and the first magnetic-pole portion 42a and the third magnetic-pole portion 42c are magnetized to the N-pole and the S-pole, respectively. Further, no magnetic flux is generated in the coil B, and hence the second magnetic-pole portion 42b has the S-pole as in the third magnetic-pole portion 42c. In this manner, the S-pole of the rotor 41 and the N-pole of the first magnetic-pole portion 42a attract each other to rotate the rotor 41 by about 60° in the counterclockwise direction.

Next, when the small drive pulse SP22 is supplied to the stepper motor 40, the potentials at both of the coil terminals O1 and O2 of the coil A become 0 V, and the potentials at the coil terminal O3 and the coil terminal O4 of the coil B become 0 V and −V, respectively. With this, no drive current flows through the coil A, but a drive current flows from the coil terminal O4 to the coil terminal O3 of the coil B.

As a result, as illustrated in FIG. 4(d), a magnetic flux is generated in the coil B, and thus the second magnetic-pole portion 42b and the third magnetic-pole portion 42c are magnetized to the S-pole and the N-pole, respectively. Further, no magnetic flux is generated in the coil A, and hence the first magnetic-pole portion 42a has the N-pole as in the third magnetic-pole portion 42c. In this manner, the S-pole of the rotor 41 and the N-poles of the first magnetic-pole portion 42a and the third magnetic-pole portion 42c attract each other to further rotate the rotor 41 by about 60° in the counterclockwise direction.

Next, when the small drive pulse SP23 is supplied to the stepper motor 40, the potentials at the coil terminal O1 and the coil terminal O2 of the coil A become −V and 0 V, respectively, and the potentials at the coil terminal O3 and the coil terminal O4 of the coil B become 0 V and −V, respectively. With this, a drive current flows from the coil terminal O2 to the coil terminal O1 of the coil A, and a drive current flows from the coil terminal O3 to the coil terminal O4 of the coil B.

As a result, as illustrated in FIG. 4(e), magnetic fluxes having the same direction are generated in both of the coils A and B, and thus the first magnetic-pole portion 41a and the second magnetic-pole portion 42b are magnetized to the S-pole, and the third magnetic-pole portion 42c is magnetized to the N-pole. In this manner, the S-pole of the rotor 41 and the N-pole of the third magnetic-pole portion 42c attract each other to further rotate the rotor 41 by about 60° in the counterclockwise direction. Thus, the rotor 41 is rotated from the stationary position of 180° (see FIG. 4(b)) by 180° (one step) so that the N-pole of the rotor 41 reaches the original stationary position of 0°.

The stepper motor 40 can be driven in a reverse direction (clockwise direction) by changing the direction of the drive current of each small drive pulse of the drive pulses SP1 and SP2, but the description thereof is omitted because this method is well-known. As described above, the two-coil stepper motor can be driven in forward rotation and reverse rotation based on the three small drive pulses, and the forward rotation drive and the reverse rotation drive are achieved by the drive waveform of the same timing. Therefore, the drive speed in forward rotation is equal to that in reverse rotation, and thus a high-speed forward/reverse stepper motor can be obtained.

Figure 5:
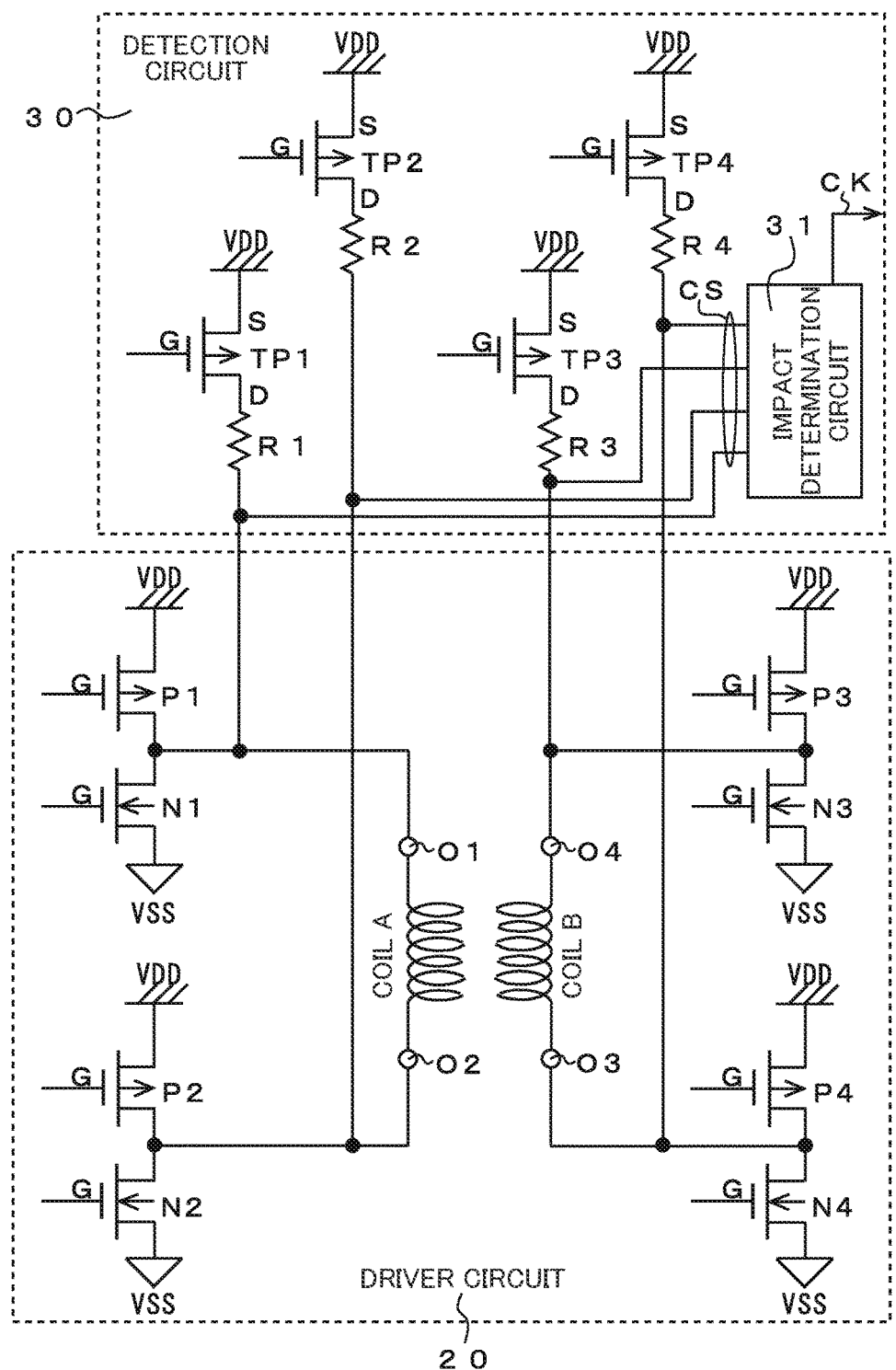
FIG. 5 is a circuit diagram for illustrating a driver circuit and a detection circuit according to the first embodiment of the present invention.

[Description of Circuit Configurations of Driver Circuit and Detection Circuit: FIG. 5]

Next, examples of the circuit configurations of the driver circuit 20 configured to drive the stepper motor 40 and the detection circuit 30 configured to detect the movement of the rotor 41 are described with reference to FIG. 5. In FIG. 5, the driver circuit 20 includes a total of four buffer circuits. That is, a buffer circuit including a transistor P1 being a P-channel MOS transistor having a low ON resistance and a transistor N1 being an N-channel MOS transistor having a low ON resistance, which are complementarily connected to each other, is configured to output the drive waveform O1 and is connected to the coil terminal O1 of the coil A.

Further, similarly, a buffer circuit including a transistor P2 and a transistor N2 both having a low ON resistance is configured to output the drive waveform O2 and is connected to the coil terminal O2 of the coil A.

Further, similarly, a buffer circuit including a transistor P3 and a transistor N3 both having a low ON resistance is configured to output the drive waveform O4 and is connected to the coil terminal O4 of the coil B.

Further, similarly, a buffer circuit including a transistor P4 and a transistor N4 both having a low ON resistance is configured to output the drive waveform O3 and is connected to the coil terminal O3 of the coil B.

Although not shown, a gate terminal G of each of the transistors P1 to P4 and N1 to N4 receives the driver control pulse DP output from the pulse selection circuit 7 as input, and the transistors are ON/OFF controlled based on the drive pulse SP, to thereby supply the drive waveforms O1 to O4 to the coil A and the coil B. For example, when the above-mentioned small drive pulse SP13 (see FIG. 3(a)) is used to cause the drive current to flow from the coil terminal O1 to the coil terminal O2 of the coil A, the transistor P1 and the transistor N2 may be turned on, and the transistor P2 and the transistor N1 may be turned off.

Next, the detection circuit 30 includes four pairs of P-channel MOS transistors TP1 to TP4 (hereinafter abbreviated as "transistors TP1 to TP4") and detection resistors R1 to R4, and an impact determination circuit 31 configured to receive a terminal voltage of each of the detection resistors R1 to R4 as input. In this case, a source terminal S of the transistor TP1 is connected to VDD, a drain terminal D of the transistor TP1 is connected to one terminal of the detection resistor R1, and the other terminal of the detection resistor R1 is connected to the coil terminal O1 of the coil A.

Further, a source terminal S of the transistor TP2 is connected to VDD, a drain terminal D of the transistor TP2 is connected to one terminal of the detection resistor R2, and the other terminal of the detection resistor R2 is connected to the coil terminal O2 of the coil A. Further, a source terminal S of the transistor TP3 is connected to VDD, a drain terminal D of the transistor TP3 is connected to one terminal of the detection resistor R3, and the other terminal of the detection resistor R3 is connected to the coil terminal O4 of the coil B.

Further, a source terminal S of the transistor TP4 is connected to VDD, a drain terminal D of the transistor TP4 is connected to one terminal of the detection resistor R4, and the other terminal of the detection resistor R4 is connected to the coil terminal O3 of the coil B.

Further, the impact determination circuit 31 is configured to input the voltages of the other terminals of the detection resistors R1 to R4, that is, the coil terminals O1 and O2 of the coil A and the coil terminals O3 and O4 of the coil B, to thereby determine whether or not the voltage (detection signal CS) caused by the counter-electromotive currents generated in the coils A and B has exceeded a threshold value Vth, to thereby output the result as the impact signal CK.

This impact determination circuit 31 may be, for example, a C-MOS inverter circuit in which about ½ of the power supply voltage is set as the threshold value Vth. Further, the threshold value Vth may be variable, and a circuit capable of adjusting the detection sensitivity with respect to the detection signal CS may be adopted. The threshold value Vth is a negative voltage with respect to a power supply VDD (0 V).

In each transistor of the driver circuit 20 and the detection circuit 30, although not shown, each gate terminal G is controlled based on the detection pulse CP and the control signal CN4 output from the control circuit 3, and each transistor functions as switching means for switching the detection direction of the counter-electromotive currents generated in the coil A and the coil B due to an impact. Detailed operation of the detection circuit 30 is described later.

[Description of Rotation of Rotor Caused by Impact and Counter-Electromotive Currents: FIG. 6 to FIGS. 9]

Next, with reference to FIG. 6 to FIG. 9, description is given of a generation state of the counter-electromotive currents when the rotor 41 of the stepper motor 40 is moved (rotated) due to an impact applied from the outside. First, with reference to FIG. 6, description is given of the counter-electromotive currents generated in the coils A and B in a case where the rotor 41 is rotated in the clockwise direction due to an impact applied from the outside when the N-pole of the rotor 41 of the stepper motor 40 is at the stationary position of 0°.

In FIG. 6(a), the N-pole of the rotor 41 of the stepper motor 40 is at the stationary position of 0°, and thus the stepper motor 40 is in a non-drive state. At this time, the magnetic flux output from the N-pole of the rotor 41 includes a magnetic flux passing through a magnetic circuit of the first magnetic-pole portion 42a, the coil A, and the third magnetic-pole portion 42c in the stated order, and a magnetic flux passing through a magnetic circuit of the second magnetic-pole portion 42b, the coil B, and the third magnetic-pole portion 42c in the stated order. When the amount of the magnetic flux output from the N-pole of the rotor 41 is represented by $\varphi$, the amount of the magnetic flux passing through the coil A is $\varphi/2$, and the amount of the magnetic flux passing through the coil B is also $\varphi/2$.

Regarding the polarity of the magnetic flux amount $\varphi$, the magnetic flux directed toward the coil terminal side (downward side in FIG. 6(a) and FIG. 6(b)) is defined as positive. This definition of the polarity of the magnetic flux amount $\varphi$ caused by the rotor 41 is applied to all of the stepper motors 40 to be described later.

Now, it is assumed that, as illustrated in FIG. 6(b), an impact is applied from the outside so as to rotate the rotor 41 in the clockwise direction, and the N-pole of the rotor 41 is moved to a position of −90° (270°). In this case, the magnetic flux $\varphi$ of the rotor 41 passes through the following magnetic circuit. The magnetic flux $\varphi$ of the rotor 41 passes from the second magnetic-pole portion 42b through the coil B, and enters the coil A to pass through the first magnetic-pole portion 42a.

Regarding the change in magnetic flux at this time, the magnetic flux of the coil A changes from $+\frac{1}{2}\varphi$ to $-\varphi$, and hence the change amount is $-3/2\varphi$, which is a large change in magnetic flux amount. Meanwhile, the magnetic flux of the coil B changes from $+\frac{1}{2}\varphi$ to $+\varphi$, and hence the change amount is $+\frac{1}{2}\varphi$, which is understood as a small change in magnetic flux amount. Then, counter-electromotive currents are generated in the coil A and the coil B due to electromagnetic induction based on the amount of change in magnetic flux.

FIG. 6(c) is a schematic waveform chart for illustrating an example of the counter-electromotive current to be induced in the coil A due to the change in amount of the magnetic flux passing through the coil A. The X axis represents time t, and the Y axis represents a counter-electromotive current −Ia caused by the coil A. Further, a time t0 is a time at which the impact is applied. In FIG. 6(c), the rotor 41 is rotated immediately after the time t0 at which the impact is applied, and thus the magnetic flux passing through the coil A changes from +½φ to −φ. Therefore, the change in magnetic flux amount is large, and a large counter-electromotive current −Ia flows from the coil terminal O2 to the coil terminal O1 of the coil A (which is represented as a negative-direction current).

Meanwhile, FIG. 6(d) is a waveform chart for illustrating an example of a counter-electromotive current Ib to be induced in the coil B through the change in amount of the magnetic flux passing through the coil B. In FIG. 6(d), the magnetic flux of the coil B changes from +½φ to +φ. Therefore, the change in magnetic flux amount is small, and a small counter-electromotive current +Ib flows from the coil terminal O4 to the coil terminal O3 of the coil B (which is represented as a positive-direction current).

As described above, when the N-pole of the rotor 41 is at the stationary position of 0°, and then an impact is applied from the outside so as to rotate the rotor 41 in the clockwise direction, a large counter-electromotive current −Ia flows from the coil terminal O2 to the coil terminal O1 of the coil A. Through detection of this current, application of an impact to the stepper motor 40 and the rotational direction of the rotation caused by the impact can be known.

Figure 6:
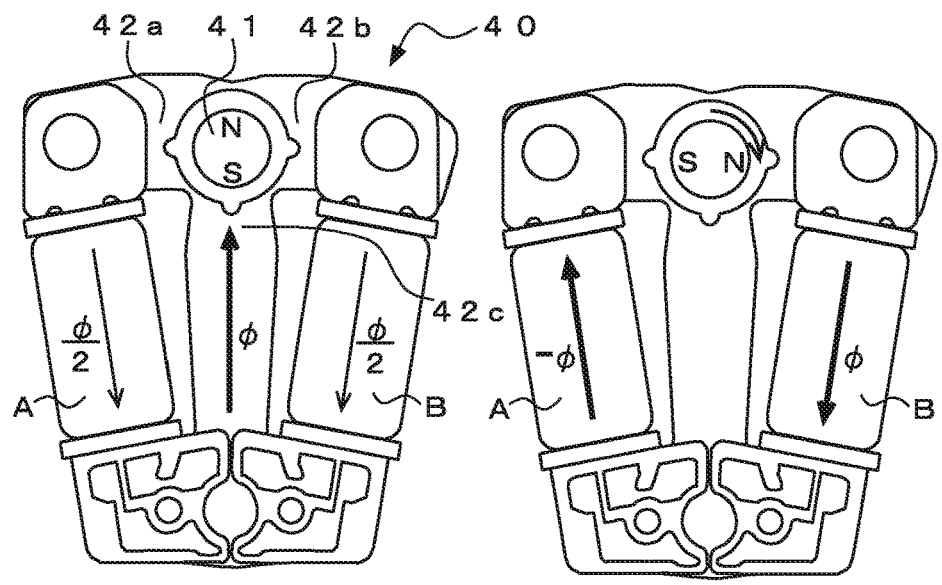
FIG. 6 are explanatory diagrams for illustrating counter-electromotive currents generated in coils when the N-pole of the rotor of the stepper motor according to the first embodiment of the present invention, which is positioned at 0°, is rotated in a clockwise direction due to an impact.
Figure 6:
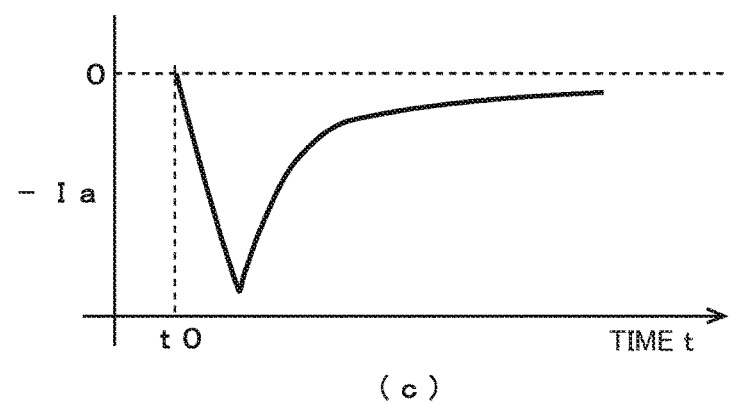
Figure 6:
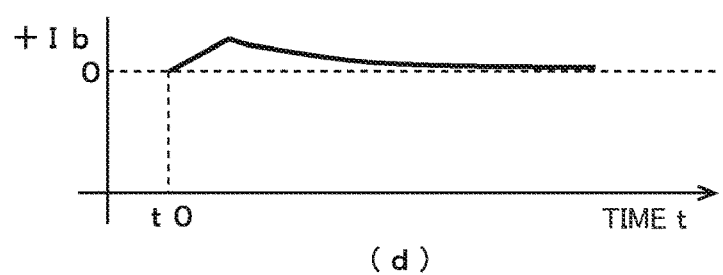
Figure 7:
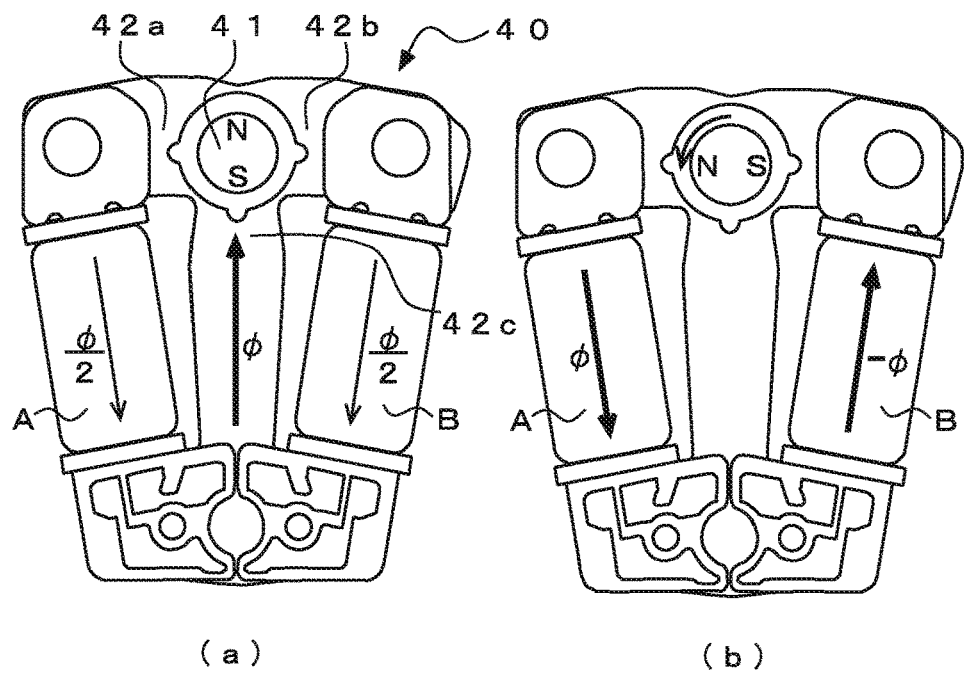
FIG. 7 are explanatory diagrams for illustrating counter-electromotive currents generated in the coils when the N-pole of the rotor of the stepper motor according to the first embodiment of the present invention, which is positioned at 0°, is rotated in a counterclockwise direction due to an impact.
Figure 7:
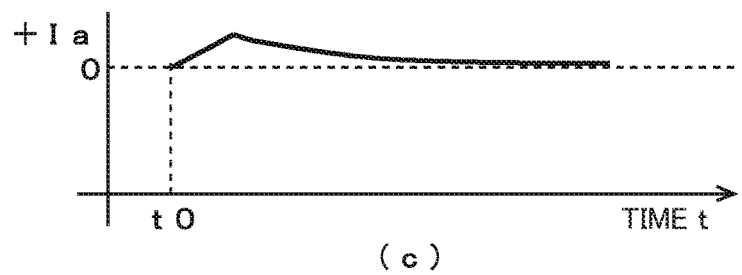
Figure 7:
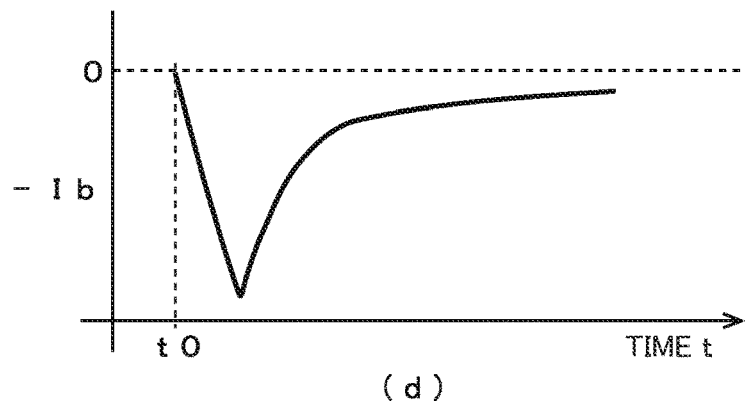

Next, with reference to FIG. 7, description is given of the counter-electromotive currents generated in the coils A and B in a case where the rotor 41 is rotated in the counter-clockwise direction due to the impact applied from the outside when the N-pole of the rotor 41 of the stepper motor 40 is at the stationary position of 0°. FIG. 7(a) represents the magnetic flux amount when the N-pole of the rotor 41 is at the stationary position of 0°, and description thereof is omitted because FIG. 7(a) is similar to FIG. 6(a) referred to above.

Next, it is assumed that, as illustrated in FIG. 7(b), an impact is applied from the outside so as to rotate the rotor 41 in the counterclockwise direction, and the N-pole of the rotor 41 is moved to a position of +90°. In this case, the magnetic flux φ of the rotor 41 passes through the following magnetic circuit. The magnetic flux φ of the rotor 41 passes from the first magnetic-pole portion 42a through the coil A, and enters the coil B to pass through the second magnetic-pole portion 42b.

Regarding the change in magnetic flux at this time, the magnetic flux of the coil A changes from +½φ to +φ, and hence the change amount is +½φ, which is a small change in magnetic flux amount. Meanwhile, the magnetic flux of the coil B changes from +½φ to −φ, and hence the change amount is −3/2φ, which is a large change in magnetic flux amount. Then, counter-electromotive currents based on the amount of change in magnetic flux are generated in the coil A and the coil Bn.

FIG. 7(c) is a schematic waveform chart for illustrating an example of the counter-electromotive current to be induced in the coil A due to the change in amount of the magnetic flux passing through the coil A. Similarly to FIG. 6, the X axis represents time t, and the Y axis represents a counter-electromotive current +Ia. Further, a time t0 is a time at which the impact is applied. In FIG. 7(c), the magnetic flux passing through the coil A changes from +½φ to +φ. Therefore, the change in magnetic flux amount is small, and a small counter-electromotive current +Ia flows from the coil terminal O1 to the coil terminal O2 of the coil A. Meanwhile, FIG. 7(d) is a waveform chart for illustrating an example of a counter-electromotive current to be induced in the coil B through the change in amount of the magnetic flux passing through the coil B. In FIG. 7(d), the magnetic flux of the coil B changes from +½φ to −φ. Therefore, the change in magnetic flux amount is large, and a large counter-electromotive current −Ib flows from the coil terminal O3 to the coil terminal O4 of the coil B.

As described above, when the N-pole of the rotor 41 is at the stationary position of 0°, and then an impact is applied from the outside so as to rotate the rotor 41 in the counter-clockwise direction, a large counter-electromotive current −Ib flows from the coil terminal O3 to the coil terminal O4 of the coil B. Through detection of this current, application of an impact to the stepper motor 40 and the rotational direction of the rotation caused by the impact can be known.

Figure 8:
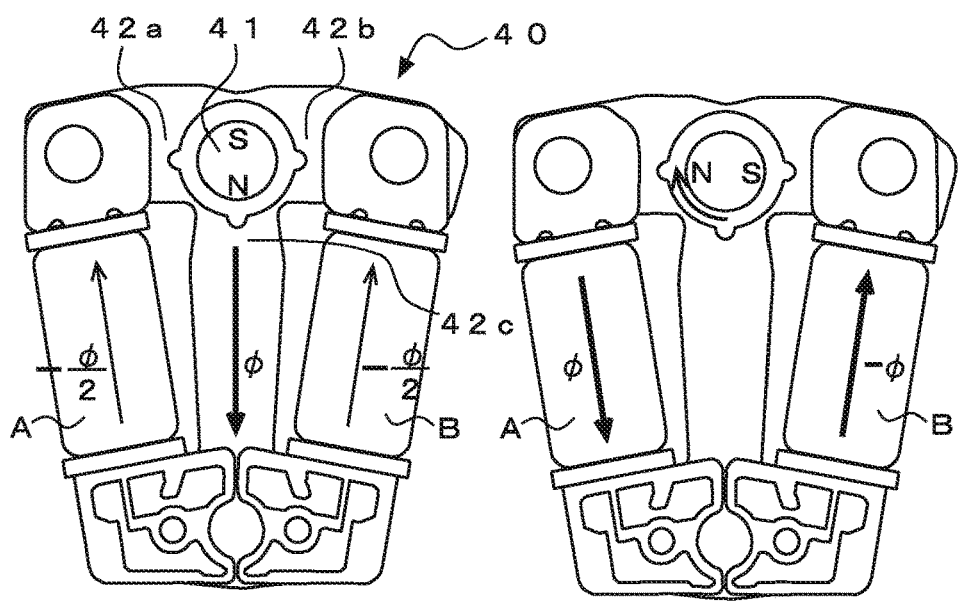
FIG. 8 are explanatory diagrams for illustrating counter-electromotive currents generated in the coils when the N-pole of the rotor of the stepper motor according to the first embodiment of the present invention, which is positioned at 180°, is rotated in the clockwise direction due to an impact.
Figure 8:
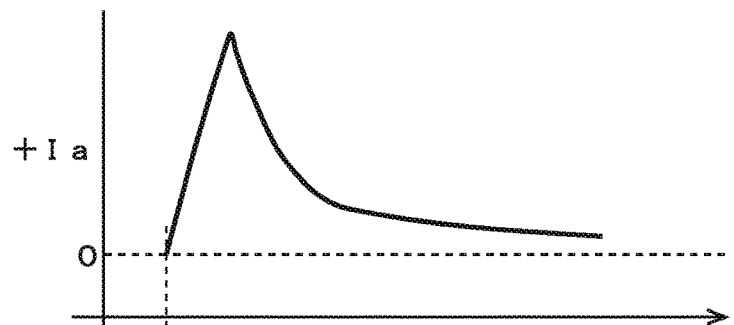
Figure 8:
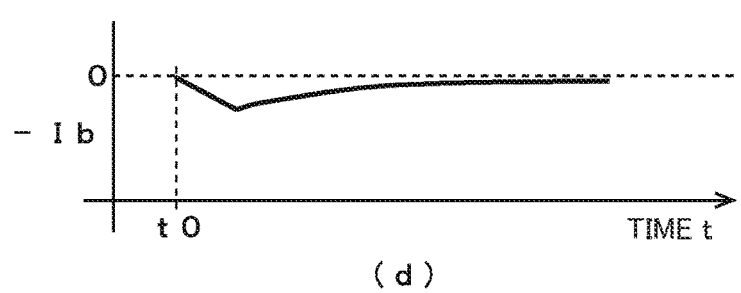

Next, with reference to FIG. 8, description is given of the counter-electromotive currents generated in the coils A and B in a case where the rotor 41 is rotated in the clockwise direction due to the impact applied from the outside when the N-pole of the rotor 41 of the stepper motor 40 is at the stationary position of 180°.

In FIG. 8(a), the N-pole of the rotor 41 of the stepper motor 40 is at the stationary position of 180°, and thus the stepper motor 40 is in a non-drive state. At this time, the magnetic flux output from the N-pole of the rotor 41 includes a magnetic flux passing through a magnetic circuit of the third magnetic-pole portion 42c, the coil A, and the first magnetic-pole portion 42a in the stated order, and a magnetic flux passing through a magnetic circuit of the third magnetic-pole portion 42c, the coil B, and the second magnetic-pole portion 42b in the stated order. When the amount of the magnetic flux output from the N-pole of the rotor 41 is represented by φ, the amount of the magnetic flux passing through the coil A is −φ/2, and the amount of the magnetic flux passing through the coil B is also −φ/2.

Next, it is assumed that, as illustrated in FIG. 8(b), an impact is applied from the outside so as to rotate the rotor 41 in the clockwise direction, and the N-pole of the rotor 41 is moved to a position of −90°. In this case, the magnetic flux φ of the rotor 41 passes through the following magnetic circuit. The magnetic flux φ of the rotor 41 passes from the first magnetic-pole portion 42a through the coil A, and enters the coil B to pass through the second magnetic-pole portion 42b.

Regarding the change in magnetic flux at this time, the magnetic flux of the coil A changes from −½φ to +φ, and hence the change amount is +3/2φ, which is a large change in magnetic flux amount. Meanwhile, the magnetic flux of the coil B changes from −½φ to −φ, and hence the change amount is −½φ, which is a small change in magnetic flux amount. Then, counter-electromotive currents based on the amount of change in magnetic flux are generated in the coil A and the coil B.

FIG. 8(c) is a schematic waveform chart for illustrating an example of the counter-electromotive current to be induced in the coil A due to the change in amount of the magnetic flux passing through the coil A. Similarly to FIG. 6, the X axis represents time t, and the Y axis represents the counter-electromotive current +Ia. Further, a time t0 is a time at which the impact is applied. In FIG. 8(c), the magnetic flux passing through the coil A changes from −½φ to +φ. Therefore, the change in magnetic flux amount is large, and a large counter-electromotive current +Ia flows from the coil terminal O1 to the coil terminal O2 of the coil A. Meanwhile, FIG. 8(d) is a waveform chart for illustrating an example of a counter-electromotive current Ib to be induced in the coil B through the change in amount of the magnetic flux passing through the coil B. In FIG. 8(d), the magnetic flux of the coil B changes from −½φ to −φ. Therefore, the change in magnetic flux amount is small, and a small counter-electromotive current −Ib flows from the coil terminal O3 to the coil terminal O4 of the coil B.

As described above, when the N-pole of the rotor 41 is at the stationary position of 180°, and then an impact is applied from the outside so as to rotate the rotor 41 in the clockwise direction, a large counter-electromotive current +Ia flows from the coil terminal O1 to the coil terminal O2 of the coil A. Through detection of this current, application of an impact to the stepper motor 40 and the rotational direction of the rotation caused by the impact can be known.

Figure 9:
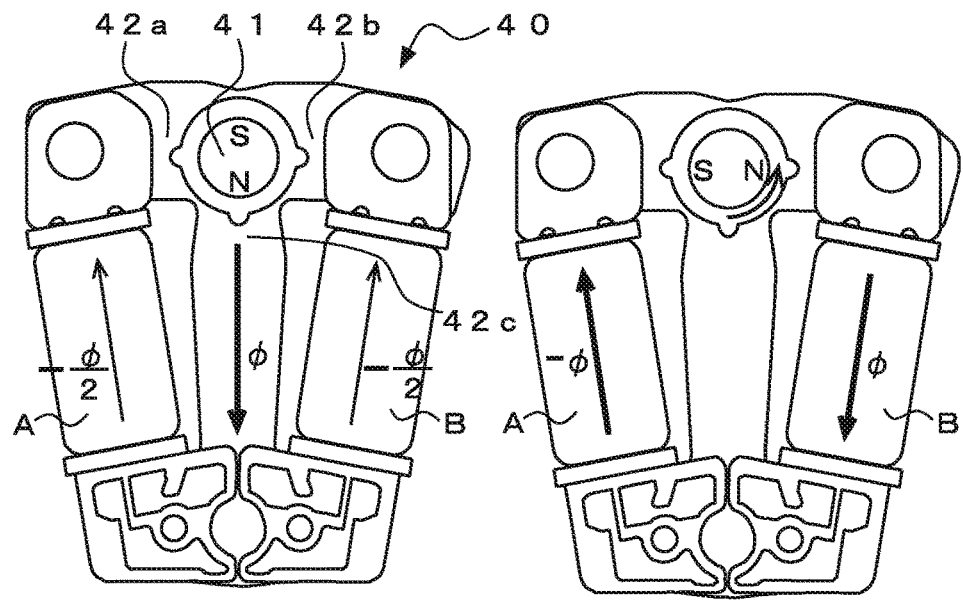
FIG. 9 are explanatory diagrams for illustrating counter-electromotive currents generated in the coils when the N-pole of the rotor of the stepper motor according to the first embodiment of the present invention, which is positioned at 180°, is rotated in the counterclockwise direction due to an impact.
Figure 9:
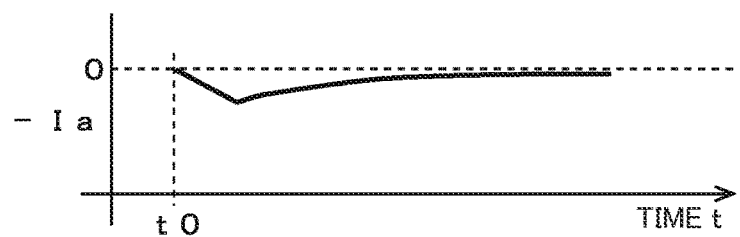
Figure 9:
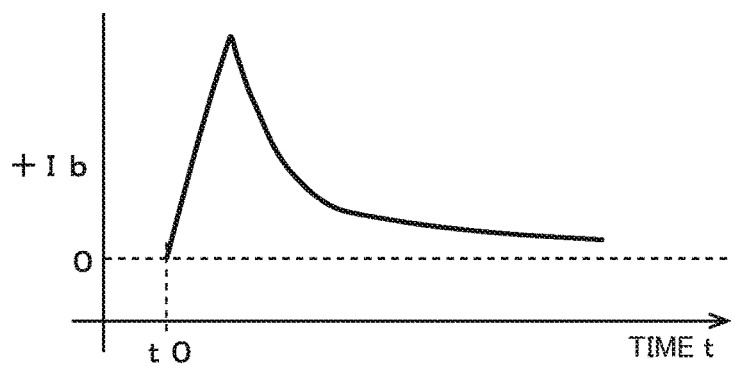

Next, with reference to FIG. 9, description is given of the counter-electromotive currents generated in the coils A and B in a case where the rotor 41 is rotated in the counter-clockwise direction due to the impact applied from the outside when the N-pole of the rotor 41 of the stepper motor 40 is at the stationary position of 180°. FIG. 9(a) represents the magnetic flux amount when the N-pole of the rotor 41 is at the stationary position of 180°, and description thereof is omitted because FIG. 9(a) is similar to FIG. 8(a) referred to above.

Now, it is assumed that, as illustrated in FIG. 9(b), an impact is applied from the outside so as to rotate the rotor 41 in the counterclockwise direction, and the N-pole of the rotor 41 is moved to a position of −90° (270°). In this case, the magnetic flux φ of the rotor 41 passes through the following magnetic circuit. The magnetic flux φ of the rotor 41 passes from the second magnetic-pole portion 42b through the coil B, and enters the coil A to pass through the first magnetic-pole portion 42a.

Regarding the change in magnetic flux at this time, the magnetic flux of the coil A changes from −½φ to −φ, and hence the change amount is −½φ, which is a small change in magnetic flux amount. Meanwhile, the magnetic flux of the coil B changes from −½φ to +φ, and hence the change amount is +3/2φ, which is a large change in magnetic flux amount. Then, counter-electromotive currents based on the amount of change in magnetic flux are generated in the coil A and the coil B.

FIG. 9(c) is a schematic waveform chart for illustrating an example of the counter-electromotive current to be induced in the coil A due to the change in amount of the magnetic flux passing through the coil A. Similarly to FIG. 6, the X axis represents time t, and the Y axis represents the counter-electromotive current −Ia. Further, a time t0 is a time at which the impact is applied. In FIG. 9(c), the magnetic flux passing through the coil A changes from −½φ to −φ. Therefore, the change in magnetic flux amount is small, and a small counter-electromotive current −Ia flows from the coil terminal O2 to the coil terminal O1 of the coil A.

Meanwhile, FIG. 9(d) is a waveform chart for illustrating an example of a counter-electromotive current to be induced in the coil B through the change in amount of the magnetic flux passing through the coil B. In FIG. 9(d), the magnetic flux of the coil B changes from −½φ to +φ. Therefore, the change in magnetic flux amount is large, and a large counter-electromotive current +Ib flows from the coil terminal O4 to the coil terminal O3 of the coil B.

As described above, when the N-pole of the rotor 41 is at the stationary position of 180°, and then an impact is applied from the outside so as to rotate the rotor 41 in the counterclockwise direction, a large counter-electromotive current +Ia flows from the coil terminal O4 to the coil terminal O3 of the coil B. Through detection of this current, application of an impact to the stepper motor 40 and the rotational direction of the rotation caused by the impact can be known.

The counter-electromotive currents to be induced in the two coils A and B of the stepper motor 40 due to the impact as described above can be summarized as follows. When the N-pole of the rotor 41 is at the stationary position of 0°, and the rotor 41 is rotated in the clockwise direction due to the impact (see FIG. 6), a large counter-electromotive current −Ia flows through the coil A from the coil terminal O2 to the coil terminal O1. When the rotor 41 is rotated in the counterclockwise direction due to the impact (see FIG. 7), a large counter-electromotive current −Ib flows through the coil B from the coil terminal O3 to the coil terminal O4.

Further, when the N-pole of the rotor 41 is at the stationary position of 180°, and the rotor 41 is rotated in the clockwise direction due to the impact (see FIG. 8), a large counter-electromotive current +Ia flows through the coil A from the coil terminal O1 to the coil terminal O2. When the rotor 41 is rotated in the counterclockwise direction due to the impact (see FIG. 9), a large counter-electromotive current +Ib flows through the coil B from the coil terminal O4 to the coil terminal O3.

That is, when the stationary position of the rotor 41 is reversed, the directions of the counter-electromotive currents generated in the coil A and the coil B due to the impact are reversed. Therefore, when the counter-electromotive currents flowing through the coil A and the coil B in the positive direction or in the negative direction can be detected under a state in which the stationary position (0° or 180°) of the rotor 41 after the drive based on the drive pulse SP is recognized, the impact applied from the outside can be reliably detected regardless of whether the rotor 41 is rotated in the clockwise direction or in the counterclockwise direction due to the impact.

[Description of Operation of Detection Circuit Configured to Detect Counter-Electromotive Currents: FIG. 1, FIG. 5, FIG. 10, and FIG. 11]

Figure 11:
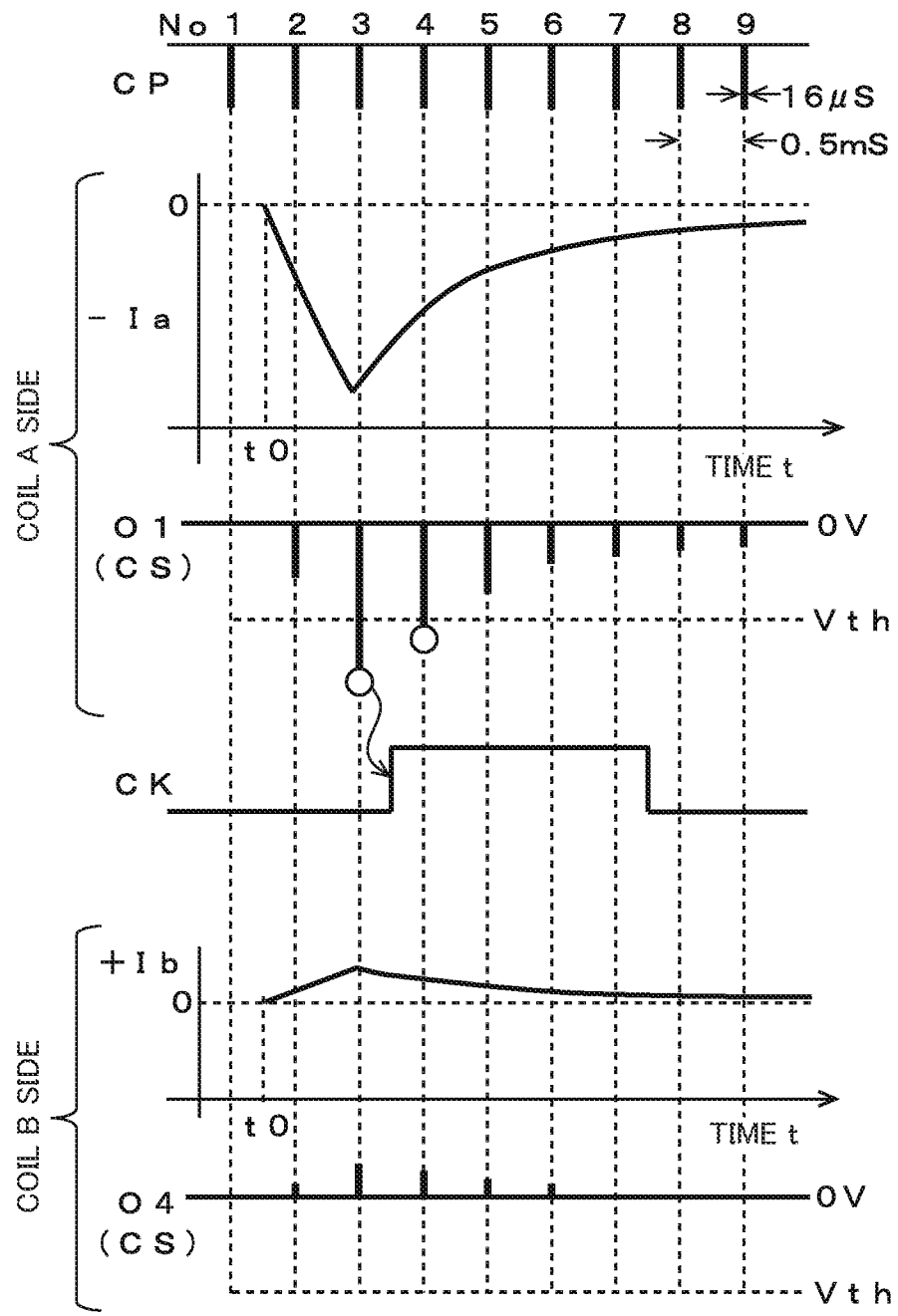
FIG. 11 is a timing chart for illustrating the operation of the detection circuit according to the first embodiment of the present invention.

Next, with reference to FIG. 10 and FIG. 11, description is given of how the detection circuit 30 detects the counter-electromotive currents generated from the stepper motor illustrated in FIG. 6 to FIG. 9. FIG. 10 is an operation table for showing an operation of each transistor in the driver circuit 20 and the detection circuit 30 illustrated in FIG. 5, and FIG. 11 is a timing chart for illustrating the operation of the detection circuit 30. FIG. 1 being a configuration diagram, FIG. 5 being a circuit diagram, and FIG. 6 to FIG. 9 are referred to as necessary.

In FIG. 10, a SW state 1 refers to an operation (ON/OFF) of each transistor based on the arrival of the detection pulse CP when the N-pole of the rotor 41 is at the stationary position of 0°. A SW state 2 refers to an operation (ON/OFF) of each transistor based on the arrival of the detection pulse CP when the N-pole of the rotor 41 is at the stationary position of 180°. That is, the driver circuit 20 and the detection circuit 30 have a function of switching each transistor between the SW state 1 and the SW state 2 in accordance with the stationary position (0° or 180°) of the rotor 41.

In this case, when the N-pole of the rotor 41 is at the stationary position of 0° after the drive based on the drive pulse SP, the driver circuit 20 and the detection circuit 30 are in the SW state 1. When the detection pulse CP arrives in this state, each transistor on the coil A side is controlled as follows. The transistor P2 of the driver circuit 20 is turned on, the transistors N1, N2, and P1 of the driver circuit 20 are turned off. Further, the transistor TP1 of the detection circuit 30 is turned on, and the transistor TP2 of the detection circuit 30 is turned off. Each transistor is controlled to be turned on or off based on the detection pulse CP and the control signal CN4 output from the control circuit 3.

Further, when the detection pulse CP arrives in the SW state 1, each transistor on the coil B side is controlled as follows. The transistor P4 of the driver circuit 20 is turned on, and the transistors N3, N4, and P3 of the driver circuit 20 are turned off. Further, the transistor TP3 of the detection circuit 30 is turned on, and the transistor TP4 of the detection circuit 30 is turned off.

With the ON/OFF operation of each transistor in the above-mentioned SW state 1, on the coil A side, the coil terminal O2 is connected to the power supply VDD by the transistor P2, and the coil terminal O1 is connected to the power supply VDD via the detection resistor R1 by the transistor TP1 (see FIG. 5). Further, in the SW state 1, on the coil B side, the coil terminal O3 is connected to the power supply VDD by the transistor P4, and the coil terminal O4 is connected to the power supply VDD via the detection resistor R3 by the transistor TP3 (see FIG. 5).

That is, in the first embodiment, the detection pulse CP output by the detection pulse generation circuit 6 is applied to the coil A as the detection pulse and to the coil B as the detection pulse independently and simultaneously. The term "independently" here means that the detection result based on the detection pulse output to the coil A and the detection result based on the detection pulse output to the coil B can be separately obtained.

When an impact is generated during a detection section in the SW state 1, and thus the rotor 41 is rotated in, for example, the clockwise direction, a large counter-electromotive current −Ia flows in the negative direction from the coil terminal O2 to the coil terminal O1 of the coil A, and a small counter-electromotive current +Ib flows in the positive direction from the coil terminal O4 to the coil terminal O3 of the coil B (see FIG. 6).

The detection signal CS is generated based on those counter-electromotive currents −Ia and +Ib, and the detection signal CS is input to the impact determination circuit 31 of the detection circuit 30. The impact determination circuit 31 determines whether or not the detection signal CS has exceeded the threshold value Vth to output the impact signal CK.

FIG. 11 is an example of the detection operation of the detection circuit 30 in the SW state 1. FIG. 11 represents the transition of the counter-electromotive currents generated in the coil A and the coil B and detected through sampling based on the detection pulse CP when the N-pole of the rotor 41 is at the stationary position of 0° after the stepper motor 40 is driven based on the drive pulse SP. As an example, the cycle of the detection pulse CP is about 0.5 mS, and the pulse width is about 16 µS.

In FIG. 11, it is assumed that the detection pulses CP of No. 1 to No. 9 are output at a predetermined cycle during the detection section in the SW state 1. In this case, with the ON/OFF operation (see FIG. 10) in the SW state 1 of the driver circuit 20 and the detection circuit 30, the detection pulse CP is output simultaneously to the coil A and the coil B, and voltages (detection signals CS) based on the counter-electromotive currents are generated at the coil terminal O1 of the coil A and at the coil terminal O4 of the coil B.

Now, first, the detection operation on the coil A side in the SW state 1 is described. As illustrated in FIG. 11, when an impact is generated at a timing of a time t0, and the rotor 41 is rotated in the clockwise direction due to the impact, a large counter-electromotive current −Ia is generated in the coil A (see also FIG. 6). As a result, at the coil terminal O1, a pulsed detection signal CS is generated in the negative direction with respect to the power supply VDD (0 V) at the timing of the detection pulse CP based on the magnitude of the counter-electromotive current −Ia due to the voltage drop caused by the detection resistor R1.

At this time, at timings of the detection pulses CP of No. 3 and No. 4 near the peak of the counter-electromotive current −Ia, the crest value of the detection signal CS of the coil terminal O1 exceeds the threshold value Vth of the impact determination circuit 31 (circles are marked on the detection signals CS at the timings of No. 3 and No. 4).

When the impact determination circuit 31 receives the detection signal CS from the coil terminal O1 as input, and determines that the detection signal CS of the coil terminal O1 has exceeded the threshold value Vth at the timing of the detection pulse CP of No. 3, as illustrated in FIG. 11, the impact determination circuit 31 immediately outputs the impact signal CK to the control circuit 3, and the control circuit 3 controls the lock pulse generation circuit 10 to output the lock pulse LP in order to brake the stepper motor 40 (see FIG. 1). Details of the operation based on the lock pulse LP are described later.

Next, the detection operation on the coil B side in the SW state 1 is described. As illustrated in FIG. 11, when an impact is generated at the timing of the time t0, and the rotor 41 is rotated in the clockwise direction due to the impact, a small counter-electromotive current +Ib is generated in the coil B (see also FIG. 6). As a result, at the coil terminal O4, a small detection signal CS is generated in the positive direction with respect to the power supply VDD (0 V) at the timing of the detection pulse CP based on the counter-electromotive current +Ib. However, the threshold value Vth of the impact determination circuit 31 is a negative voltage with respect to the power supply VDD as described above. Therefore, no detection signal CS is detected, and no impact signal CK is output due to the coil B.

As described above, when the N-pole of the rotor 41 is at the stationary position of 0°, and the driver circuit 20 and the detection circuit 30 are in the SW state 1, in a case where the rotor 41 is rotated in the clockwise direction due to an impact, the impact can be detected based on the counter-electromotive current −Ia generated from the coil A.

In FIG. 11, when the impact is detected and the impact signal CK is output, although not shown here, the lock pulse LP for braking the rotor 41 is immediately output, and no detection pulse CP is actually output during the output of the lock pulse LP. However, in order to clearly describe the impact detection based on the detection pulse CP, illustration is given as if the detection pulse CP is continuously output, although it differs from the actual case.

Next, although not shown, description is given of the detection operation of a case where the rotor 41 is rotated in the counterclockwise direction due to an impact when the N-pole of the rotor 41 is at the stationary position of 0° and in the SW state 1. In this case, when the rotor 41 is rotated in the counterclockwise direction, a small counter-electromotive current +Ia is generated in the positive direction from the coil terminal O1 to the coil terminal O2 of the coil A. Further, a large counter-electromotive current −Ib is generated from the coil terminal O3 to the coil terminal O4 of the coil B (see FIG. 7).

As a result, at the coil terminal O4, a pulsed detection signal CS is generated in the negative direction with respect to the power supply VDD (0 V) at the timing of the detection pulse CP due to the voltage drop caused by the detection resistor R3 through which the large counter-electromotive current −Ib flows. The impact determination circuit 31 receives the detection signal CS from the coil terminal O4 as input in the same manner as in the operation on the coil A side described above, and when the impact determination circuit 31 determines that the detection signal CS of the coil terminal O4 has exceeded the threshold value Vth, the impact determination circuit 31 immediately outputs the impact signal CK to the control circuit 3.

As described above, when the N-pole of the rotor 41 is at the stationary position of 0°, and the driver circuit 20 and the detection circuit 30 are in the SW state 1, in a case where the rotor 41 is rotated in the counterclockwise direction due to an impact, the impact can be detected based on the counter-electromotive current −Ib generated from the coil B.

Next, description is given of the detection operation when the N-pole of the rotor 41 is at the stationary position of 180°, that is, when the driver circuit 20 and the detection circuit 30 are in the SW state 2. In this case, as shown in the operation table of FIG. 10, each transistor on the coil A side is controlled as follows when the detection pulse CP arrives in the SW state 2. The transistor P1 of the driver circuit 20 is turned on, and the transistors N1, N2, and P2 of the driver circuit 20 are turned off. Further, the transistor TP2 of the detection circuit 30 is turned on, and the transistor TP1 of the detection circuit 30 is turned off.

Further, similarly, each transistor on the coil B side is controlled as follows when the detection pulse CP arrives in the SW state 2. The transistor P3 of the driver circuit 20 is turned on, and the transistors N3, N4, and P4 of the driver circuit 20 are turned off. Further, the transistor TP4 of the detection circuit 30 is turned on, and the transistor TP3 of the detection circuit 30 is turned off.

With the ON/OFF operation of each transistor in the above-mentioned SW state 2, on the coil A side, the coil terminal O1 is connected to the power supply VDD by the transistor P1, and the coil terminal O2 is connected to the power supply VDD via the detection resistor R2 by the transistor TP2 (see FIG. 5). Further, in the SW state 2, on the coil B side, the coil terminal O4 is connected to the power supply VDD by the transistor P3, and the coil terminal O3 is connected to the power supply VDD via the detection resistor R4 by the transistor TP4 (see FIG. 5).

When an impact is generated during a detection section in the SW state 2, and thus the rotor 41 is rotated in the clockwise direction, a large counter-electromotive current +Ia flows in the positive direction from the coil terminal O1 to the coil terminal O2 of the coil A, and a small counter-electromotive current −Ib flows in the negative direction from the coil terminal O3 to the coil terminal O4 of the coil B (see FIG. 8).

As a result, at the coil terminal O2, a pulsed detection signal CS is generated in the negative direction with respect to the power supply VDD at the timing of the detection pulse CP due to the voltage drop caused by the detection resistor R2 through which the large counter-electromotive current +Ia flows. The impact determination circuit 31 receives the detection signal CS generated at the coil terminal O2 as input, and determines whether or not the detection signal CS of the coil terminal O2 has exceeded the threshold value Vth to output the impact signal CK.

Illustration of the timing chart for the detection operation based on the coil A in the SW state 2 is omitted because the timing relationship is the same as that of the timing chart (FIG. 11) of the detection operation based on the coil A in the SW state 1 except that the direction of the counter-electromotive current of the coil A is opposite.

As described above, when the N-pole of the rotor 41 is at the stationary position of 180°, and the driver circuit 20 and the detection circuit 30 are in the SW state 2, in a case where the rotor 41 is rotated in the clockwise direction due to an impact, the impact can be detected based on the counter-electromotive current +Ia generated from the coil A.

Next, description is given of the detection operation based on the coil B when the rotor 41 is rotated in the counterclockwise direction in the SW state 2. When an impact is generated during the detection section in the SW state 2, and thus the rotor 41 is rotated in the counterclockwise direction, a small counter-electromotive current −Ia flows in the negative direction from the coil terminal O2 to the coil terminal O1 of the coil A, and a large counter-electromotive current +Ib flows in the positive direction from the coil terminal O4 to the coil terminal O3 of the coil B (see FIG. 9).

As a result, at the coil terminal O3, a pulsed detection signal CS is generated in the negative direction with respect to the power supply VDD at the timing of the detection pulse CP due to the voltage drop caused by the detection resistor R4 through which the large counter-electromotive current +Ib flows. The impact determination circuit 31 receives the detection signal CS generated at the coil terminal O3 as input, and determines whether or not the detection signal CS of the coil terminal O3 has exceeded the threshold value Vth to output the impact signal CK.

Illustration of the timing chart for the detection operation based on the coil B in the SW state 2 is omitted because the timing relationship is the same as that of the timing chart (FIG. 11) of the detection operation based on the coil A in the SW state 1 except that the detection signal CS is generated based on the counter-electromotive current +Ib of the coil B in the positive direction, and the generated detection signal CS is detected.

As described above, when the N-pole of the rotor 41 is at the stationary position of 180°, and the driver circuit 20 and the detection circuit 30 are in the SW state 2, in a case where the rotor 41 is rotated in the counterclockwise direction due to an impact, the impact can be detected based on the counter-electromotive current +Ib generated from the coil B.

As described above, the driver circuit 20 and the detection circuit 30 include the switching means for switching each transistor between the SW state 1 and the SW state 2 in accordance with the stationary position (0° or 180°) of the rotor 41 of the stepper motor 40. The switching means enables switching of the detection direction of the counter-electromotive current generated in the coil A or the coil B. Therefore, even when the stationary position of the rotor 41 switches between 0° and 180° for each drive step, the counter-electromotive current caused by the impact can always be detected, and the impact can be accurately detected without a detection error.

That is, when the stationary position of the rotor 41 is reversed, as described above with reference to FIG. 6 to FIG. 9, the directions of the counter-electromotive currents generated in the coil A and the coil B are reversed due to the impact, but the impact can be detected based on the directions of the counter-electromotive currents with use of the switching means of the driver circuit 20 and the detection circuit 30.

Further, the counter-electromotive current generated in the coil A and the counter-electromotive current generated in the coil B are detected by simultaneously sampling the currents based on one detection pulse CP. Therefore, whichever of the coil A and the coil B the counter-electromotive current is detected from, that is, whichever of the clockwise direction and the counterclockwise direction the rotor 41 is rotated in due to the impact, the counter-electromotive currents can be detected at the same timing, and the impact signal CK can be immediately output to supply the lock pulse LP to be described later to the stepper motor 40, to thereby brake the stepper motor 40.

Further, in the first embodiment, the detection signals CS generated in the coil A and the coil B are detected at the same timing, but the detection for the coil A and the detection for the coil B may be executed separately. Specifically, in the case of the SW state 1, during detection of the detection signal CS of the coil A, the transistors P2 to P4 and TP1 may be set to the ON state, and the transistors N1 to N4, P1, TP2, TP3, and TP4 may be set to the OFF state. During detection of the detection signal CS of the coil B, the transistors P1, P2, P4, and TP3 may be set to the ON state, and the transistors N1 to N4, P3, TP1, TP2, and TP4 may be set to the OFF state. Thus, the detection signals CS of the coil A and the coil B may be alternately detected.

Further, in the case of the SW state 2, during detection of the detection signal CS of the coil A, the transistors P1, P3, P4, and TP2 may be set to the ON state, and the transistors N1 to N4, P1, TP1, TP3, and TP4 may be set to the OFF state. During detection of the detection signal CS of the coil B, the transistors P1, P2, P3, and TP4 may be set to the ON state, and the transistors N1 to N4, P4, TP1, TP2, and TP3 may be set to the OFF state. Thus, the detection signals CS of the coil A and the coil B may be alternately detected. When the detection signals CS generated in the coil A and the coil B are simultaneously detected, the measurement interval can be more reduced, and hence the rotational state of the rotor 41 can be more accurately recognized.

Further, when the sensitivity of the impact detection is desired to be increased, the transistors TP1 to TP4 of the detection circuit 20 may always be turned off. With this, the resistance value in appearance of the detection resistors R1 to R4 is increased. As a result, the crest value of the detection signal CS is increased to improve the detection sensitivity. Further, each transistor is preferred to be controlled as follows when the stepper motor 40 is in a non-drive state and the detection pulse CP has not arrived. The transistors P1 to P4 are turned on, and all of the other transistors are turned off. Thus, the coil terminals O1 to O4 of the coils A and B are connected to the power supply VDD.

Figure 12:
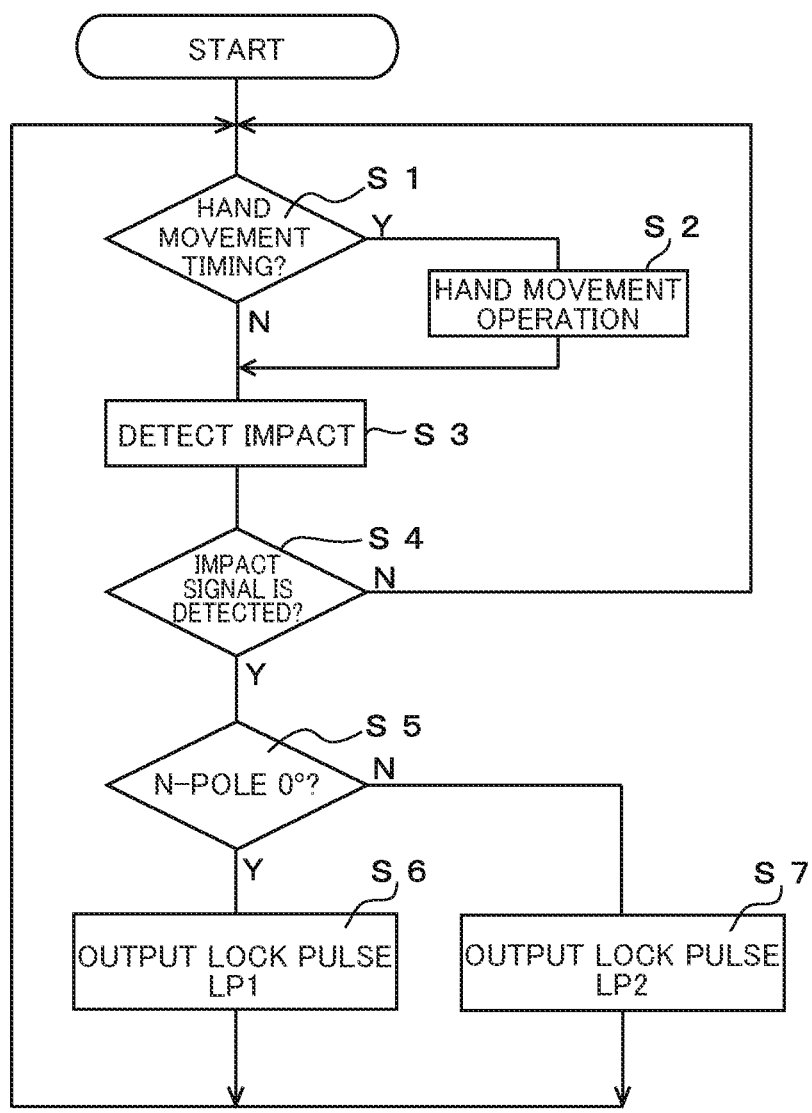
FIG. 12 is a flow chart for illustrating the operation of the drive circuit for a two-coil stepper motor according to the first embodiment of the present invention.
Figure 13:
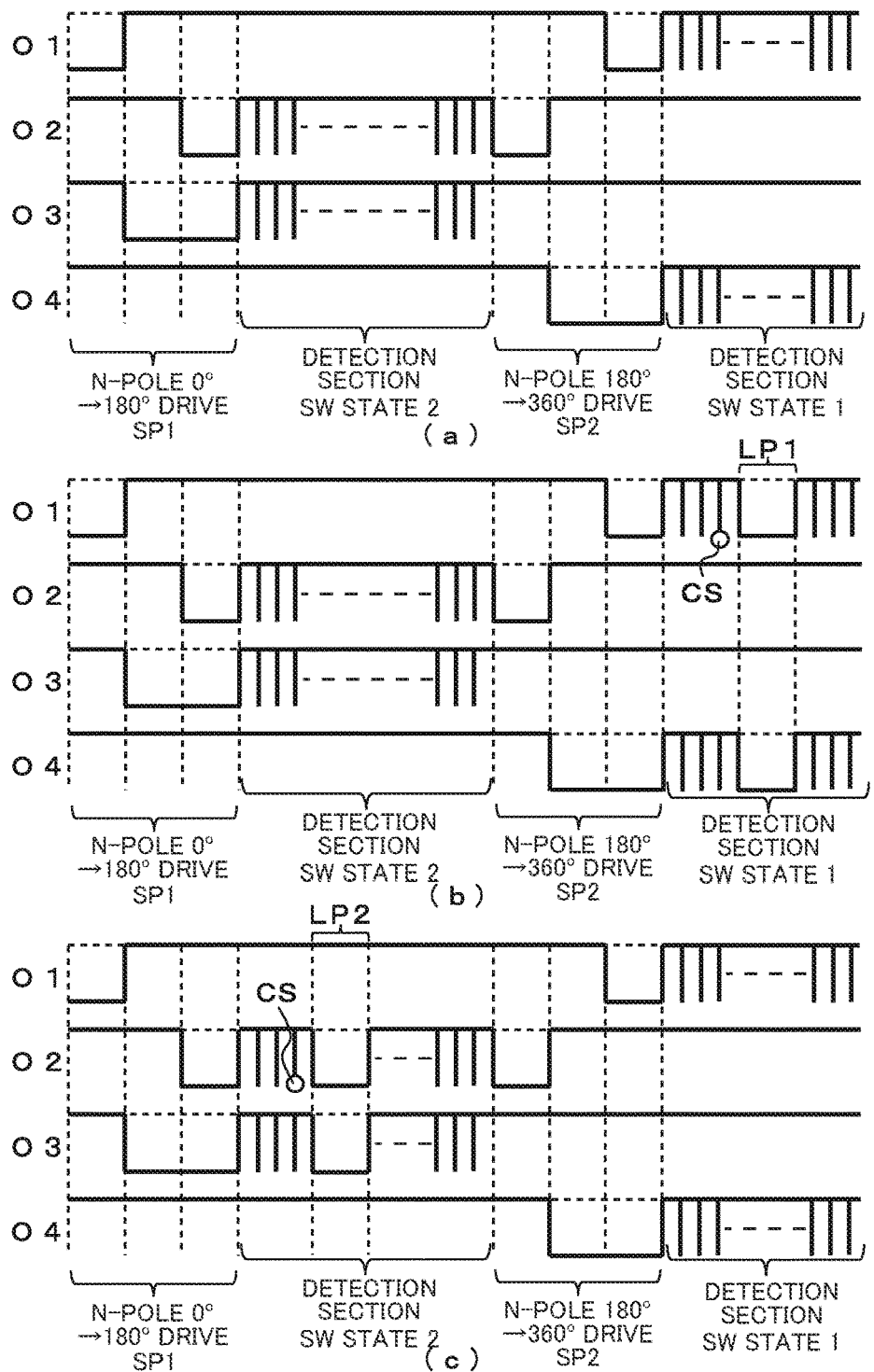
FIG. 13 are timing charts for illustrating the operation of the drive circuit for a two-coil stepper motor according to the first embodiment of the present invention.

[Description of Operation of First Embodiment: FIG. 12 and FIGS. 13]

Next, the operation of the drive circuit of the first embodiment is described with reference to the flow chart of FIG. 12 and the timing charts of FIG. 13. The timing charts of FIG. 13 represent the drive pulse SP, the detection pulse CP, and the lock pulse LP at the respective coil terminals (drive waveforms) O1, O2, O3, and O4 of the stepper motor 40. The configuration of the drive circuit is described with reference to FIG. 1.

In FIG. 12, the control circuit 3 of the drive circuit 1 receives the reference signal P1 output from the oscillation circuit 2 as input to execute the counting operation, and determines whether or not a hand movement timing for driving the stepper motor 40 has arrived (Step S1). When a positive determination is made in this step (the hand movement timing has arrived), the processing proceeds to Step S2 to execute the hand movement operation. When a negative determination is made in this step (the hand movement timing has not arrived), the processing proceeds to the next Step S3.

In the hand movement operation of Step S2, the control circuit 3 controls the drive pulse generation circuit 4 to output the drive pulse SP, and the driver circuit 20 supplies the drive pulse SP1 or SP2 (see FIG. 3 and FIG. 4) to the coil A and the coil B of the stepper motor 40, to thereby drive the stepper motor 40 for each step.

Next, when a negative determination is made in Step S1, or when the hand movement operation is ended in Step S2, the control circuit 3 controls the detection pulse generation circuit 6 to output the detection pulse CP at a predetermined cycle, and the driver circuit 20 and the detection circuit 30 switch each transistor into the SW state 1 or the SW state 2 in accordance with the stationary position of the rotor 41 as shown in FIG. 10 at the timing of the detection pulse CP, to thereby simultaneously detect the counter-electromotive currents generated in the coil A and the coil B (Step S3).

That is, after the stepper motor 40 is driven based on the drive pulse SP, the counter-electromotive currents generated along with the movement (rotation) of the rotor 41 are detected based on the detection pulse CP output from the detection pulse generation circuit 6.

Next, the control circuit 3 receives the impact signal CK output from the detection circuit 30 as input, and determines whether or not the detection circuit 30 has detected an impact (Step S4). When a positive determination is made in this step (impact is detected), the processing proceeds to the next Step S5, and when a negative determination is made in this step (no impact is detected), the processing returns to Step S1 to repeat the operation from Step S1 to Step S4.

The timing chart of FIG. 13(a) is an operation example in which the flow from Step S1 to Step S4 is repeated. In FIG. 13(a), assuming that the N-pole of the rotor 41 of the stepper motor 40 is at the stationary position of 0°, when the drive pulse SP1 is supplied to the stepper motor 40 at the hand movement timing, the N-pole of the rotor 41 is rotated from 0° to 180° and then stops.

After the output of the drive pulse SP1 is ended, the N-pole of the rotor 41 is at the stationary position of 180°, and hence the control circuit 3 switches the driver circuit 20 and the detection circuit 30 into the SW state 2 (see FIG. 10), and detects the counter-electromotive currents generated in the coil A and the coil B through the sampling operation based on the detection pulse CP (impact detection section in the SW state 2). In the SW state 2, the detection signal CS is generated at one of the coil terminals O2 and O3 depending on the rotational direction of the rotation of the rotor 41 caused by the impact.

Next, after a predetermined time period has elapsed and the next hand movement timing arrives, the drive pulse SP2 is supplied to the stepper motor 40, and the N-pole of the rotor 41 is rotated from 180° to 360° (0°) and then stops.

After the output of the drive pulse SP2 is ended, the N-pole of the rotor 41 is at the stationary position of 0°, and hence the control circuit 3 switches the driver circuit 20 and the detection circuit 30 into the SW state 1 (see FIG. 10), and detects the counter-electromotive currents generated in the coil A and the coil B through the sampling operation based on the detection pulse CP (impact detection section in the SW state 1). In the SW state 1, the detection signal CS is generated at one of the coil terminals O1 and O4 depending on the rotational direction of the rotation of the rotor 41 caused by the impact.

As described above, the drive pulse SP for hand movement is periodically (for example, for each second) supplied to the stepper motor 40, but after the drive based on the drive pulse SP is ended, that is, during a period in which the stepper motor 40 is stopped, an impact detection section for detecting the movement (rotation) of the rotor 41 is provided. Therefore, the operation illustrated in FIG. 13(a) is repeated unless the impact is detected, and the stepper motor 40 is continuously subjected to normal hand movement for each second, for example.

Next, the operation in Step S5 and the subsequent steps is described with reference to the flow chart of FIG. 12. When a positive determination is made (impact is detected) in Step S4, the control circuit 3 determines whether or not the N-pole of the rotor 41 is at the stationary position of 0° (Step S5).

When a positive determination is made in this step (N-pole is at 0°), the control circuit 3 activates the LP1 generation circuit 11 of the lock pulse generation circuit 10 to output the lock pulse LP1 (Step S6), and brakes the rotor 41 of the stepper motor 40 to return the rotor 41 that has been rotated due to the impact to the stationary position of 0°. Then, the processing returns to Step S1 to repeat the operation flow from Step S1.

On the other hand, when a negative determination is made in this step (N-pole is at 180°), the control circuit 3 activates the LP2 generation circuit 12 of the lock pulse generation circuit 10 to output the lock pulse LP2 (Step S7), and brakes the rotor 41 of the stepper motor 40 to return the rotor 41 that has been rotated due to the impact to the stationary position of 180°. Then, the processing returns to Step S1 to repeat the operation flow from Step S1.

The timing chart of FIG. 13(b) is an operation example in which the impact is detected and the lock pulse LP1 is output when the N-pole of the rotor 41 is at the stationary position of 0°. In FIG. 13(b), the N-pole of the rotor 41 is rotated to 180° due to the drive pulse SP1. After that, the impact detection section in the SW state 2 is performed.

Next, the N-pole of the rotor 41 proceeds to 360° (0°) due to the drive pulse SP2. After that, the impact detection section in the SW state 1 is performed. During the impact detection section in the SW state 1, the detection signal CS (marked with a circle) has been detected at the coil terminal O1. That is, the detection signal CS generated at the coil terminal O1 has exceeded the threshold value Vth of the impact determination circuit 31 (see FIG. 11). As a result, the impact determination circuit 31 outputs the impact signal CK (not shown), and the control circuit 3 immediately outputs the lock pulse LP1 to brake the stepper motor 40. Thus, the N-pole of the rotor 41 returns to 0°.

Further, the timing chart of FIG. 13(c) is an operation example in which the impact is detected and the lock pulse LP2 is output when the N-pole of the rotor 41 is at the stationary position of 180°. In FIG. 13(c), the N-pole of the rotor 41 is rotated to 180° due to the drive pulse SP1. After that, the impact detection section in the SW state 2 is performed.

During the impact detection section in the SW state 2, the detection signal CS (marked with a circle) has been detected at the coil terminal O2. That is, the detection signal CS generated at the coil terminal O2 has exceeded the threshold value Vth of the impact determination circuit 31. As a result, the impact determination circuit 31 outputs the impact signal CK (not shown), and the control circuit 3 immediately outputs the lock pulse LP2 to brake the stepper motor 40. Thus, the N-pole of the rotor 41 returns to 180°.

After that, the impact detection section in the SW state 2 is continued. Next, the N-pole of the rotor 41 proceeds to) 360° (0° due to the drive pulse SP2. After that, the impact detection section in the SW state 1 is performed.

In the impact detection section in the SW state 1 or the SW state 2, operation is performed through sampling based on the detection pulse CP, but the impact detection is not limited to the sampling operation. For example, during the impact detection section, each transistor may always be turned on or off based on the operation table of FIG. 10. With this, regardless of the sampling cycle of the detection pulse CP, the detection signal CS is generated simultaneously with the rotation of the rotor 41 caused by the impact, and hence the lock pulse LP can be immediately output to brake the stepper motor 40 without delay.

Figure 14:
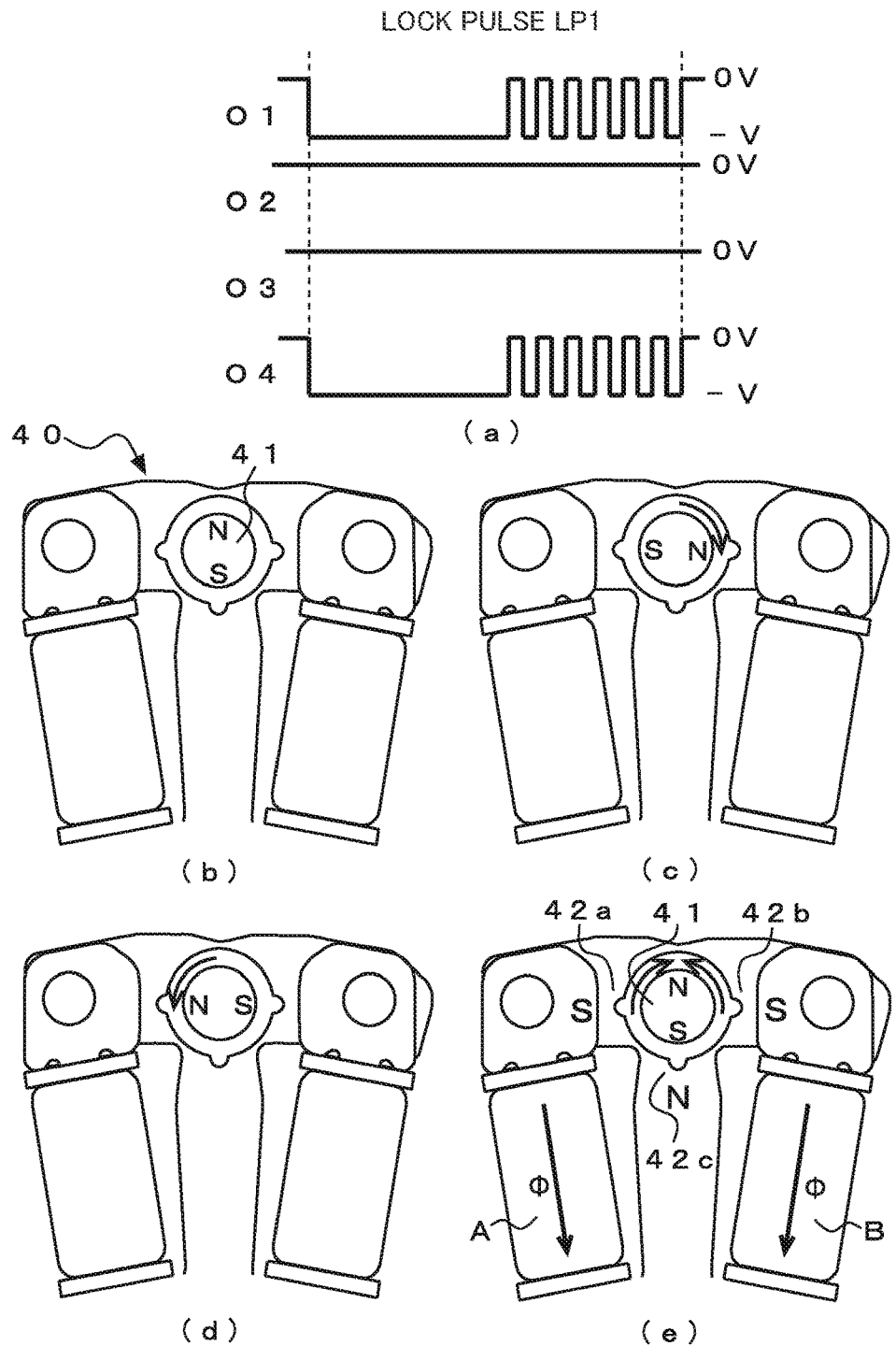
FIG. 14 are explanatory diagrams for illustrating braking of the rotor based on a lock pulse LP1 when the N-pole of the rotor of the stepper motor according to the first embodiment of the present invention is at a stationary position of 0°.

[Description of Lock Pulse LP1: FIGS. 14]

Next, with reference to FIG. 14, description is given of the waveform and the operation of the lock pulse LP1 for braking the rotor 41 that has been rotated due to the impact when the N-pole of the rotor 41 is at the stationary position of 0°. FIG. 14(a) is an example of the drive waveform of the lock pulse LP1. In FIG. 14(a), similarly to the drive pulse SP, the lock pulse LP1 has potentials of 0 V (VDD) and −V (for example, −1.5 V).

When the lock pulse LP1 is output, the potentials at the coil terminal O1 and the coil terminal O2 of the coil A become −V and 0 V, respectively, and the potentials at the coil terminal O3 and the coil terminal O4 of the coil B become 0 V and −V, respectively. The output period of the lock pulse LP1 is set to a period necessary for braking the rotor 41, and is about 16 mS, for example. Further, a period in the latter half of the lock pulse LP1 may exhibit chopper output as illustrated in FIG. 14(a). When the latter half of the lock pulse LP1 exhibits chopper output, the drive current in the latter half can be reduced, and thus the vibration of the rotor 41 after the rotor 41 is returned to the stationary position can be converged earlier.

Next, with reference to FIG. 14(b) to FIG. 14(e), description is given of how to brake and return the rotation of the rotor that has been rotated due to the impact based on the lock pulse LP1. FIG. 14(b) represents a state in which the N-pole of the rotor 41 is at the stationary position of 0°.

FIG. 14(c) represents a state in which, in the stationary state of the rotor 41 illustrated in FIG. 14(b), an impact is applied to the stepper motor 40 from the outside, the rotor 41 is thus rotated by about 90° in the clockwise direction, and the N-pole is moved to a position of about 270°. In this case, as described above with reference to FIG. 6, the counter-electromotive current −Ia is generated in the coil A in the negative direction, and the detection signal CS is detected from the coil terminal O1 (see FIG. 13(b)).

FIG. 14(d) represents a state in which, in the stationary state of the rotor 41 illustrated in FIG. 14(b), an impact is applied to the stepper motor 40 from the outside, the rotor 41 is thus rotated by about 90° in the counterclockwise direction, and the N-pole is moved to a position of about 90°. In this case, as described above with reference to FIG. 7, the counter-electromotive current −Ib is generated in the coil B in the negative direction, and the detection signal CS is detected from the coil terminal O4.

FIG. 14(e) represents how the rotor 41 is braked based on the lock pulse LP1 illustrated in FIG. 14(a) when an impact is applied to the stepper motor 40, and the rotor 41 is rotated by about 270° or about 90° as illustrated in FIG. 14(c) and FIG. 14(d).

In this case, when the lock pulse LP1 is supplied to the stepper motor 40, a drive current flows from the coil terminal O2 to the coil terminal O1 of the coil A, and a magnetic flux φ is generated in the coil A downward in FIG. 14(e). Similarly, a drive current flows from the coil terminal O3 to the coil terminal O4 of the coil B, and a magnetic flux φ is generated in the coil B downward in FIG. 14(e).

With this, the first magnetic-pole portion 42a and the second magnetic-pole portion 42b are magnetized to the S-pole, and the third magnetic-pole portion 42c is magnetized to the N-pole. As a result, the S-pole of the rotor 41 and the N-pole of the third magnetic-pole portion 42c attract each other, and the rotor 41 is braked so that the N-pole of the rotor 41 is returned to the stationary position of 0° irrespective of the rotation direction of the rotor 41.

That is, when the rotor 41 is rotated in the clockwise direction due to the impact (see FIG. 14(c)), the rotor 41 is braked in the counterclockwise direction based on the lock pulse LP1, and the N-pole stops at the position of 0°. Further, when the rotor 41 is rotated in the counterclockwise direction due to the impact (see FIG. 14(d)), the rotor 41 is braked in the clockwise direction based on the lock pulse LP1, and the N-pole stops at the position of 0°.

In this case, the lock pulse LP1 has the same specification as that of the small drive pulse SP23 (see FIG. 4) that is output at the end in the drive pulse SP2 for rotating the N-pole of the rotor 41 from the stationary position of 180° to 360° (0°). This is because the operation based on the lock pulse LP1 is the same as the operation based on the small drive pulse SP23 involving magnetizing the first magnetic-pole portion 42a and the second magnetic-pole portion 42b to the S-pole and the third magnetic-pole portion 42c to the N-pole, and rotating the N-pole of the rotor 41 to the position of 0°. With this, the rotor 41 that has been rotated due to the impact can be reliably returned to the original stationary position of 0°.

Figure 15:
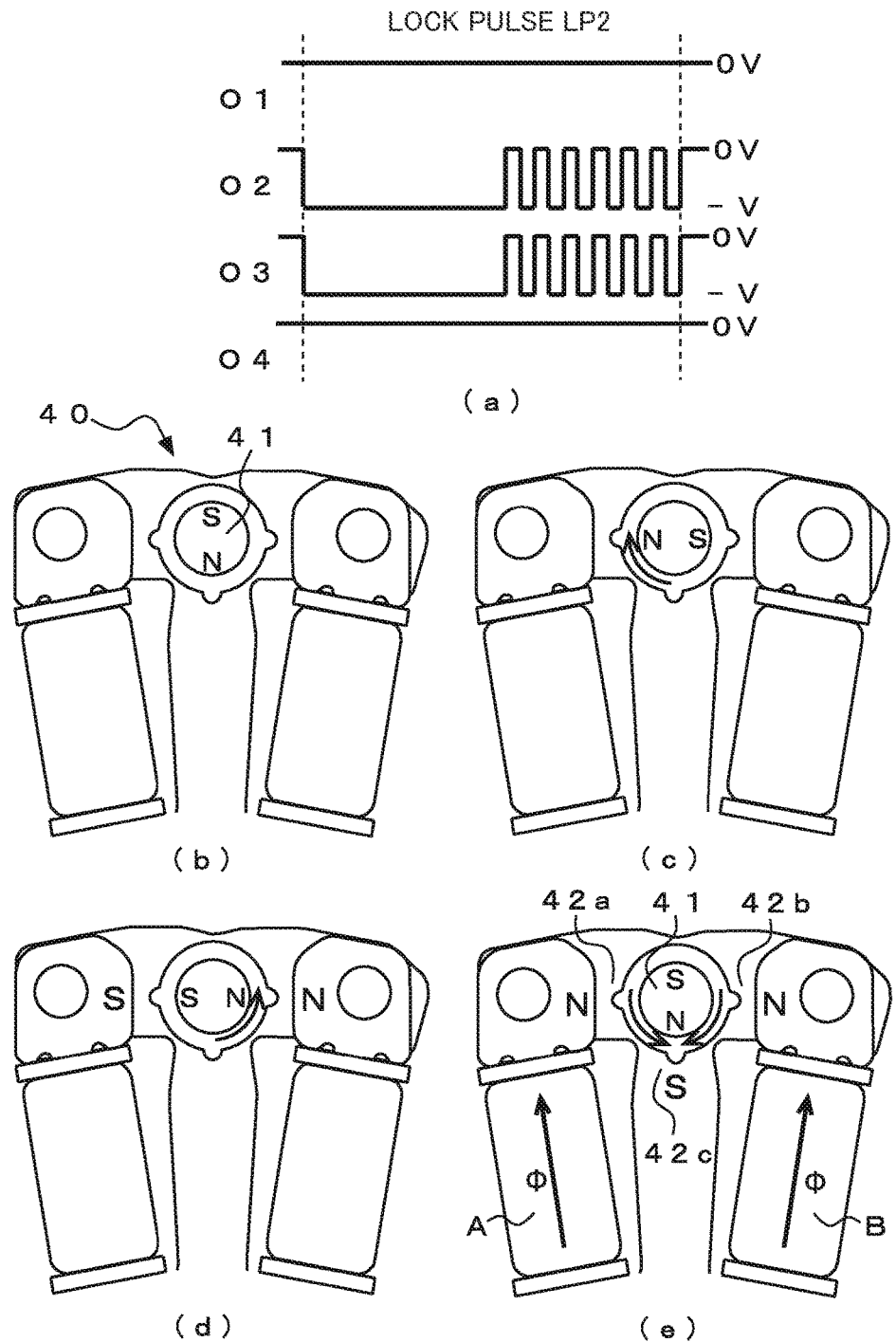
FIG. 15 are explanatory diagrams for illustrating braking of the rotor based on a lock pulse LP2 when the N-pole of the rotor of the stepper motor according to the first embodiment of the present invention is at a stationary position of 180°.

[Description of Lock Pulse LP2: FIGS. 15]

Next, with reference to FIG. 15, description is given of the waveform and the operation of the lock pulse LP2 for braking the rotor that has been rotated due to the impact when the N-pole of the rotor is at the stationary position of 180°. FIG. 15(a) is an example of the drive waveform of the lock pulse LP2. In FIG. 15(a), similarly to the drive pulse SP, the lock pulse LP2 has potentials of 0 V (VDD) and −V (for example, −1.5 V).

When the lock pulse LP2 is output, the potentials at the coil terminal O1 and the coil terminal O2 of the coil A become 0 V and −V, respectively, and the potentials at the coil terminal O3 and the coil terminal O4 of the coil B become −V and 0 V, respectively. The output period of the lock pulse LP2 is similar to that of the lock pulse LP1. Further, the period in the latter half may exhibit chopper output similarly to the lock pulse LP1.

Next, with reference to FIG. 15(b) to FIG. 15(e), description is given of how to brake and return the rotation of the rotor that has been rotated due to the impact based on the lock pulse LP2. FIG. 15(b) represents a state in which the N-pole of the rotor 41 is at the stationary position of 180°.

FIG. 15(c) represents a state in which, in the stationary state of the rotor 41 illustrated in FIG. 15(b), an impact is applied to the stepper motor 40 from the outside, the rotor 41 is thus rotated by about 90° in the clockwise direction, and the N-pole is moved to a position of about 90°. In this case, as described above with reference to FIG. 8, the counter-electromotive current +Ia is generated in the coil A in the positive direction, and the detection signal CS is detected from the coil terminal O2 (see FIG. 13(c)).

FIG. 15(d) represents a state in which, in the stationary state of the rotor 41 illustrated in FIG. 15(b), an impact is applied to the stepper motor 40 from the outside, the rotor 41 is thus rotated by about 90° in the counterclockwise direction, and the N-pole is moved to a position of about 270°. In this case, as described above with reference to FIG. 9, the counter-electromotive current +Ib is generated in the coil B in the positive direction, and the detection signal CS is detected from the coil terminal O3.

FIG. 15(e) represents how the rotor 41 is braked based on the lock pulse LP2 illustrated in FIG. 15(a) when an impact is applied to the stepper motor 40, and the rotor 41 is rotated by about 90° or about 270° as illustrated in FIG. 15(c) and FIG. 15(d).

In this case, when the lock pulse LP2 is supplied to the stepper motor 40, a drive current flows from the coil terminal O1 to the coil terminal O2 of the coil A, and a magnetic flux $\varphi$ is generated in the coil A upward in FIG. 15(e). Similarly, a drive current flows from the coil terminal O4 to the coil terminal O3 of the coil B, and a magnetic flux $\varphi$ is generated in the coil B upward in FIG. 15(e).

With this, the first magnetic-pole portion 42a and the second magnetic-pole portion 42b are magnetized to the N-pole, and the third magnetic-pole portion 42c is magnetized to the S-pole. As a result, the N-pole of the rotor 41 and the S-pole of the third magnetic-pole portion 42c attract each other, and the rotor 41 is braked so that the N-pole of the rotor 41 is returned to the stationary position of 180° irrespective of the rotation direction of the rotor 41.

That is, when the rotor 41 is rotated in the clockwise direction due to the impact (see FIG. 15(c)), the rotor 41 is braked in the counterclockwise direction based on the lock pulse LP2, and the N-pole stops at the position of 180°. Further, when the rotor 41 is rotated in the counterclockwise direction due to the impact (see FIG. 15(d)), the rotor 41 is braked in the clockwise direction based on the lock pulse LP2, and the N-pole stops at the position of 180°.

In this case, the lock pulse LP2 has the same specification as that of the small drive pulse SP13 (see FIG. 3) that is output at the end in the drive pulse SP1 for rotating the N-pole of the rotor 41 from the position of 0° to 180°. This is because the operation based on the lock pulse LP2 is the same as the operation based on the small drive pulse SP13 involving magnetizing the first magnetic-pole portion 42a and the second magnetic-pole portion 42b to the N-pole and the third magnetic-pole portion 42c to the S-pole, and rotating the N-pole of the rotor 41 to the position of 180°. With this, the rotor 41 that has been rotated due to the impact can be reliably returned to the original stationary position of 180°.

The lock pulses LP1 and LP2 are effective when the rotor is rotated within 180° due to the impact. When the rotor is rotated by 180° or more due to a strong impact, a lock pulse represented in a second embodiment of the present invention, which is described later, is effective.

As described above, in the first embodiment, the two coils A and B are simultaneously used as detection coils to detect the impact. When the impact is detected, the two coils A and B are simultaneously excited based on the lock pulse LP. In this manner, the stepper motor can be reliably braked.

As described above, according to the drive circuit for a two-coil stepper motor of the first embodiment, the two coils A and B of the stepper motor are simultaneously used as detection coils, and the driver circuit and the detection circuit are used to switch the detection direction of the counter-electromotive currents generated in the coil A and the coil B in accordance with the stationary position of the rotor. In this manner, regardless of the stationary position of the rotor, and further, regardless of the rotational direction of the rotation of the rotor caused by the impact, the movement of the rotor can be recognized with high accuracy, and thus a drive circuit for a two-coil stepper motor capable of reliably detecting the impact applied to the stepper motor can be provided.

Further, regarding the lock pulse generated by the drive circuit of the first embodiment, a pulse that has the same specification as that of the last small drive pulse in the drive pulse for driving the rotor is supplied to brake the rotor. With this, the rotor can be braked in accordance with the stationary position of the rotor, and hence even when the rotor is rotated from the stationary position of 0° due to the impact, or even when the rotor is rotated from the stationary position of 180° due to the impact, the rotor can always be returned to the original stationary position, and the deviation of drive caused by the impact can be reliably prevented. With this, when the present invention is applied to an analog indication electronic clock, an electronic clock excellent in impact resistance and visibility of analog indication can be provided.

Further, the lock pulse described in the first embodiment is a pulse corresponding to one small drive pulse in the drive pulse. Therefore, there is an advantage in that the rotor can be braked with small drive power.

[Second Embodiment]

Figure 16:
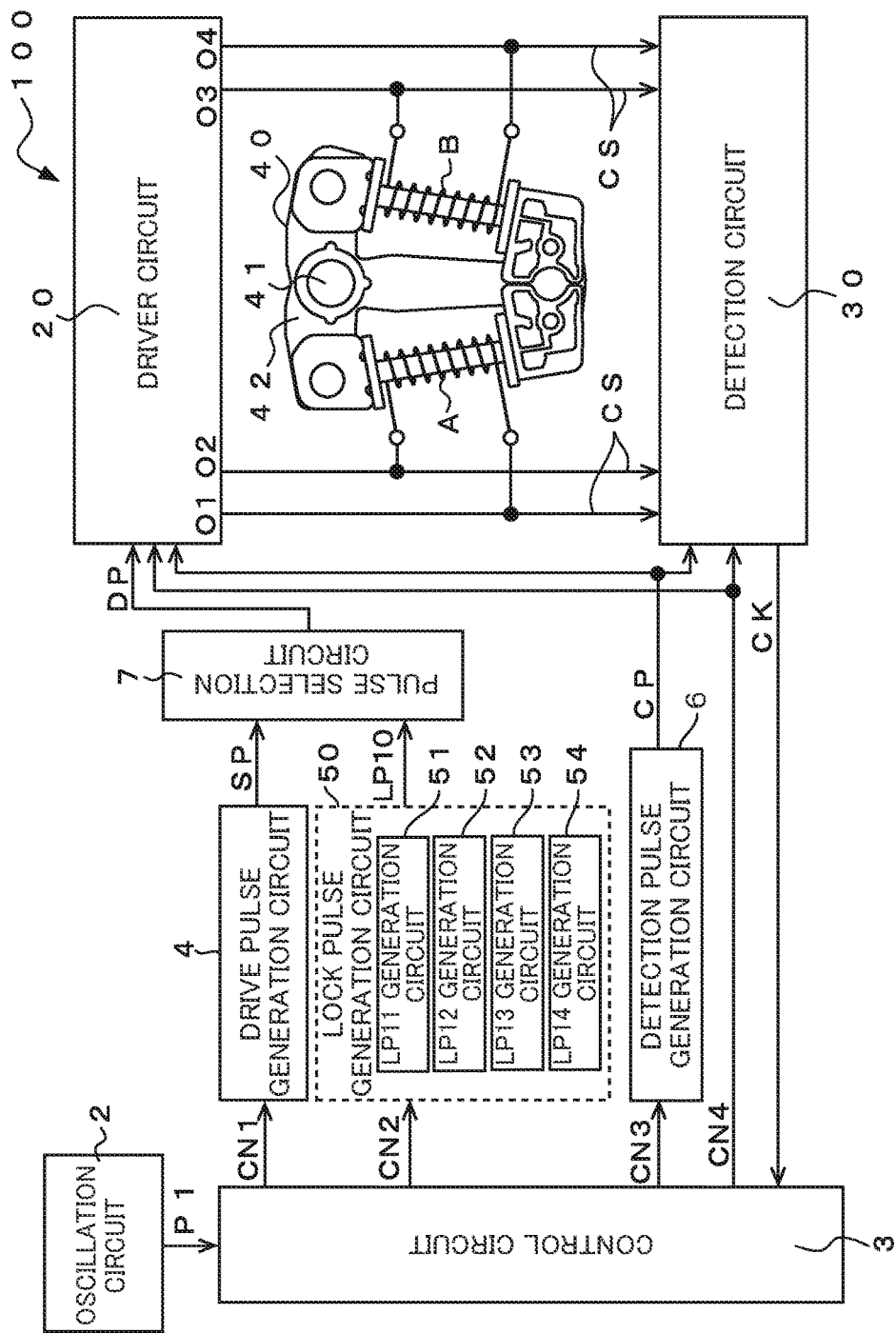
FIG. 16 is a configuration diagram for illustrating a schematic configuration of a drive circuit for a two-coil stepper motor according to a second embodiment of the present invention.

[Description of Configuration of Drive Circuit of Second Embodiment: FIG. 16]

Next, a schematic configuration of a drive circuit according to the second embodiment is described with reference to FIG. 16. The second embodiment relates to a drive circuit supporting a case where the rotor of the stepper motor receives a strong impact to be rotated by 180° or more. The drive circuit of the second embodiment differs from that of the first embodiment only in the configuration of the lock pulse generation circuit, and the remaining components are the same. Therefore, the lock pulse generation circuit is mainly described, and overlapping components are denoted by like reference symbols to omit the description thereof.

In FIG. 16, reference symbol 100 denotes the drive circuit for a two-coil stepper motor (hereinafter abbreviated as "drive circuit 100") according to the second embodiment. The drive circuit 100 includes the oscillation circuit 2 configured to output the predetermined reference signal P1 with use of a quartz crystal unit (not shown), the control circuit 3 configured to output the control signals CN1 to CN4, the pulse generation circuit 4, a lock pulse generation circuit 50, the detection pulse generation circuit 6, the pulse selection circuit 7, the driver circuit 20, the detection circuit 30, and the stepper motor 40.

The lock pulse generation circuit 50 includes an LP11 generation circuit 51, an LP12 generation circuit 52, an LP13 generation circuit 53, and an LP14 generation circuit 54, and is configured to receive the control signal CN2 as input, to thereby output a lock pulse LP10 to the pulse selection circuit 7. The operation of the lock pulse generation circuit 50 is described later, but the lock pulse generation circuit 50 is configured to selectively output one of lock pulses LP11 to LP14 depending on the stationary position of the rotor 41 of the stepper motor 40 and the rotational direction of the rotation of the rotor 41 caused by the impact. The lock pulses LP11 to LP14 are collectively referred to as "lock pulse LP10".

Figure 17:
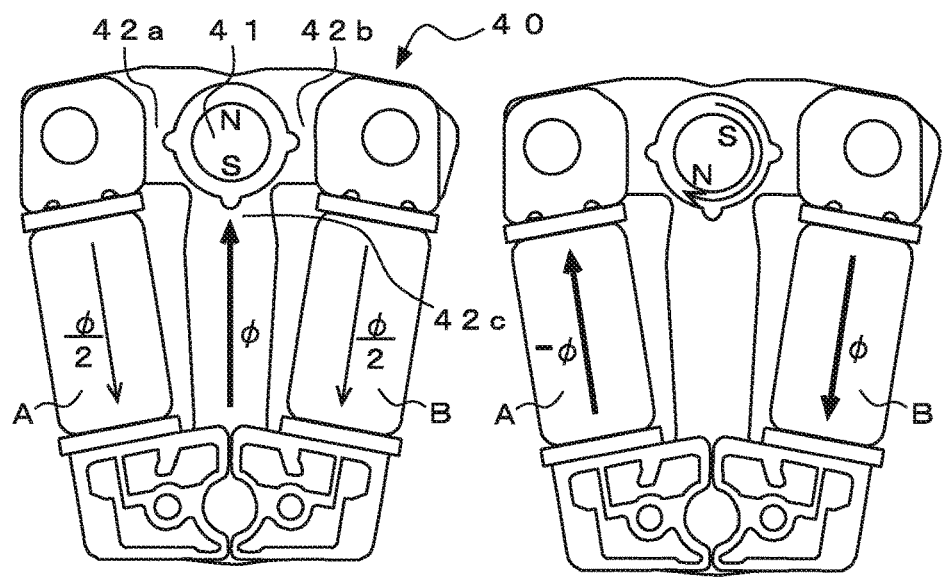
FIG. 17 are explanatory diagrams for illustrating counter-electromotive currents generated in coils when an N-pole of a rotor according to the second embodiment of the present invention, which is positioned at 0°, is rotated by 180° or more in a clockwise direction due to an impact.
Figure 17:
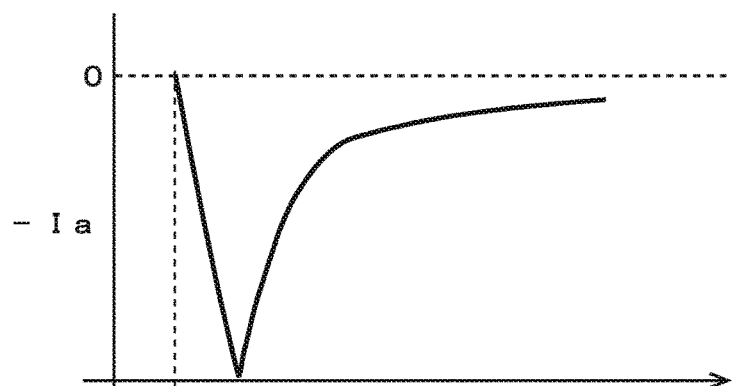
Figure 17:
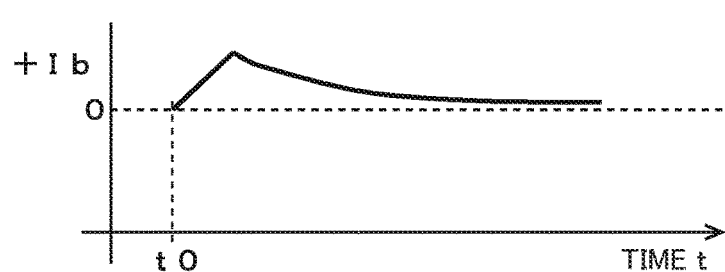
Figure 18:
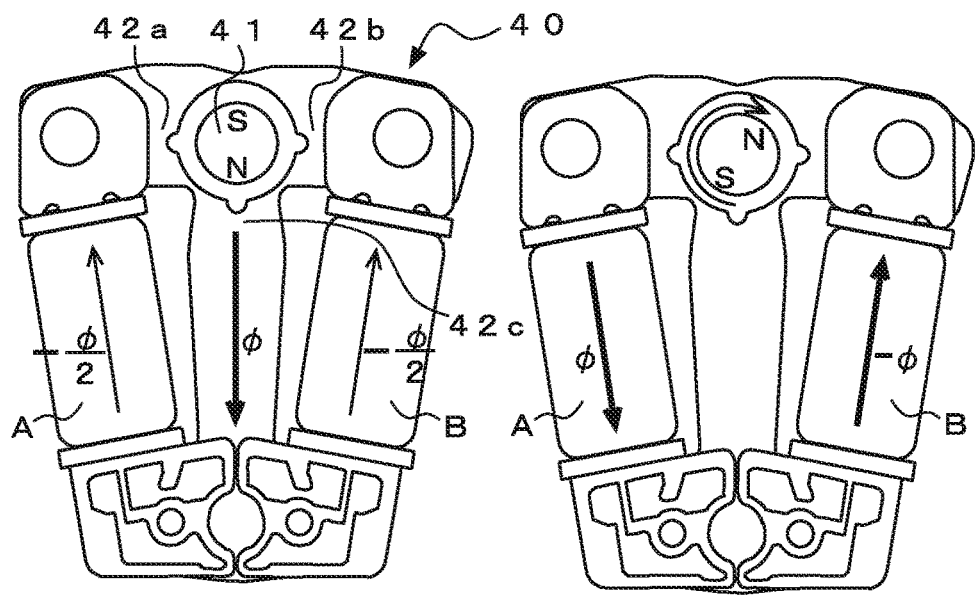
FIG. 18 are explanatory diagrams for illustrating counter-electromotive currents generated in the coils when the N-pole of the rotor according to the second embodiment of the present invention, which is positioned at 180°, is rotated by 180° or more in the clockwise direction due to an impact.
Figure 18:
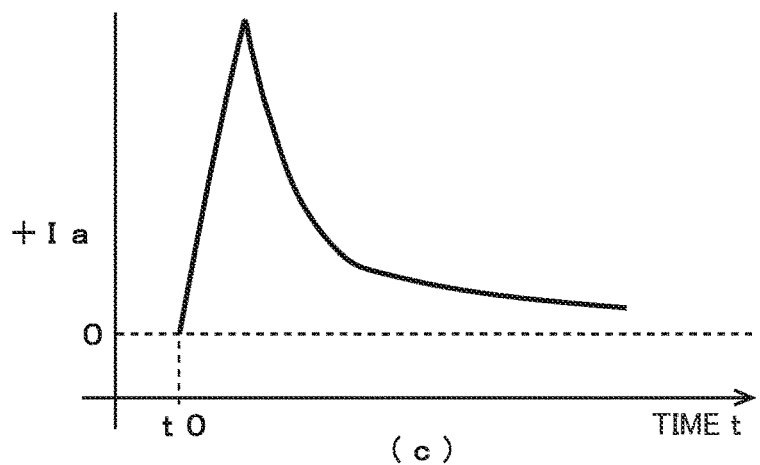
Figure 18:
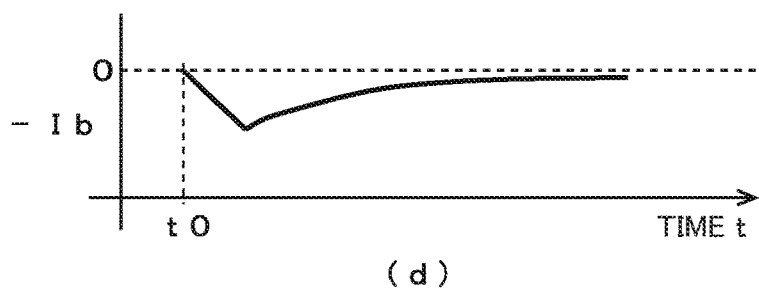

[Description of Rotation of Rotor Caused by Impact and Counter-Electromotive Currents: FIG. 17 and FIGS. 18]

Next, with reference to FIG. 17 and FIG. 18, description is given of a generation state of the counter-electromotive currents when the rotor 41 of the stepper motor 40 is rotated due to an impact applied from the outside. In this case, the impact assumed in the second embodiment is stronger than the impact of the first embodiment, and description is given assuming that the rotor 41 is rotated by 180° or more from the stationary position due to the impact.

FIG. 17 exemplify the counter-electromotive currents generated in the coils A and B in a case where the rotor 41 is rotated by 180° or more in the clockwise direction due to a strong impact applied from the outside when the N-pole of the rotor 41 of the stepper motor 40 is at the stationary position of 0°.

In FIG. 17(a), the N-pole of the rotor 41 of the stepper motor 40 is at the stationary position of 0°, and thus the stepper motor 40 is in a non-drive state. At this time, the magnetic flux output from the N-pole of the rotor 41 includes a magnetic flux passing through a magnetic circuit of the first magnetic-pole portion 42a, the coil A, and the third magnetic-pole portion 42c in the stated order, and a magnetic flux passing through a magnetic circuit of the second magnetic-pole portion 42b, the coil B, and the third magnetic-pole portion 42c in the stated order. When the amount of the magnetic flux output from the N-pole of the rotor 41 is represented by $\varphi$, the amount of the magnetic flux passing through the coil A is $\varphi/2$, and the amount of the magnetic flux passing through the coil B is also $\varphi/2$.

Now, it is assumed that, as illustrated in FIG. 17(b), a strong impact is applied from the outside so as to rotate the rotor 41 by 180° or more in the clockwise direction, and the N-pole of the rotor 41 is moved to a position of about 150°. In this case, at a time point at which the S-pole of the rotor 41 passes through the first magnetic-pole portion 42a and the N-pole of the rotor 41 passes through the second magnetic-pole portion 42b, the magnetic flux $\varphi$ of the rotor 41 passes through the following magnetic circuit. As illustrated in FIG. 17(b), the magnetic flux $\varphi$ of the rotor 41 passes from the second magnetic-pole portion 42b through the coil B, and enters the coil A to pass through the first magnetic-pole portion 42a.

Regarding the change in magnetic flux at this time, similarly to the case of the first embodiment (see FIG. 6), the magnetic flux of the coil A changes from $+\frac{1}{2}100$ to $-\varphi$, and hence the change amount is $-3/2\varphi$, which is a large change in magnetic flux amount. Meanwhile, the magnetic flux of the coil B changes from $+\frac{1}{2}\varphi$ to $+\varphi$, and hence the change amount is $+\frac{1}{2}\varphi$, which is a small change in magnetic flux amount.

Further, in the case of the second embodiment, the impact is stronger as described above. Therefore, the rotational speed of the rotation of the rotor 41 caused by the impact is increased. As a result, it is understood that the speed of the change in magnetic flux is higher in the second embodiment as compared to the first embodiment. Therefore, the counter-electromotive currents generated in the coil A and the coil B are larger in absolute value than the counter-electromotive currents in the first embodiment.

FIG. 17(c) is a schematic waveform chart for illustrating an example of the counter-electromotive current to be induced in the coil A due to the change in amount of the magnetic flux passing through the coil A. The X axis represents time t, and the Y axis represents the counter-electromotive current $-Ia$ caused by the coil A. Further, a time t0 is a time at which the impact is applied. In FIG. 17(c), the rotor 41 is rotated immediately after the time t0 at which the impact is applied, and thus the magnetic flux passing through the coil A changes from $+\frac{1}{2}\varphi$ to $-\varphi$. Therefore, the change in magnetic flux amount is large, and a large counter-electromotive current $-Ia$ flows from the coil terminal O2 to the coil terminal O1 of the coil A (which is represented as a negative-direction current). Meanwhile, FIG. 17(d) is a waveform chart for illustrating an example of a counter-electromotive current to be induced in the coil B through the change in amount of the magnetic flux passing through the coil B. In FIG. 17(d), the magnetic flux of the coil B changes from +½φ to +φ. Therefore, the change in magnetic flux amount is small, and a small counter-electromotive current +Ib flows from the coil terminal O4 to the coil terminal O3 of the coil B (which is represented as a positive-direction current).

As described above, when the N-pole of the rotor 41 is at the stationary position of 0°, and an impact is applied from the outside so as to rotate the rotor 41 in the clockwise direction, a large counter-electromotive current −Ia flows from the coil terminal O2 to the coil terminal O1 of the coil A. Through detection of this counter-electromotive current, application of an impact to the stepper motor 40 and the rotational direction of the rotation caused by the impact can be known.

Further, as described above, when a strong impact is applied, the rotational speed of the rotor 41 is increased, and hence the counter-electromotive currents generated in the coil A and the coil B are increased. Therefore, the following control can be performed. That is, when a strong impact is applied, the detection signal CS caused by a large counter-electromotive current is detected to brake the rotor 41. Further, when a weak impact is applied, a detection signal CS caused by a small counter-electromotive current is prevented from being detected, and the rotor 41 is prevented from being braked. Such control based on the strength of the impact can be achieved by adjusting the above-mentioned threshold value Vth of the impact determination circuit 31.

As compared to the counter-electromotive currents of FIG. 7 described in the first embodiment, the counter-electromotive currents generated in the coils A and B in a case where the rotor 41 is rotated by 180° or more in the counterclockwise direction due to a strong impact applied from the outside when the N-pole of the rotor 41 is at the stationary position of 0° have only larger absolute values, and the directions of the counter-electromotive currents are the same. Therefore, description thereof is omitted herein.

Next, FIG. 18 exemplify the counter-electromotive currents generated in the coils A and B in a case where the rotor 41 is rotated by 180° or more in the clockwise direction due to a strong impact applied from the outside when the N-pole of the rotor 41 of the stepper motor 40 is at the stationary position of 180°.

In FIG. 18(a), the N-pole of the rotor 41 is at the stationary position of 180°, and thus the stepper motor 40 is in a non-drive state. At this time, the magnetic flux output from the N-pole of the rotor 41 includes a magnetic flux passing through a magnetic circuit of the third magnetic-pole portion 42c, the coil A, and the first magnetic-pole portion 42a in the stated order, and a magnetic flux passing through a magnetic circuit of the third magnetic-pole portion 42c, the coil B, and the second magnetic-pole portion 42b in the stated order. When the amount of the magnetic flux output from the N-pole of the rotor 41 is represented by φ, the amount of the magnetic flux passing through the coil A is −φ/2, and the amount of the magnetic flux passing through the coil B is also −φ/2.

Now, it is assumed that, as illustrated in FIG. 18(b), a strong impact is applied from the outside so as to rotate the rotor 41 by 180° or more in the clockwise direction, and the N-pole of the rotor 41 is moved to a position of about 330° (−30°). In this case, at a time point at which the N-pole of the rotor 41 passes through the first magnetic-pole portion 42a and the S-pole of the rotor 41 passes through the second magnetic-pole portion 42b, the magnetic flux φ of the rotor 41 passes through the following magnetic circuit. As illustrated in FIG. 18(b), the magnetic flux φ of the rotor 41 passes from the first magnetic-pole portion 42a through the coil A, and enters the coil B to pass through the second magnetic-pole portion 42b.

Regarding the change in magnetic flux at this time, similarly to the case of the first embodiment (see FIG. 8), the magnetic flux of the coil A changes from −½φ to +φ, and hence the change amount is +3/2φ, which is a large change in magnetic flux amount. Meanwhile, the magnetic flux of the coil B changes from −½φ to −φ, and hence the change amount is −½φ, which is a small change in magnetic flux amount.

Further, in the case of the second embodiment, the impact is stronger as described above. Therefore, the rotational speed of the rotation of the rotor 41 caused by the impact is increased. As a result, the speed of the change in magnetic flux is higher in the second embodiment as compared to the first embodiment. Therefore, the counter-electromotive currents generated in the coil A and the coil B are larger in absolute value than the counter-electromotive currents in the first embodiment.

FIG. 18(c) is a schematic waveform chart for illustrating an example of the counter-electromotive current to be induced in the coil A due to the change in amount of the magnetic flux passing through the coil A. The X axis, the Y axis, and the time t0 are the same as in FIG. 17. In FIG. 18(c), the rotor 41 is rotated immediately after the time t0 at which the impact is applied, and thus the magnetic flux passing through the coil A changes from −½φ to +φ. Therefore, the change in magnetic flux amount is large, and a large counter-electromotive current +Ia flows from the coil terminal O1 to the coil terminal O2 of the coil A. Meanwhile, FIG. 18(d) is a waveform chart for illustrating an example of a counter-electromotive current to be induced in the coil B through the change in amount of the magnetic flux passing through the coil B. In FIG. 18(d), the magnetic flux of the coil B changes from −½φ to −φ. Therefore, the change in magnetic flux amount is small, and a small counter-electromotive current −Ib flows from the coil terminal O3 to the coil terminal O4 of the coil B.

As described above, when the N-pole of the rotor 41 is at the stationary position of 180°, and an impact is applied from the outside so as to rotate the rotor 41 in the clockwise direction, a large counter-electromotive current +Ia flows from the coil terminal O1 to the coil terminal O2 of the coil A. Through detection of this counter-electromotive current, application of an impact to the stepper motor 40 and the rotational direction of the rotation caused by the impact can be known.

Further, as described above, when a strong impact is applied, the rotational speed of the rotor 41 is increased, and hence the counter-electromotive currents generated in the coil A and the coil B are increased.

As compared to the counter-electromotive currents of FIG. 9 described in the first embodiment, the counter-electromotive currents generated in the coils A and B in a case where the rotor 41 is rotated by 180° or more in the counterclockwise direction due to a strong impact applied from the outside when the N-pole of the rotor 41 is at the stationary position of 180° have only larger absolute values, and the directions of the counter-electromotive currents are the same. Therefore, description thereof is omitted herein.

As described above, even when the impact applied from the outside is strong and the rotor 41 is rotated by 180° or more, similarly to the first embodiment, the magnitude and the current direction of the counter-electromotive currents generated in the coils A and B are determined in accordance with the stationary position of the rotor 41 and the rotational direction of the rotor 41. Therefore, whether or not an impact is applied and the rotational direction of the rotation of the rotor 41 caused by the impact can be known by detecting the counter-electromotive currents in accordance with the stationary position.

Figure 19:
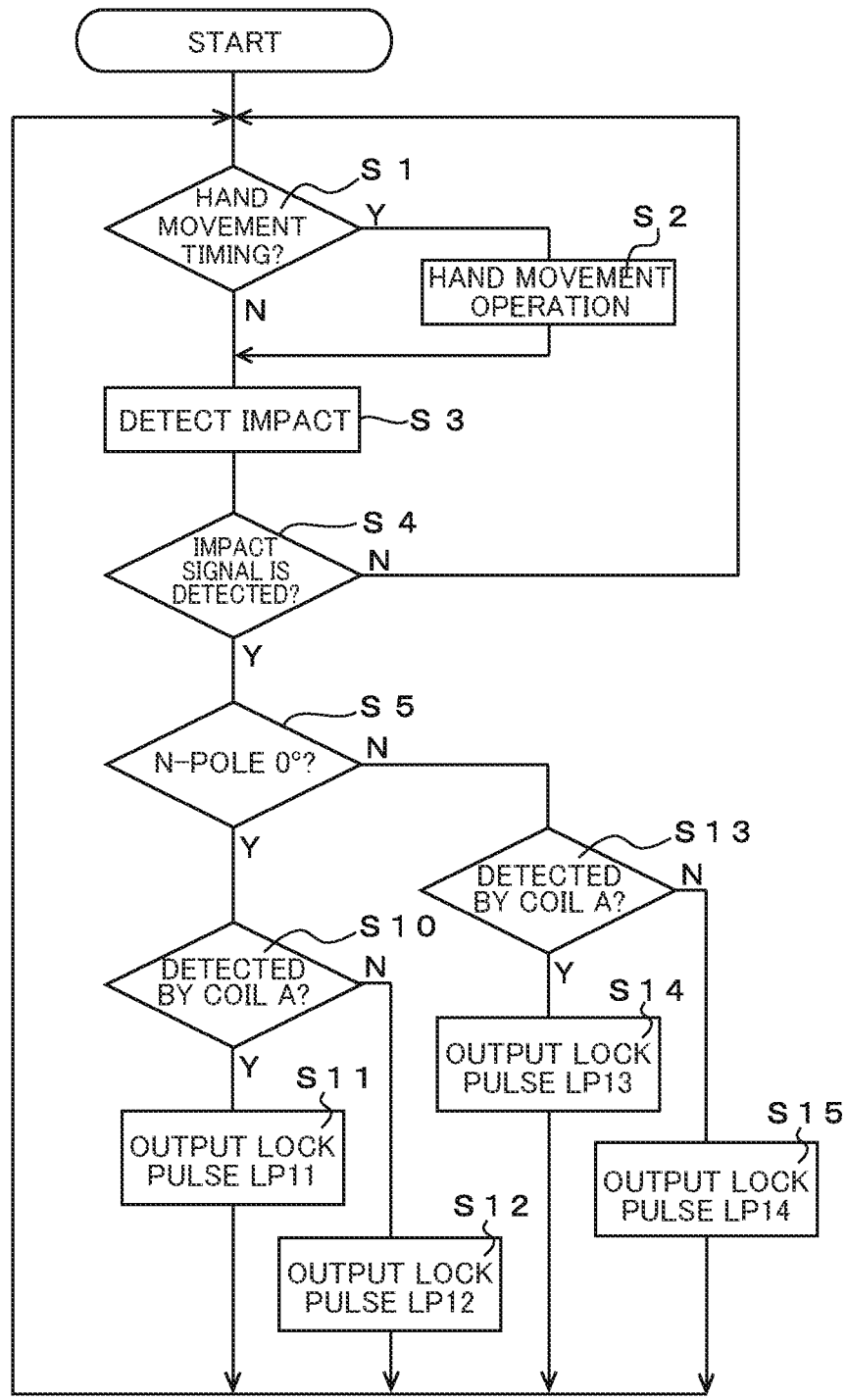
FIG. 19 is a flow chart for illustrating the operation of the drive circuit for a two-coil stepper motor according to the second embodiment of the present invention.
Figure 20:
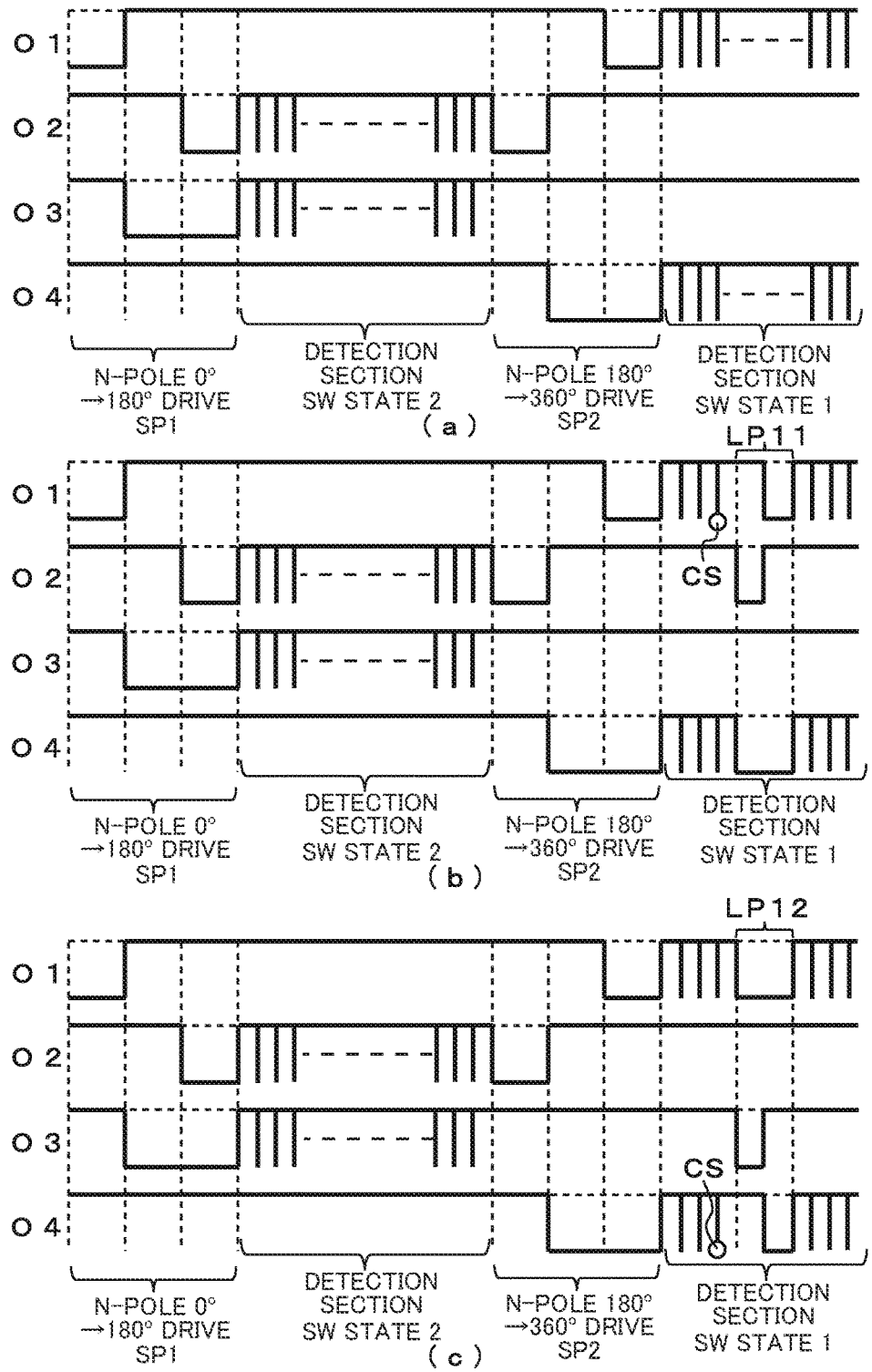
FIG. 20 are timing charts for illustrating lock pulses LP11 and LP12 of the drive circuit for a two-coil stepper motor according to the second embodiment of the present invention.
Figure 21:
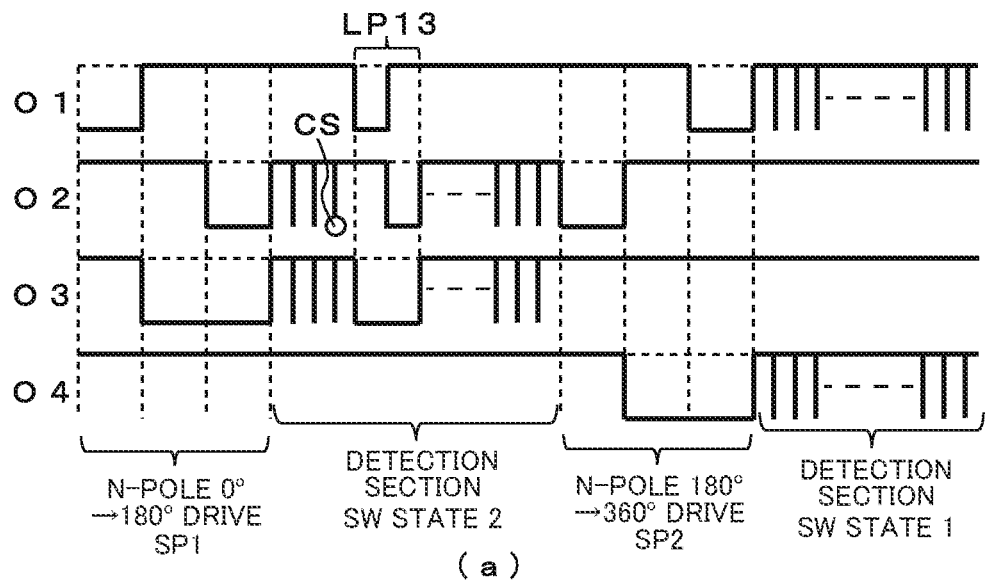
FIG. 21 are timing charts for illustrating lock pulses LP13 and LP14 of the drive circuit for a two-coil stepper motor according to the second embodiment of the present invention.
Figure 21:
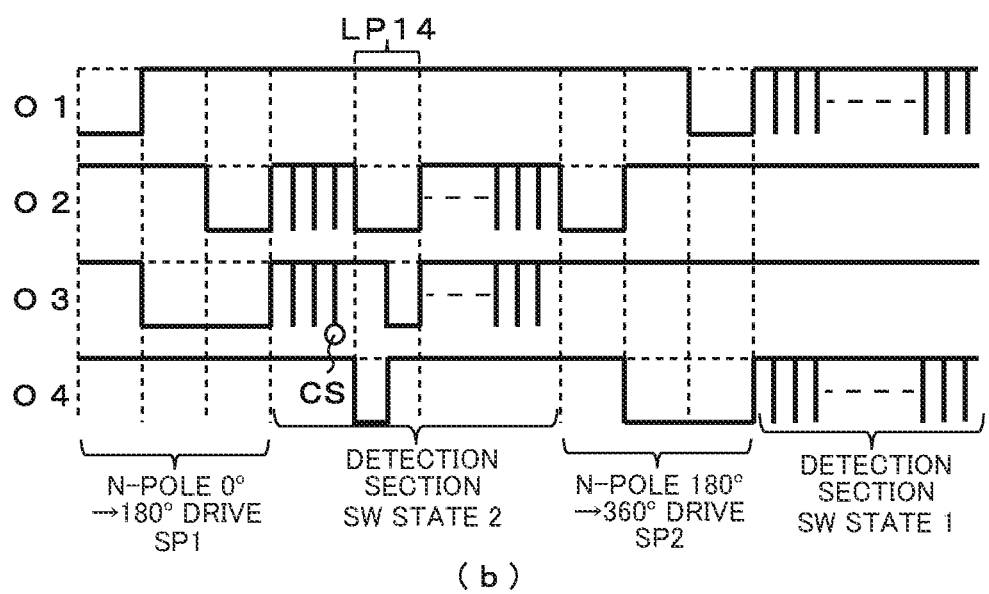

[Description of Operation of Second Embodiment: FIG. 19 to FIGS. 21]

Next, the operation of the drive circuit 100 of the second embodiment is described with reference to the flow chart of FIG. 19 and the timing charts of FIG. 20 and FIG. 21. The timing charts of FIG. 20 and FIG. 21 represent the drive pulse SP, the detection pulse CP, and the lock pulses LP11 to LP14 at the respective coil terminals (drive waveforms) O1, O2, O3, and O4 of the stepper motor 40. FIG. 16 is referred to for the configuration of the drive circuit 100, and description overlapping with the first embodiment is omitted herein. Further, the operation of switching between the SW state 1 and the SW state 2 performed by the driver circuit 20 and the detection circuit 30 is similar to that in the operation table shown in FIG. 10 of the first embodiment, and the detection operation of the detection circuit 30 is also similar to that illustrated in the timing chart of FIG. 11.

In the flow chart of FIG. 19, the operation flow from Step S1 to Step S4 is similar to the operation flow of the first embodiment (see FIG. 12), and hence description thereof is omitted herein. In Step S5 of FIG. 19, when a positive determination is made (N-pole is at 0°), the processing proceeds to Step S10, and when a negative determination is made (N-pole is at 180°), the processing proceeds to Step S13.

In Step S10, the control circuit 3 determines whether or not the impact is detected by the coil A based on the information on the impact signal CK. When a positive determination is made in this step (impact is detected by the coil A: see FIG. 17), the rotor 41 has been rotated in the clockwise direction, and hence the control circuit 3 activates the LP11 generation circuit 51 of the lock pulse generation circuit 50 to output the lock pulse LP11 (Step S11), to thereby brake the rotor 41 of the stepper motor 40 to return the rotor 41 that has been rotated due to the impact to the stationary position of 0°. Then, the processing returns to Step S1, and the operation flow from Step S1 is repeated.

Further, when a negative determination is made (impact is detected by the coil B) in Step S10, the rotor 41 has been rotated in the counterclockwise direction, and hence the control circuit 3 activates the LP12 generation circuit 52 of the lock pulse generation circuit 50 to output the lock pulse LP12 (Step S12), to thereby brake the rotor 41 of the stepper motor 40 to return the rotor 41 that has been rotated due to the impact to the stationary position of 0°. Then, the processing returns to Step S1, and the operation flow from Step S1 is repeated.

Further, when a negative determination is made in Step S5 and the processing proceeds to Step S13, the control circuit 3 determines whether or not the impact is detected by the coil A based on the information on the impact signal CK. When a positive determination is made in this step (impact is detected by the coil A: see FIG. 18), the rotor 41 has been rotated in the clockwise direction, and hence the control circuit 3 activates the LP13 generation circuit 53 of the lock pulse generation circuit 50 to output the lock pulse LP13 (Step S14), to thereby brake the rotor 41 of the stepper motor 40 to return the rotor 41 that has been rotated due to the impact to the stationary position of 180°. Then, the processing returns to Step S1, and the operation flow from Step S1 is repeated.

Further, when a negative determination is made (impact is detected by the coil B) in Step S13, the rotor 41 has been rotated in the counterclockwise direction, and hence the control circuit 3 activates the LP14 generation circuit 54 of the lock pulse generation circuit 50 to output the lock pulse LP14 (Step S15), to thereby brake the rotor 41 of the stepper motor 40 to return the rotor 41 that has been rotated due to the impact to the stationary position of 180°. Then, the processing returns to Step S1, and the operation flow from Step S1 is repeated.

Next, with reference to the timing charts of FIG. 20 and FIG. 21, details of the operation of the second embodiment are described. FIG. 20(*a*) represents the operation of the normal hand movement in which no impact is detected from Step S1 to Step S4 of the operation flow. FIG. 20(*a*) is similar to FIG. 13(*a*) of the first embodiment, and hence description thereof is omitted herein.

The timing chart of FIG. 20(*b*) is an operation example (operation in Step S11) in which the impact is detected by the coil A and the lock pulse LP11 is output when the N-pole of the rotor 41 is at the stationary position of 0°. In FIG. 20(*b*), the N-pole of the rotor 41 is rotated to 180° due to the drive pulse SP1. After that, the impact detection section in the SW state 2 is performed.

Next, the N-pole of the rotor 41 proceeds to 360° (0°) due to the drive pulse SP2. After that, the impact detection section in the SW state 1 is performed. During the impact detection section in the SW state 1, the detection signal CS (marked with a circle) has been detected at the coil terminal O1 of the coil A. That is, the detection signal CS generated at the coil terminal O1 has exceeded the threshold value Vth of the impact determination circuit 31. In this manner, the impact determination circuit 31 outputs the impact signal CK (not shown), and the control circuit 3 immediately outputs the lock pulse LP11 to brake the stepper motor 40. Thus, the N-pole of the rotor 41 returns to 0°.

The timing chart of FIG. 20(*c*) is an operation example (operation in Step S12) in which the impact is detected by the coil B and the lock pulse LP12 is output when the N-pole of the rotor 41 is at the stationary position of 0°. In FIG. 20(*c*), the N-pole of the rotor 41 is rotated to 180° due to the drive pulse SP1. After that, the impact detection section in the SW state 2 is performed.

Next, the N-pole of the rotor 41 proceeds to 360° (0°) due to the drive pulse SP2. After that, the impact detection section in the SW state 1 is performed. During the impact detection section in the SW state 1, the detection signal CS (marked with a circle) has been detected at the coil terminal O4 of the coil B. That is, the detection signal CS generated at the coil terminal O4 has exceeded the threshold value Vth of the impact determination circuit 31. In this manner, the impact determination circuit 31 outputs the impact signal CK (not shown), and the control circuit 3 immediately outputs the lock pulse LP12 to brake the stepper motor 40. Thus, the N-pole of the rotor 41 returns to 0°.

The timing chart of FIG. 21(*a*) is an operation example (operation in Step S14) in which the impact is detected by the coil A and the lock pulse LP13 is output when the N-pole of the rotor 41 is at the stationary position of 180°. In FIG. 21(*a*), the N-pole of the rotor 41 is rotated to 180° due to the drive pulse SP1. After that, the impact detection section in the SW state 2 is performed.

During the impact detection section in the SW state 2, the detection signal CS (marked with a circle) has been detected at the coil terminal O2 of the coil A. That is, the detection signal CS generated at the coil terminal O2 has exceeded the threshold value Vth of the impact determination circuit 31.

In this manner, the impact determination circuit 31 outputs the impact signal CK (not shown), and the control circuit 3 immediately outputs the lock pulse LP13 to brake the stepper motor 40. Thus, the N-pole of the rotor 41 returns to 180°.

After that, the impact detection section in the SW state 2 is continued. Next, the N-pole of the rotor 41 proceeds to 360° (0°) due to the drive pulse SP2. After that, the impact detection section in the SW state 1 is performed.

The timing chart of FIG. 21(b) is an operation example (operation in Step S15) in which the impact is detected by the coil B and the lock pulse LP14 is output when the N-pole of the rotor 41 is at the stationary position of 180°. In FIG. 21(b), the N-pole of the rotor 41 is rotated to 180° due to the drive pulse SP1. After that, the impact detection section in the SW state 2 is performed.

During the impact detection section in the SW state 2, the detection signal CS (marked with a circle) has been detected at the coil terminal O3 of the coil B. That is, the detection signal CS generated at the coil terminal O3 has exceeded the threshold value Vth of the impact determination circuit 31. In this manner, the impact determination circuit 31 outputs the impact signal CK (not shown), and the control circuit 3 immediately outputs the lock pulse LP14 to brake the stepper motor 40. Thus, the N-pole of the rotor 41 returns to 180°.

After that, the impact detection section in the SW state 2 is continued. Next, the N-pole of the rotor 41 proceeds to) 360° (0° due to the drive pulse SP2. After that, the impact detection section in the SW state 1 is performed.

Figure 22:
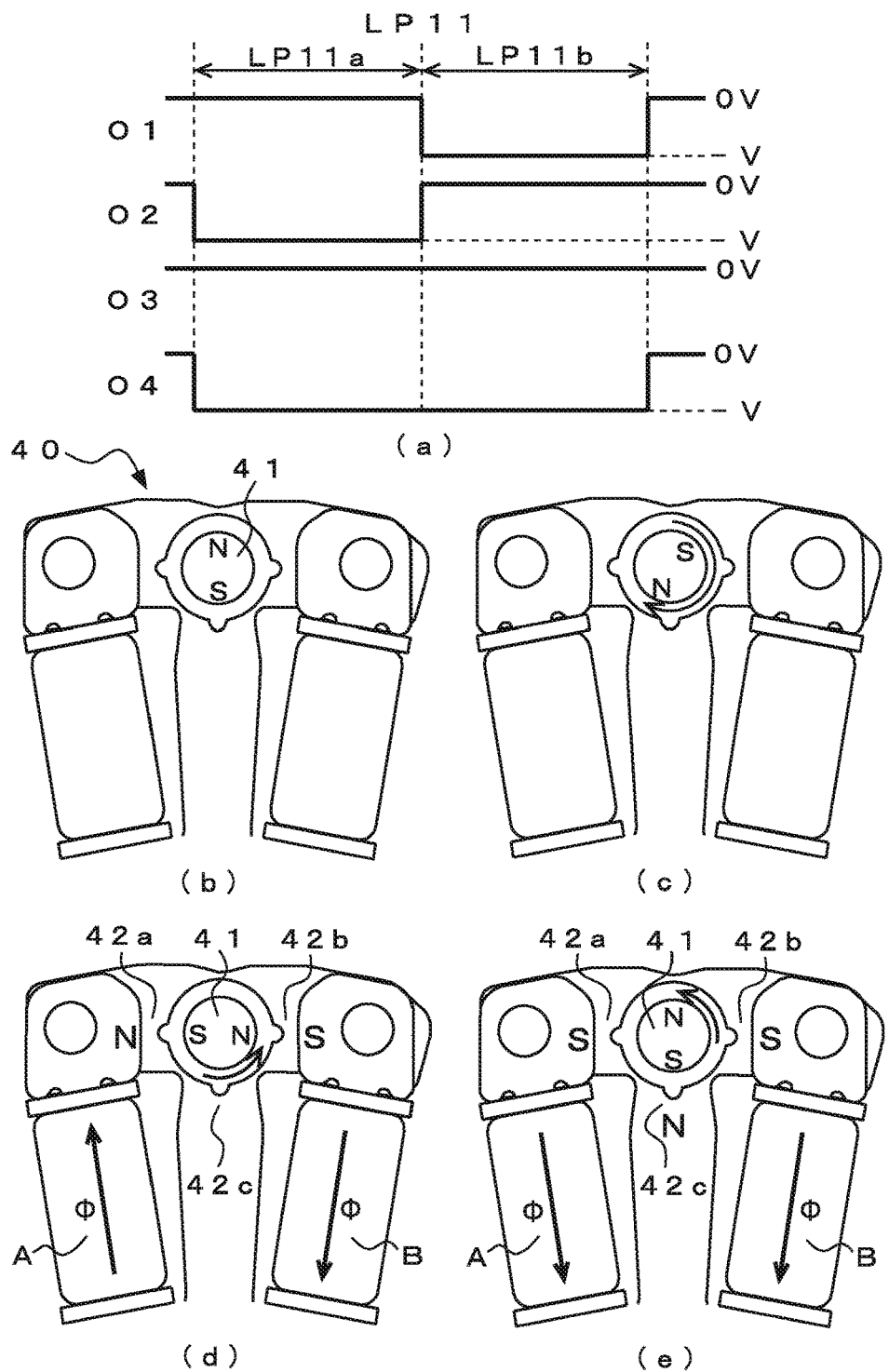
FIG. 22 are explanatory diagrams for illustrating braking of the rotor based on the lock pulse LP11 when the N-pole of the rotor according to the second embodiment of the present invention, which is positioned at 0°, is rotated in the clockwise direction due to an impact.

[Description of Lock Pulse LP11 of Second Embodiment: FIGS. 22]

Next, with reference to FIG. 22, description is given of the waveform and the operation of the lock pulse LP11 for braking the rotor 41 rotated by 180° or more in the clockwise direction due to the impact when the N-pole of the rotor 41 is at the stationary position of 0°. FIG. 22(a) is an example of the drive waveform of the lock pulse LP11. In FIG. 22(a), similarly to the drive pulse SP, the lock pulse LP11 has potentials of 0 V (VDD) and −V (for example, −1.5 V). The lock pulses LP12 to LP14 to be described later also have similar potentials.

The lock pulse LP11 includes a first lock pulse LP11a and a second lock pulse LP11b. In the first lock pulse LP11a, the potentials at the coil terminal O1 and the coil terminal O2 of the coil A become 0 V and −V, respectively, and the potentials at the coil terminal O3 and the coil terminal O4 of the coil B become 0 V and −V, respectively. In the second lock pulse LP11b, the potentials at the coil terminal O1 and the coil terminal O2 of the coil A become −V and 0 V, respectively, and the potentials at the coil terminal O3 and the coil terminal O4 of the coil B become 0 V and −V, respectively.

The output period of the lock pulse LP11 is set to a period necessary for braking the rotor 41. Further, a period in the latter half of each of the first and second lock pulses LP11a and LP11b may exhibit chopper output as necessary as in the lock pulses LP1 and LP2 of the first embodiment. The same holds true for the output periods and the chopper output in the latter half of the lock pulses LP12, LP13, and LP14 to be described later.

Next, with reference to FIG. 22(b) to FIG. 22(e), description is given of how to brake and return the rotation of the rotor 41 that has been rotated due to the impact based on the lock pulse LP11. FIG. 22(b) represents a state in which the N-pole of the rotor 41 of the stepper motor 40 is at the stationary position of 0°.

FIG. 22(c) represents a state in which, in the stationary state of the rotor 41 illustrated in FIG. 22(b), a strong impact is applied to the stepper motor 40 from the outside, the rotor 41 is thus rotated by 180° or more in the clockwise direction, and the N-pole is moved to a position of about 150°, for example. In this case, as described above with reference to FIG. 17, the counter-electromotive current −Ia is generated in the coil A in the negative direction, and the detection signal CS is detected from the coil terminal O1 (see FIG. 20(b)).

FIG. 22(d) represents how the rotor 41 is braked when an impact is applied to the stepper motor 40, and the first lock pulse LP11a of the lock pulse LP11 is supplied to the stepper motor 40 at the position of the rotor 41 of FIG. 22(c).

In this case, when the lock pulse LP11a is supplied to the stepper motor 40, a drive current flows from the coil terminal O1 to the coil terminal O2 of the coil A, and a magnetic flux φ is generated in the coil A upward in FIG. 22(d). Similarly, a drive current flows from the coil terminal O3 to the coil terminal O4 of the coil B, and a magnetic flux φ is generated in the coil B downward in FIG. 22(d).

With this, the first magnetic-pole portion 42a and the second magnetic-pole portion 42b are magnetized to the N-pole and the S-pole, respectively. As a result, the N-pole of the rotor 41 and the S-pole of the second magnetic-pole portion 42b attract each other, and the S-pole of the rotor 41 and the N-pole of the first magnetic-pole portion 42a attract each other, so that the N-pole of the rotor 41 is braked to be returned to the position of about 270°.

Next, FIG. 22(e) represents how the rotor 41 is braked when the second lock pulse LP11b of the lock pulse LP11 is supplied to the stepper motor 40 at the position of the rotor 41 of FIG. 22(d) (about 270°).

In this case, when the lock pulse LP11b is supplied to the stepper motor 40, the polarity of the drive current flowing through the coil A is reversed, and a drive current flows from the coil terminal O2 to the coil terminal O1, to thereby generate a magnetic flux φ in the coil A downward in FIG. 22(e). Further, the direction of the drive current flowing through the coil B does not change, and hence the magnetic flux φ is continuously generated in the coil B downward in FIG. 22(e).

With this, the first magnetic-pole portion 42a and the second magnetic-pole portion 42b are magnetized to the S-pole, and the third magnetic-pole portion 42c is magnetized to the N-pole. As a result, the S-pole of the rotor 41 and the N-pole of the third magnetic-pole portion 42c attract each other so that the N-pole of the rotor 41 is braked to be returned to the original stationary position of 0°.

Figure 23:
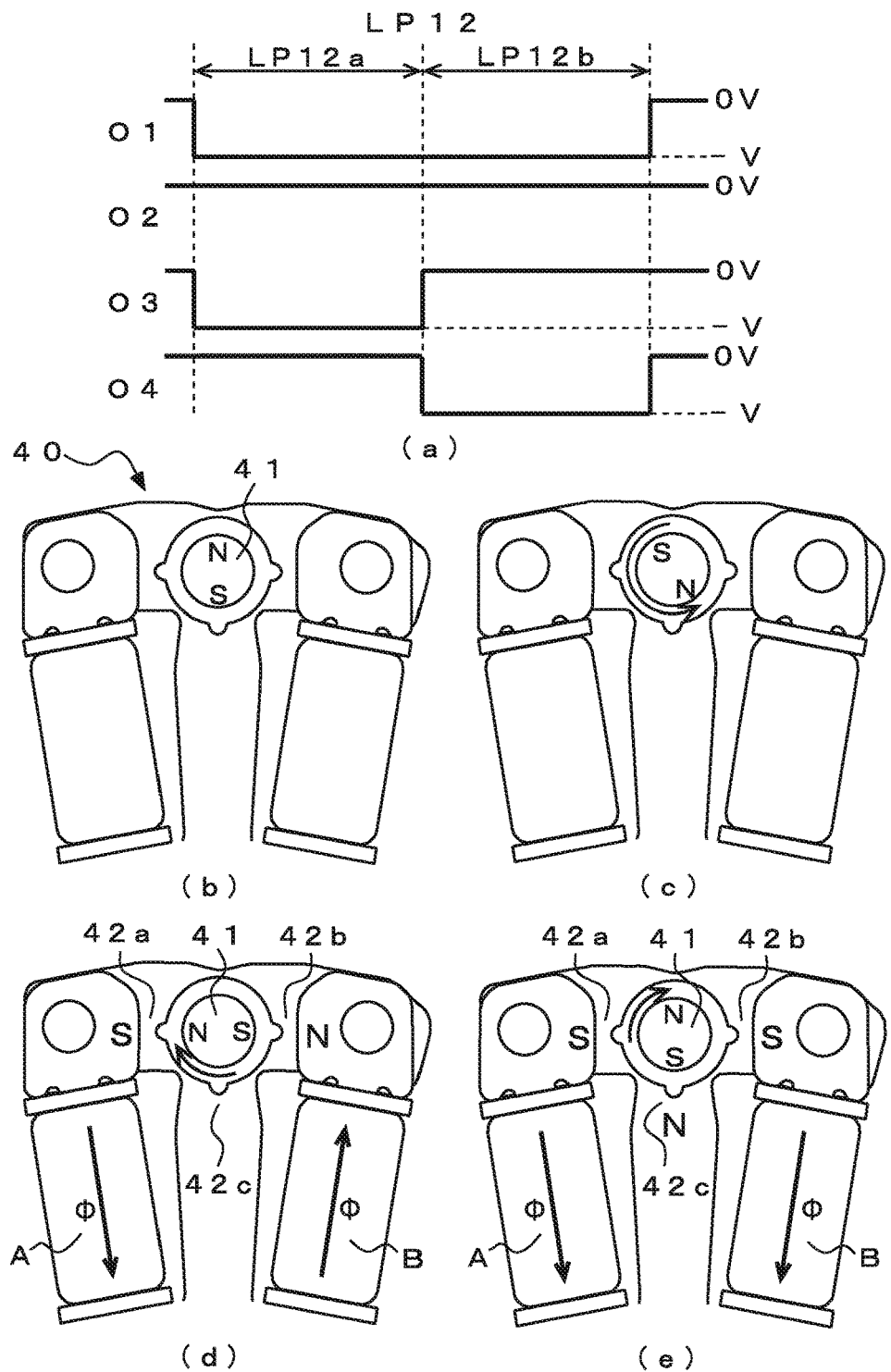
FIG. 23 are explanatory diagrams for illustrating braking of the rotor based on the lock pulse LP12 when the N-pole of the rotor according to the second embodiment of the present invention, which is positioned at 0°, is rotated in the counterclockwise direction due to an impact.

[Description of Lock Pulse LP12 of Second Embodiment: FIGS. 23]

Next, with reference to FIG. 23, description is given of the waveform and the operation of the lock pulse LP12 for braking the rotor 41 rotated by 180° or more in the counterclockwise direction due to the impact when the N-pole of the rotor 41 is at the stationary position of 0°. FIG. 23(a) is an example of the drive waveform of the lock pulse LP12.

In FIG. 23(a), the lock pulse LP12 includes a first lock pulse LP12a and a second lock pulse LP12b. In the first lock pulse LP12a, the potentials at the coil terminal O1 and the coil terminal O2 of the coil A become −V and 0 V, respectively, and the potentials at the coil terminal O3 and the coil terminal O4 of the coil B become −V and 0 V, respectively. In the second lock pulse LP12b, the potentials at the coil terminal O1 and the coil terminal O2 of the coil A become −V and 0 V, respectively, and the potentials at the coil terminal O3 and the coil terminal O4 of the coil B become 0 V and −V, respectively.

Next, with reference to FIG. 23(b) to FIG. 23(e), description is given of how to brake and return the rotation of the rotor 41 that has been rotated due to the impact based on the lock pulse LP12. FIG. 23(b) represents a state in which the N-pole of the rotor 41 of the stepper motor 40 is at the stationary position of 0°.

FIG. 23(c) represents a state in which, in the stationary state of the rotor 41 illustrated in FIG. 23(b), a strong impact is applied to the stepper motor 40 from the outside, the rotor 41 is thus rotated by 180° or more in the counterclockwise direction, and the N-pole is moved to a position of about 210°, for example. In this case, the counter-electromotive current −Ib is generated in the coil B in the negative direction, and the detection signal CS is detected from the coil terminal O4 (see FIG. 20(c)).

FIG. 23(d) represents how the rotor 41 is braked when an impact is applied to the stepper motor 40, and the first lock pulse LP12a of the lock pulse LP12 is supplied to the stepper motor 40 at the position of the rotor 41 of FIG. 23(c).

In this case, when the lock pulse LP12a is supplied to the stepper motor 40, a drive current flows from the coil terminal O2 to the coil terminal O1 of the coil A, and a magnetic flux φ is generated in the coil A downward in FIG. 23(d). Similarly, a drive current flows from the coil terminal O4 to the coil terminal O3 of the coil B, and a magnetic flux φ is generated in the coil B upward in FIG. 23(d).

With this, the first magnetic-pole portion 42a and the second magnetic-pole portion 42b are magnetized to the S-pole and the N-pole, respectively. As a result, the N-pole of the rotor 41 and the S-pole of the first magnetic-pole portion 42a attract each other, and the S-pole of the rotor 41 and the N-pole of the second magnetic-pole portion 42b attract each other, so that the N-pole of the rotor 41 is braked to be returned to the position of about 90°.

Next, FIG. 23(e) represents how the rotor 41 is braked when the second lock pulse LP12b of the lock pulse LP12 is supplied to the stepper motor 40 at the position of the rotor 41 of FIG. 23(d) (about 90°).

In this case, when the lock pulse LP12b is supplied to the stepper motor 40, the direction of the drive current flowing through the coil A does not change, and hence the magnetic flux φ is continuously generated in the coil A downward in FIG. 23(e). Further, the polarity of the drive current flowing through the coil B is reversed, and a drive current flows from the coil terminal O3 to the coil terminal O4, to thereby generate a magnetic flux φ in the coil B downward in FIG. 23(e).

With this, the first magnetic-pole portion 42a and the second magnetic-pole portion 42b are magnetized to the S-pole, and the third magnetic-pole portion 42c is magnetized to the N-pole. As a result, the S-pole of the rotor 41 and the N-pole of the third magnetic-pole portion 42c attract each other so that the N-pole of the rotor 41 is braked to be returned to the original stationary position of 0°.

Figure 24:
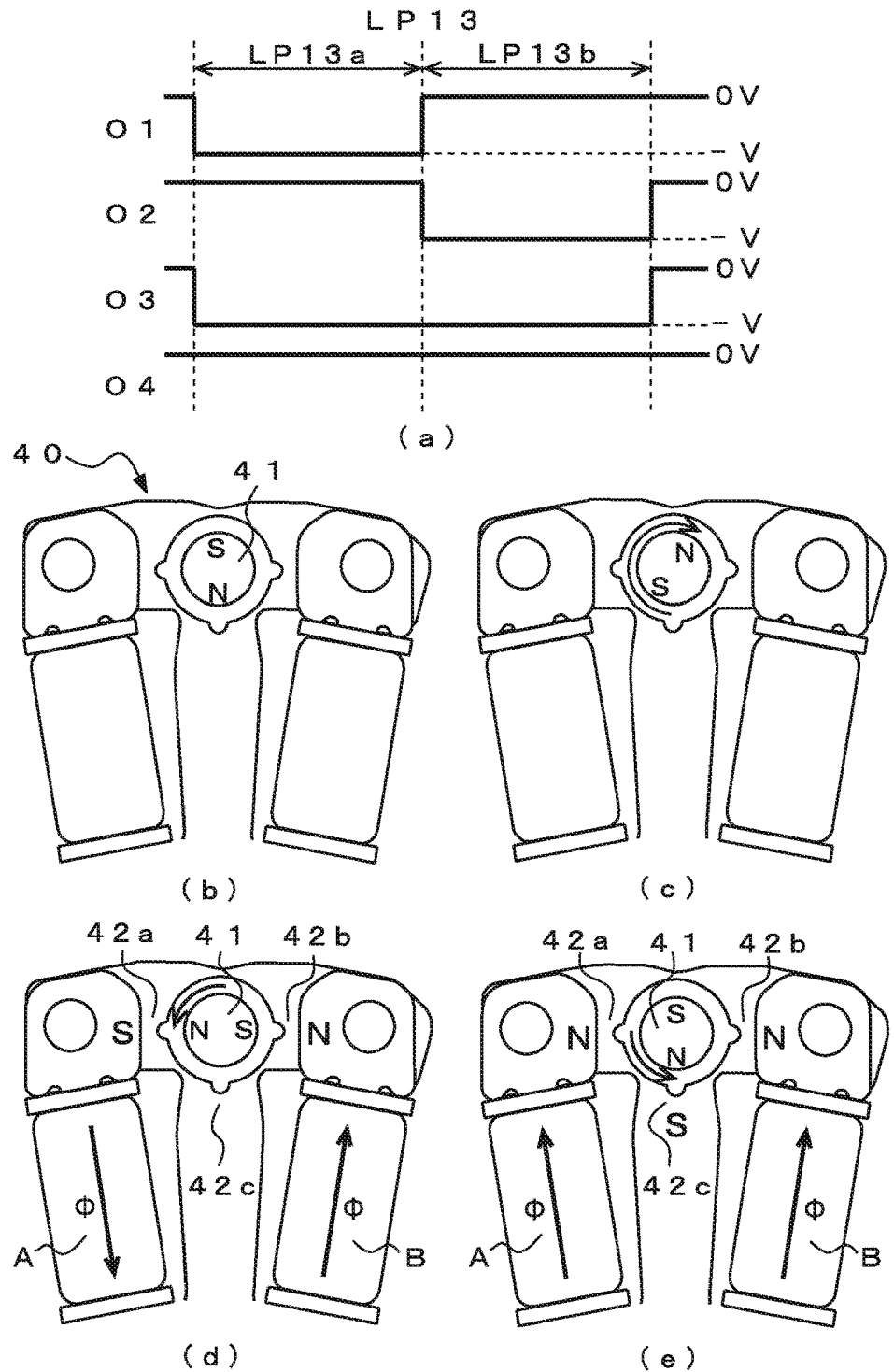
FIG. 24 are explanatory diagrams for illustrating braking of the rotor based on the lock pulse LP13 when the N-pole of the rotor according to the second embodiment of the present invention, which is positioned at 180°, is rotated in the clockwise direction due to an impact.

[Description of Lock Pulse LP13 of Second Embodiment: FIGS. 24]

Next, with reference to FIG. 24, description is given of the waveform and the operation of the lock pulse LP13 for braking the rotor 41 rotated by 180° or more in the clockwise direction due to the impact when the N-pole of the rotor 41 is at the stationary position of 180°. FIG. 24(a) is an example of the drive waveform of the lock pulse LP13.

In FIG. 24(a), the lock pulse LP13 includes a first lock pulse LP13a and a second lock pulse LP13b. In the first lock pulse LP13a, the potentials at the coil terminal O1 and the coil terminal O2 of the coil A become −V and 0 V, respectively, and the potentials at the coil terminal O3 and the coil terminal O4 of the coil B become −V and 0 V, respectively. In the second lock pulse LP13b, the potentials at the coil terminal O1 and the coil terminal O2 of the coil A become 0 V and −V, respectively, and the potentials at the coil terminal O3 and the coil terminal O4 of the coil B become −V and 0 V, respectively.

Next, with reference to FIG. 24(b) to FIG. 24(e), description is given of how to brake and return the rotation of the rotor 41 that has been rotated due to the impact based on the lock pulse LP13. FIG. 24(b) represents a state in which the N-pole of the rotor 41 of the stepper motor 40 is at the stationary position of 180°.

FIG. 24(c) represents a state in which, in the stationary state of the rotor 41 illustrated in FIG. 24(b), a strong impact is applied to the stepper motor 40 from the outside, the rotor 41 is thus rotated by 180° or more in the clockwise direction, and the N-pole is moved to a position of about 330° (−30°), for example. In this case, as described above with reference to FIG. 18, the counter-electromotive current +Ia is generated in the coil A in the positive direction, and the detection signal CS is detected from the coil terminal O2 (see FIG. 21(a)).

FIG. 24(d) represents how the rotor 41 is braked when an impact is applied to the stepper motor 40, and the first lock pulse LP13a of the lock pulse LP13 is supplied to the stepper motor 40 at the position of the rotor 41 of FIG. 24(c).

In this case, when the lock pulse LP13a is supplied to the stepper motor 40, a drive current flows from the coil terminal O2 to the coil terminal O1 of the coil A, and a magnetic flux φ is generated in the coil A downward in FIG. 24(d). Similarly, a drive current flows from the coil terminal O4 to the coil terminal O3 of the coil B, and a magnetic flux φ is generated in the coil B upward in FIG. 24(d).

With this, the first magnetic-pole portion 42a and the second magnetic-pole portion 42b are magnetized to the S-pole and the N-pole, respectively. As a result, the N-pole of the rotor 41 and the S-pole of the first magnetic-pole portion 42a attract each other, and the S-pole of the rotor 41 and the N-pole of the second magnetic-pole portion 42b attract each other, so that the N-pole of the rotor 41 is braked to be returned to the position of about 90°.

Next, FIG. 24(e) represents how the rotor 41 is braked when the second lock pulse LP13b of the lock pulse LP13 is supplied to the stepper motor 40 at the position of the rotor 41 of FIG. 24(d) (about 90°).

In this case, when the lock pulse LP13b is supplied to the stepper motor 40, the polarity of the drive current flowing through the coil A is reversed, and a drive current flows from the coil terminal O1 to the coil terminal O2, to thereby generate a magnetic flux φ in the coil A upward in FIG. 24(e). Further, the direction of the drive current flowing through the coil B does not change, and hence the magnetic flux φ is continuously generated in the coil B upward in FIG. 24(e).

With this, the first magnetic-pole portion 42a and the second magnetic-pole portion 42b are magnetized to the N-pole, and the third magnetic-pole portion 42c is magnetized to the S-pole. As a result, the N-pole of the rotor 41 and the S-pole of the third magnetic-pole portion 42c attract each other so that the N-pole of the rotor 41 is braked to be returned to the original stationary position of 180°.

Figure 25:
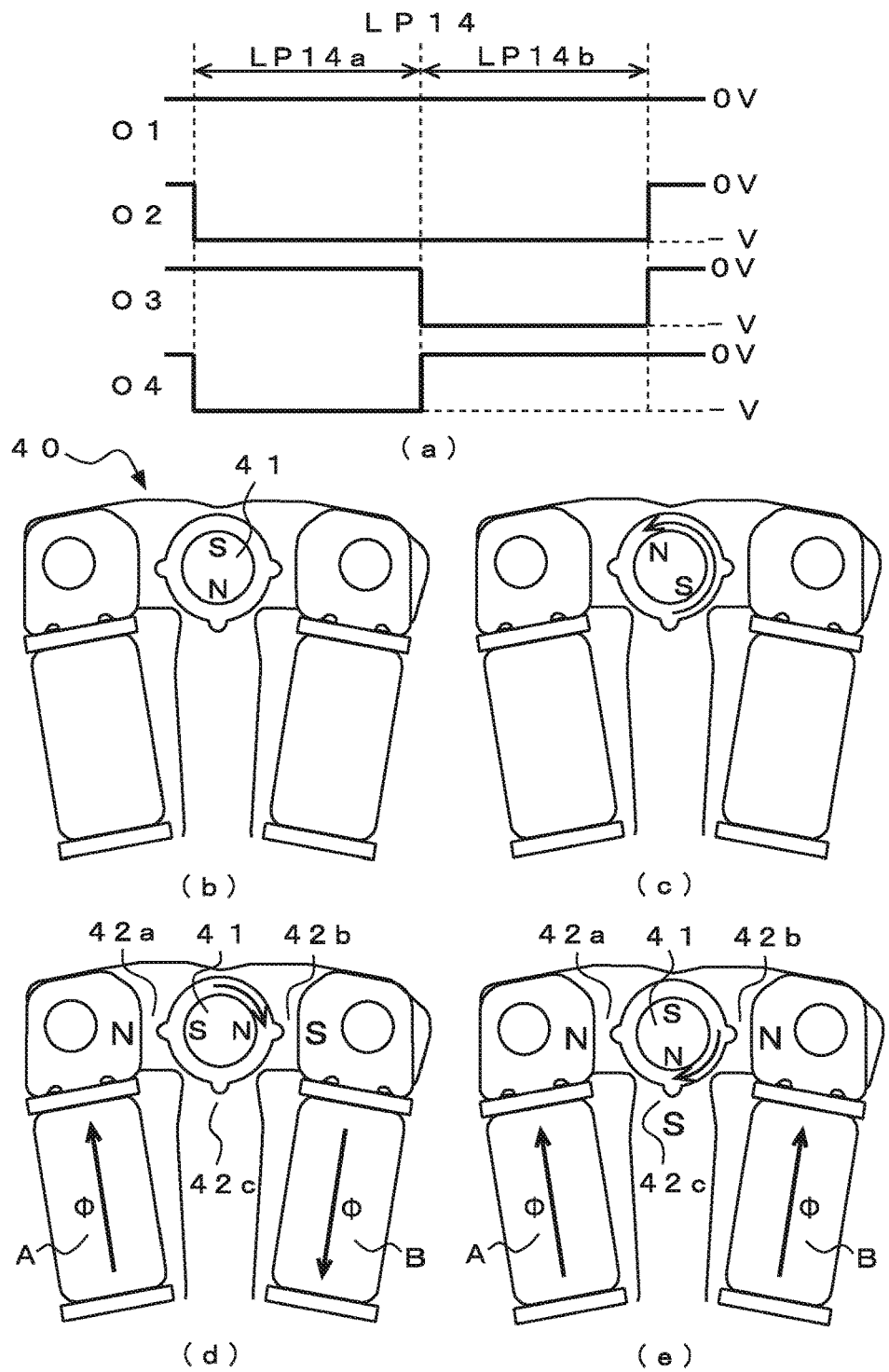
FIG. 25 are explanatory diagrams for illustrating braking of the rotor based on the lock pulse LP14 when the N-pole of the rotor according to the second embodiment of the present invention, which is positioned at 180°, is rotated in the counterclockwise direction due to an impact.

[Description of Lock Pulse LP14 of Second Embodiment: FIGS. 25]

Next, with reference to FIG. 25, description is given of the waveform and the operation of the lock pulse LP14 for braking the rotor 41 rotated by 180° or more in the counterclockwise direction due to the impact when the N-pole of the rotor 41 is at the stationary position of 180°. FIG. 25(a) is an example of the drive waveform of the lock pulse LP14.

In FIG. 25(a), the lock pulse LP14 includes a first lock pulse LP14a and a second lock pulse LP14b. In the first lock pulse LP14a, the potentials at the coil terminal O1 and the coil terminal O2 of the coil A become 0 V and −V, respectively, and the potentials at the coil terminal O3 and the coil terminal O4 of the coil B become 0 V and −V, respectively. In the second lock pulse LP14b, the potentials at the coil terminal O1 and the coil terminal O2 of the coil A become 0 V and −V, respectively, and the potentials at the coil terminal O3 and the coil terminal O4 of the coil B become −V and 0 V, respectively.

Next, with reference to FIG. 25(b) to FIG. 25(e), description is given of how to brake and return the rotation of the rotor 41 that has been rotated due to the impact based on the lock pulse LP14. FIG. 25(b) represents a state in which the N-pole of the rotor 41 of the stepper motor 40 is at the stationary position of 180°.

FIG. 25(c) represents a state in which, in the stationary state of the rotor 41 illustrated in FIG. 25(b), a strong impact is applied to the stepper motor 40 from the outside, the rotor 41 is thus rotated by 180° or more in the counterclockwise direction, and the N-pole is moved to a position of about 30°, for example. In this case, the counter-electromotive current is generated in the coil B in the positive direction, and the detection signal CS is detected from the coil terminal O3 (see FIG. 21(b)).

FIG. 25(d) represents how the rotor 41 is braked when an impact is applied to the stepper motor 40, and the first lock pulse LP14a of the lock pulse LP14 is supplied to the stepper motor 40 at the position of the rotor 41 of FIG. 25(c).

In this case, when the lock pulse LP14a is supplied to the stepper motor 40, a drive current flows from the coil terminal O1 to the coil terminal O2 of the coil A, and a magnetic flux $\varphi$ is generated in the coil A upward in FIG. 25(d). Similarly, a drive current flows from the coil terminal O3 to the coil terminal O4 of the coil B, and a magnetic flux $\varphi$ is generated in the coil B downward in FIG. 25(d).

With this, the first magnetic-pole portion 42a and the second magnetic-pole portion 42b are magnetized to the N-pole and the S-pole, respectively. As a result, the N-pole of the rotor 41 and the S-pole of the second magnetic-pole portion 42b attract each other, and the S-pole of the rotor 41 and the N-pole of the first magnetic-pole portion 42a attract each other, so that the N-pole of the rotor 41 is braked to be returned to the position of about 270°.

Next, FIG. 25(e) represents how the rotor 41 is braked when the second lock pulse LP14b of the lock pulse LP14 is supplied to the stepper motor 40 at the position of the rotor 41 of FIG. 25(d) (about 270°).

In this case, when the lock pulse LP14b is supplied to the stepper motor 40, the direction of the drive current flowing through the coil A does not change, and hence the magnetic flux $\varphi$ is continuously generated in the coil A upward in FIG. 25(e). Further, the polarity of the drive current flowing through the coil B is reversed, and a drive current flows from the coil terminal O4 to the coil terminal O3, to thereby generate a magnetic flux $\varphi$ in the coil B upward in FIG. 25(e).

With this, the first magnetic-pole portion 42a and the second magnetic-pole portion 42b are magnetized to the N-pole, and the third magnetic-pole portion 42c is magnetized to the S-pole. As a result, the N-pole of the rotor 41 and the S-pole of the third magnetic-pole portion 42c attract each other so that the N-pole of the rotor 41 is braked to be returned to the original stationary position of 180°.

As described above, in the second embodiment, the two coils A and B are simultaneously used as detection coils to detect the impact. When the impact is detected, the lock pulses LP11 to LP14 are selectively output in accordance with the stationary position of the rotor 41 and the rotational direction of the rotation of the rotor 41 caused by the impact, and the two coils A and B are simultaneously excited. In this manner, the stepper motor 40 can be reliably braked.

The second lock pulses LP11b to LP14b of the lock pulses LP11 to LP14 have the same specification as that of the small drive pulse output at the end in the drive pulse SP (see FIG. 20 and FIG. 21). In this manner, the second lock pulse that is based on the stationary position of the rotor 41 after drive based on the drive pulse SP is supplied to the stepper motor 40 to brake the rotor 41. Therefore, the rotor 41 that has been rotated by 180° or more due to an impact can be reliably returned to the original stationary position (stationary position immediately after the drive based on the drive pulse SP).

As described above, according to the drive circuit for a two-coil stepper motor of the second embodiment, the two coils A and B of the stepper motor are both simultaneously used as detection coils. In this manner, even when the rotor is rotated by 180° or more due to a strong impact, whether or not the impact is applied and the rotational direction of the rotation of the rotor caused by the impact can be immediately recognized. In this manner, there can be provided a drive circuit for a two-coil stepper motor capable of selectively outputting a lock pulse in accordance with the stationary position of the rotor and the rotational direction the rotation caused by the impact, to thereby accurately brake the stepper motor.

Further, the lock pulse described in the second embodiment includes the first lock pulse and the second lock pulse. In any one of the coil A and the coil B, the first lock pulse and the second lock pulse are used to cause the drive current to flow through the coil in reversed and different polarities.

With this, even when the rotor is rotated by 180° or more due to a strong impact, the lock pulse including the first lock pulse and the second lock pulse is supplied to the stepper motor, and hence the magnetization of each magnetic-pole portion of the stator of the stepper motor is switched at two stages. Thus, the rotor that has been rotated by 180° or more can be reliably returned to the original stationary position.

Further, in the second embodiment, the rotor can be returned to the original stationary position even when the rotor is rotated by 180° or more. Therefore, when the present invention is applied to an analog indication electronic clock, relatively large hands that are susceptible to an impact can be used. Thus, an electronic clock excellent in impact resistance and visibility of analog indication can be provided.

Further, the lock pulse generated by the drive circuit of the second embodiment can reliably brake the rotor even when the impact is relatively weak and thus the rotor is rotated by 180° or less. Therefore, there can be provided a drive circuit for a two-coil stepper motor capable of braking the rotor regardless of the strength of the impact.

[Third Embodiment]

Figure 26:
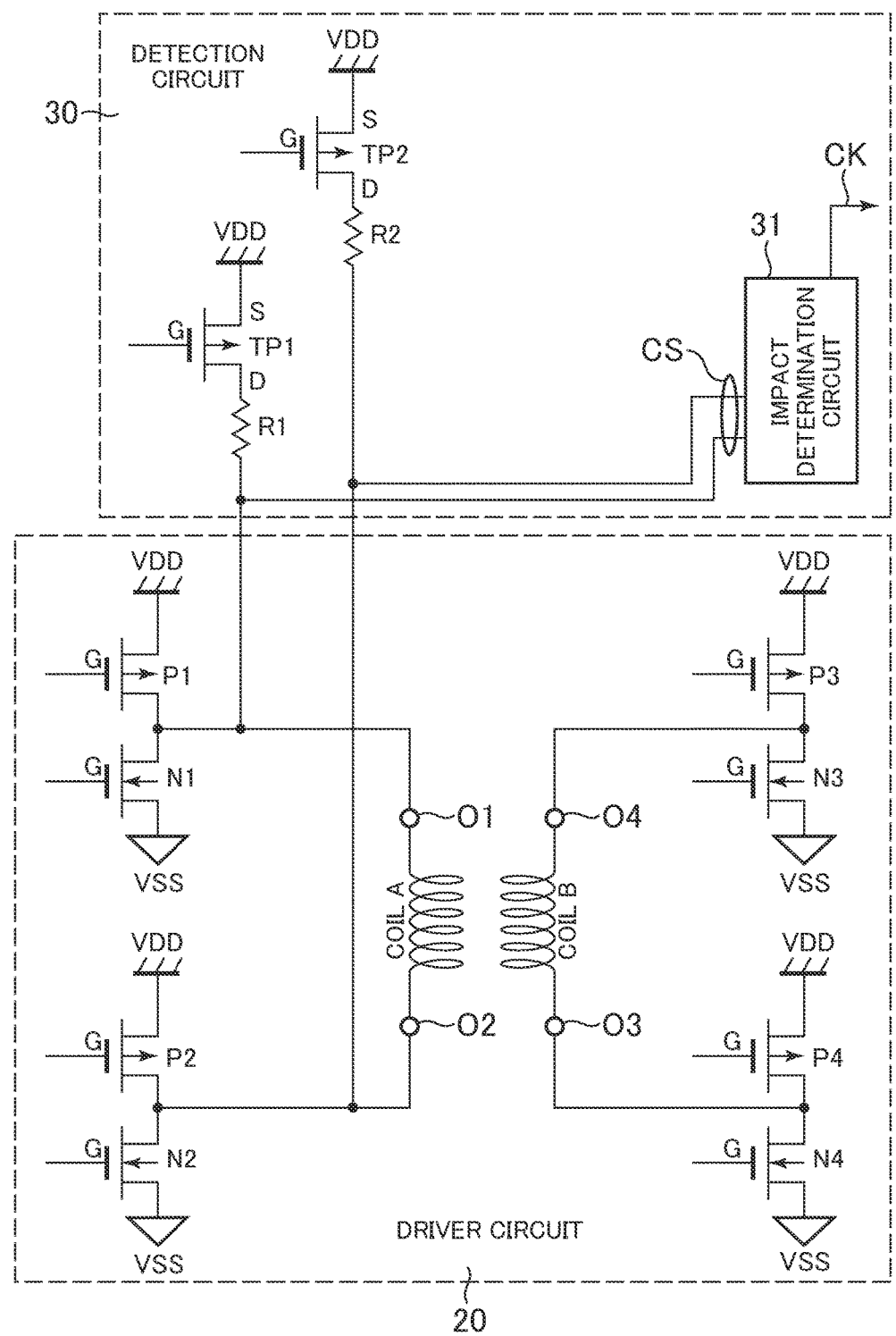
FIG. 26 is a circuit diagram for illustrating a driver circuit and a detection circuit according to a third embodiment of the present invention.

[Description of Circuit Configurations of Driver Circuit and Detection Circuit of Third Embodiment: FIG. 26]

Next, the circuit configurations of the driver circuit 20 and the detection circuit 30 of a third embodiment of the present invention are described with reference to FIG. 26. The third embodiment differs from the first embodiment in the circuit configuration of the detection circuit 30 configured to detect the movement of the rotor 41. Specifically, the detection circuit on the coil B side, that is, the transistors TP3 and TP4, the detection resistors R3 and R4, and the wiring for connecting those transistors and resistors to the coil B and the impact determination circuit 31, which are illustrated in FIG. 5, are not provided. The third embodiment is similar to the first embodiment in that the source terminals S of the transistors TP1 and TP2 are connected to the power supply VDD, the drain terminals D thereof are connected to one terminal of the detection resistor R1 and one terminal of the detection resistor R2, respectively, and the other terminal of the detection resistor R1 and the other terminal of the detection resistor R2 are connected to the coil terminal O1 and the coil terminal O2 of the coil A, respectively. Further, other components are similar to those of the first embodiment, and hence overlapping components are denoted by like reference symbols to omit the description thereof.

In the third embodiment, the basic operation of the stepper motor 40, the rotation of the rotor caused by the impact, and the generation state of the counter-electromotive currents caused by the rotation are similar to those in the first embodiment described above with reference to FIG. 3, FIG. 4, and FIG. 6 to FIG. 9. In the third embodiment, points different from the first embodiment, that is, the configuration and the operation for detecting the movement of the rotor 41, are mainly described below.

Figure 28:
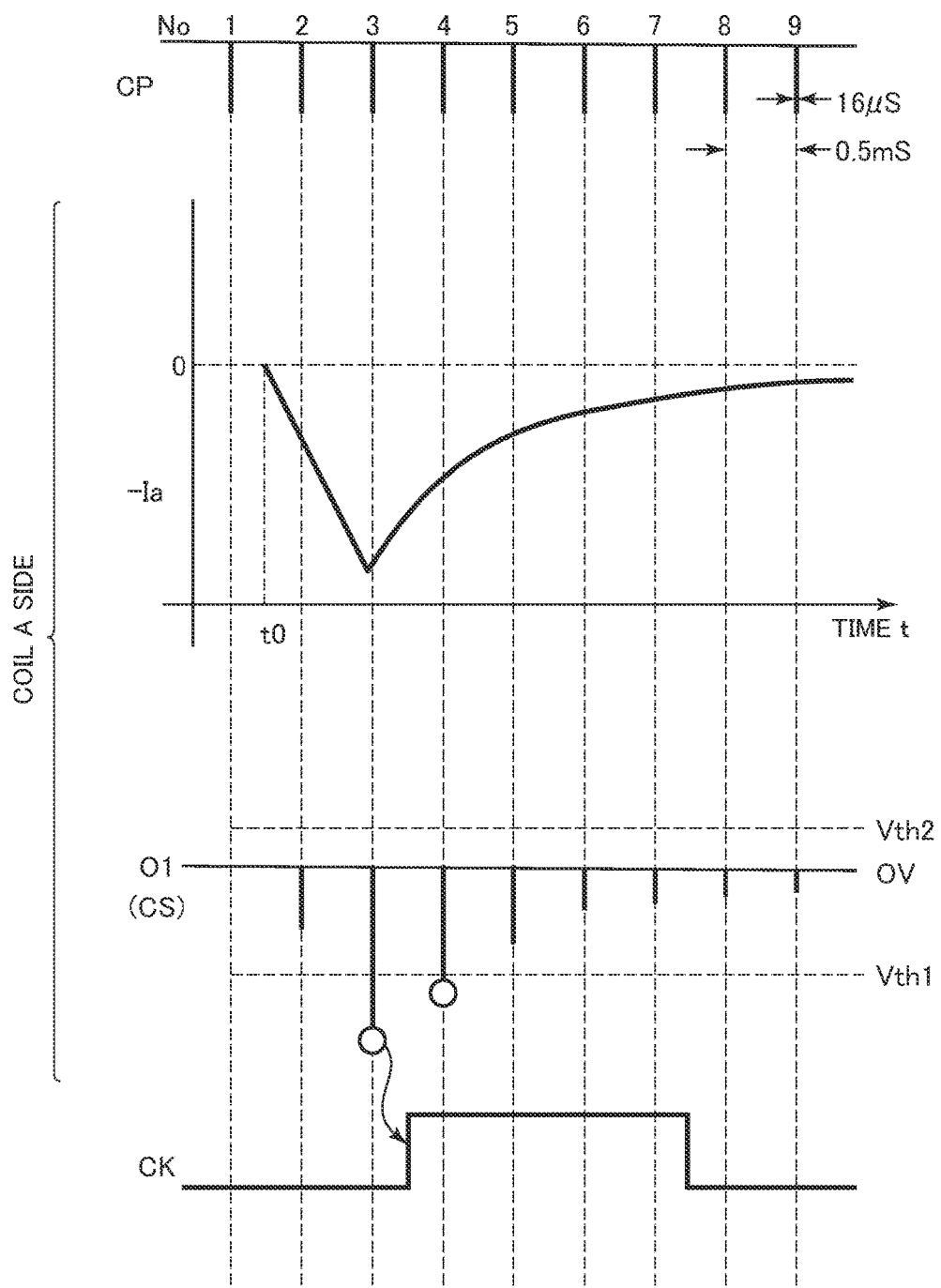
FIG. 28 is a timing chart for illustrating the operation of the detection circuit according to the third embodiment of the present invention.
Figure 29:
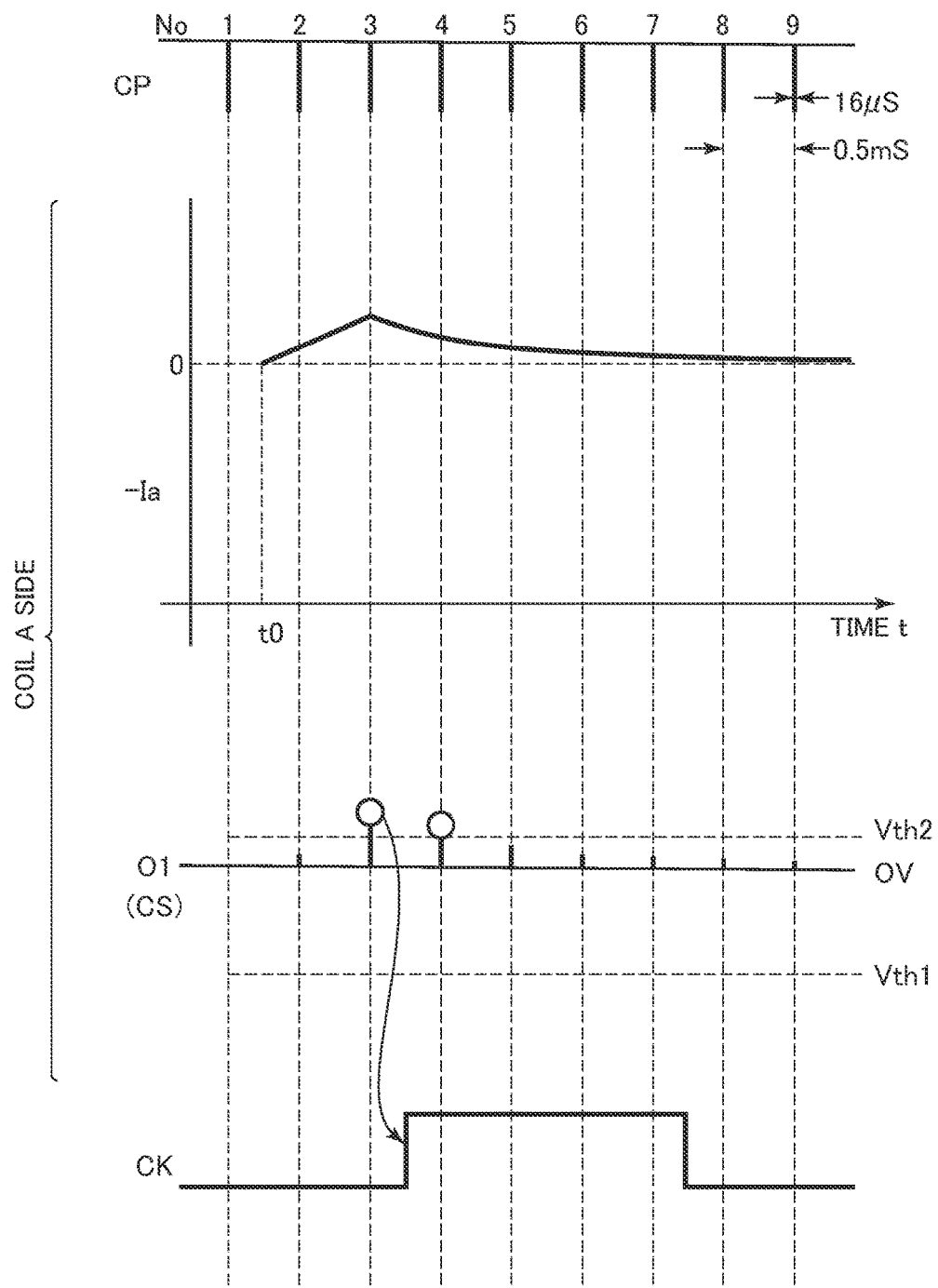
FIG. 29 is a timing chart for illustrating the operation of the detection circuit according to the third embodiment of the present invention.

[Description of Operation of Detection Circuit Configured to Detect Counter-Electromotive Currents: FIG. 27 to FIG. 29]

Next, with reference to FIG. 27 to FIG. 29, description is given of how the detection circuit 30 of the third embodiment detects the counter-electromotive currents generated from the stepper motor illustrated in FIG. 6 to FIG. 9. FIG. 27 is an operation table of each transistor of the driver circuit 20 and the detection circuit 30 illustrated in FIG. 26, and FIG. 28 and FIG. 29 are timing charts for illustrating the operation of the detection circuit 30.

In FIG. 27, the SW state 1 represents the operation (ON/OFF) of each transistor due to the arrival of the detection pulse CP when the N-pole of the rotor 41 is at the stationary position of 0°, and the SW state 2 represents the operation (ON/OFF) of each transistor due to the arrival of the detection pulse CP when the N-pole of the rotor 41 is at the stationary position of 180°. The point that the driver circuit 20 and the detection circuit 30 switch each transistor between the SW state 1 and the SW state 2 in accordance with the stationary position (0° or 180°) of the rotor 41 is similar to the case in the first embodiment.

In the SW state 1, when the detection pulse CP arrives, each transistor on the coil A side is controlled as follows. The transistors N1, N2, P1, and P2 of the driver circuit 20 are all turned off, and the transistors TP1 and TP2 of the detection circuit 30 are both turned on. Further, each transistor on the coil B side is controlled as follows. The transistors N3, N4, P3, and P4 of the driver circuit 20 are all turned off. On the coil B side, no transistor is provided in the detection circuit 30.

On the coil A side, with the ON/OFF operation of each transistor in the SW state 1, the coil terminal O1 is connected to the power supply VDD via the detection resistor R1 by the transistor TP1, and the coil terminal O2 is connected to the power supply VDD via the detection resistor R2 by the transistor TP2. On the coil B side, the coil terminals O3 and O4 are both in a floating state.

When an impact is generated during the detection section in the SW1 state, and thus the rotor 41 is rotated in the clockwise direction, as illustrated in FIG. 6, a large counter-electromotive current $-Ia$ flows in the negative direction from the coil terminal O2 to the coil terminal O1 of the coil A, and a small counter-electromotive current $+Ib$ flows in the positive direction from the coil terminal O4 to the coil terminal O3 of the coil B.

FIG. 28 is an example of the detection operation of the detection circuit in the SW state 1. The illustration of FIG. 28 follows that of FIG. 11, and FIG. 28 represents the transition of the counter-electromotive current generated in the coil A and detected through sampling based on the detection pulse CP when the N-pole of the rotor 41 is at the stationary position of 0° after the stepper motor 40 is driven based on the drive pulse SP. Similarly to FIG. 11, the cycle of the detection pulse CP is about 0.5 mS, and the pulse width is about 16 μS. In the third embodiment, the counter-electromotive current generated in the coil B is not detected, and hence illustration thereof is omitted herein.

Also in the third embodiment, based on the detection pulse output at a predetermined cycle during the detection section in the SW state 1, a voltage (detection signal CS) based on the counter-electromotive current is generated at the coil terminal O1 of the coil A.

Now, it is assumed that an impact is generated at a timing of a time t0, and the rotor 41 is rotated in the clockwise direction due to the impact as in the above-mentioned example. In this case, a large counter-electromotive current $-Ia$ is generated in the coil A. As a result, at the coil terminal O1, a pulsed detection signal CS is generated in the negative direction at the timing of the detection pulse CP based on the magnitude of the counter-electromotive current $-Ia$ due to the voltage drop caused by the detection resistor R1.

At this time, when a detection threshold value Vth1 is set to an appropriate value, at the timing of the detection pulses CP of No. 3 and No. 4 near the peak of the counter-electromotive current $-Ia$, the impact determination circuit 31 can detect that the detection signal CS of the coil terminal O1 has exceeded the detection threshold value Vth1. Therefore, the impact determination circuit 31 that has received the detection signal CS from the coil terminal O1 as input immediately outputs, to the control circuit 3, the impact signal CK at the timing of the detection pulse CP of No. 3 at which the impact determination circuit 31 can determine that the detection signal CS from the coil terminal O1 has exceeded the threshold value Vth1. Thus, the impact determination circuit 31 issues a notification that the rotor 41 has been rotated in the clockwise direction. The subsequent operation of the control circuit 3 and the subsequent operation based on the lock pulse LP output from the lock pulse generation circuit 10 are similar to those of the above-mentioned first embodiment and second embodiment.

Next, there is considered a case where an impact is generated during the detection section in the SW1 state, and thus the rotor 41 is rotated in the counterclockwise direction. In this case, as illustrated in FIG. 7, a small counter-electromotive current $+Ia$ flows in the positive direction from the coil terminal O2 to the coil terminal O1 of the coil A, and a large counter-electromotive current $-Ib$ flows in the negative direction from the coil terminal O4 to the coil terminal O3 of the coil B.

As in FIG. 28, FIG. 29 is an example of the detection operation of the detection circuit in the SW state 1. Similarly, it is assumed that an impact is generated at a timing of the time t0. In this case, when the rotor 41 is rotated in the counterclockwise direction due to the impact, a small counter-electromotive current +Ia is generated in the coil A. As a result, at the coil terminal O1, a pulsed detection signal CS is generated in the positive direction at the timing of the detection pulse CP based on the magnitude of the counter-electromotive current +Ia.

The absolute value of the pulsed detection signal CS in the positive direction generated due to the small counter-electromotive current +Ia is smaller than the absolute value of the pulsed detection signal CS in the negative direction generated when the rotor 41 is rotated in the clockwise direction described above. Therefore, a detection threshold value Vth2 is set to an appropriate value in order to detect this pulsed detection signal CS in the positive direction. For example, the absolute value of the detection threshold value Vth2 is set to be smaller than that of the detection threshold value Vth1. With this, the impact determination circuit 31 can detect that the detection signal CS of the coil terminal O1 has exceeded the detection threshold value Vth2 at the timing of the detection pulses CP of No. 3 and No. 4 near the peak of the counter-electromotive current +Ia.

The impact determination circuit 31 that has received the detection signal CS from the coil terminal O1 as input immediately outputs, to the control circuit 3, the impact signal CK at the timing of the detection pulse CP of No. 3 at which the impact determination circuit 31 can determine that the detection signal CS from the coil terminal O1 has exceeded the threshold value Vth2. Thus, the impact determination circuit 31 issues a notification that the rotor 41 has been rotated in the counterclockwise direction. The subsequent operation of the control circuit 3 and the subsequent operation based on the lock pulse LP output from the lock pulse generation circuit 10 are similar to those of the above-mentioned first embodiment and second embodiment. The impact determination circuit 31 notifies the control circuit of the rotational direction of the rotation of the rotor 41 caused by the impact. This notification may be issued in any method. Different impact signals (for example, two signals CK1 and CK2 may be prepared) may be output to the control circuit 3 depending on the rotational direction, or a signal representing the rotational direction of the rotor 41 may be output to the control circuit 3 separately from the impact signal CK.

As described above, in the third embodiment, when the N-pole of the rotor 41 is at the stationary position of 0° and the driver circuit 20 and the detection circuit 30 are in the SW state 1, in a case where the rotor 41 is rotated in the clockwise direction due to an impact, the impact can be detected based on the counter-electromotive current −Ia generated from the coil A at the coil terminal O1 of the coil A. Further, in a case where the rotor 41 is rotated in the counterclockwise direction due to the impact, the impact can be detected based on the counter-electromotive current +Ia generated from the coil A at the coil terminal O1 of the coil A.

Further, description is given of the detection operation in the SW state 2, that is, in a case where the N-pole of the rotor 41 is at the stationary position of 180°. At this time, in the third embodiment, as shown in FIG. 27, the state of each transistor when the detection pulse CP arrives in the SW state 2 is completely the same as that in the case of the SW state 1. That is, the transistors N1, N2, P1, P2, N3, N4, P3, and P4 of the driver circuit 20 are all turned off, and the transistors TP1 and TP2 of the detection circuit 30 are both turned on. Therefore, the connection states at the coil terminal O1 and the coil terminal O2 of the coil A are the same as those in the case of the SW state 1.

It is assumed that an impact is generated during the detection section in the SW state 2, and thus the rotor 41 is rotated in the clockwise direction. In this case, as illustrated in FIG. 8, a large counter-electromotive current +Ia in the positive direction flows from the coil terminal O1 to the coil terminal O2 of the coil A, and a small counter-electromotive current −Ib in the negative direction flows from the coil terminal O3 to the coil terminal O4 of the coil B.

As a result, at the coil terminal O2, a pulsed detection signal CS is generated in the negative direction at the timing of the detection pulse CP based on the magnitude of the counter-electromotive current +Ia due to the voltage drop caused by the detection resistor R2. Therefore, the impact determination circuit 31 receives the detection signal generated at the coil terminal O2 as input, and determines whether or not the detection signal of the coil terminal O2 has exceeded the threshold value Vth1 to output the impact signal CK. The timing chart of the SW state 2 differs from the timing chart of the SW state 1 of FIG. 28 only in that the direction of the counter-electromotive power of the coil A is opposite, and in that a signal generated at the coil terminal O2 is used as the detection signal CS. The timing relationship is the same, and hence illustration thereof is omitted herein.

Further, there is considered a case where the rotor 41 is rotated in the counterclockwise direction in the SW2 state. In this case, as illustrated in FIG. 9, a small counter-electromotive current −Ia flows in the negative direction from the coil terminal to the coil terminal O1 of the coil A, and a small counter-electromotive current +Ib flows in the positive direction from the coil terminal O4 to the coil terminal O3 of the coil B.

As a result, at the coil terminal O2, a pulsed detection signal CS is generated in the positive direction at the timing of the detection pulse CP based on the magnitude of the counter-electromotive current −Ia due to the voltage drop caused by the detection resistor R2. Therefore, the impact determination circuit 31 receives the detection signal generated at the coil terminal O2 as input, and determines whether or not the detection signal of the coil terminal O2 has exceeded the threshold value Vth2 to output the impact signal CK. The timing chart of the SW state 2 differs from the timing chart of the SW state 1 of FIG. 29 only in that the direction of the counter-electromotive power of the coil A is opposite, and in that a signal generated at the coil terminal O2 is used as the detection signal CS. The timing relationship is the same, and hence illustration thereof is omitted herein.

As described above, in the third embodiment, when the N-pole of the rotor 41 is at the stationary position of 180° and the driver circuit 20 and the detection circuit 30 are in the SW state 2, in a case where the rotor 41 is rotated in the clockwise direction due to the impact, the impact can be detected based on the counter-electromotive current +Ia from the coil A, which is generated at the coil terminal O2 of the coil A. Further, in a case where the rotor 41 is rotated in the counterclockwise direction due to the impact, the impact can be detected based on the counter-electromotive current −Ia from the coil A, which is generated at the coil terminal O1 of the coil A.

As described above, in the third embodiment, the detection circuit 30 includes the detection circuit only on the coil A side, and the detection circuit is unnecessary on the coil B side. In this case, as described above, the detection circuit 30 detects a weak pulsed detection signal CS in the positive direction, and hence the detection sensitivity is degraded as compared to the first embodiment, but the number of the required transistors and detection resistors is decreased, and hence there is an advantage in reduction in scale of the detection circuit 30.

The operation of the third embodiment is similar to that of the first embodiment described with reference to FIG. 12 and FIG. 13, and hence description thereof is omitted herein.

In the third embodiment, there is described a case where the detection circuit 30 includes the detection circuit only on the coil A side, and no detection circuit is provided on the coil B side, but reversely, the detection circuit 30 may include the detection circuit only on the coil B side, and no detection circuit may be provided on the coil A side. That is, in the third embodiment, the detection pulse generation circuit 6 may output the detection pulse CP to any one of the coil A and the coil B.

[Fourth Embodiment]

Figure 30:
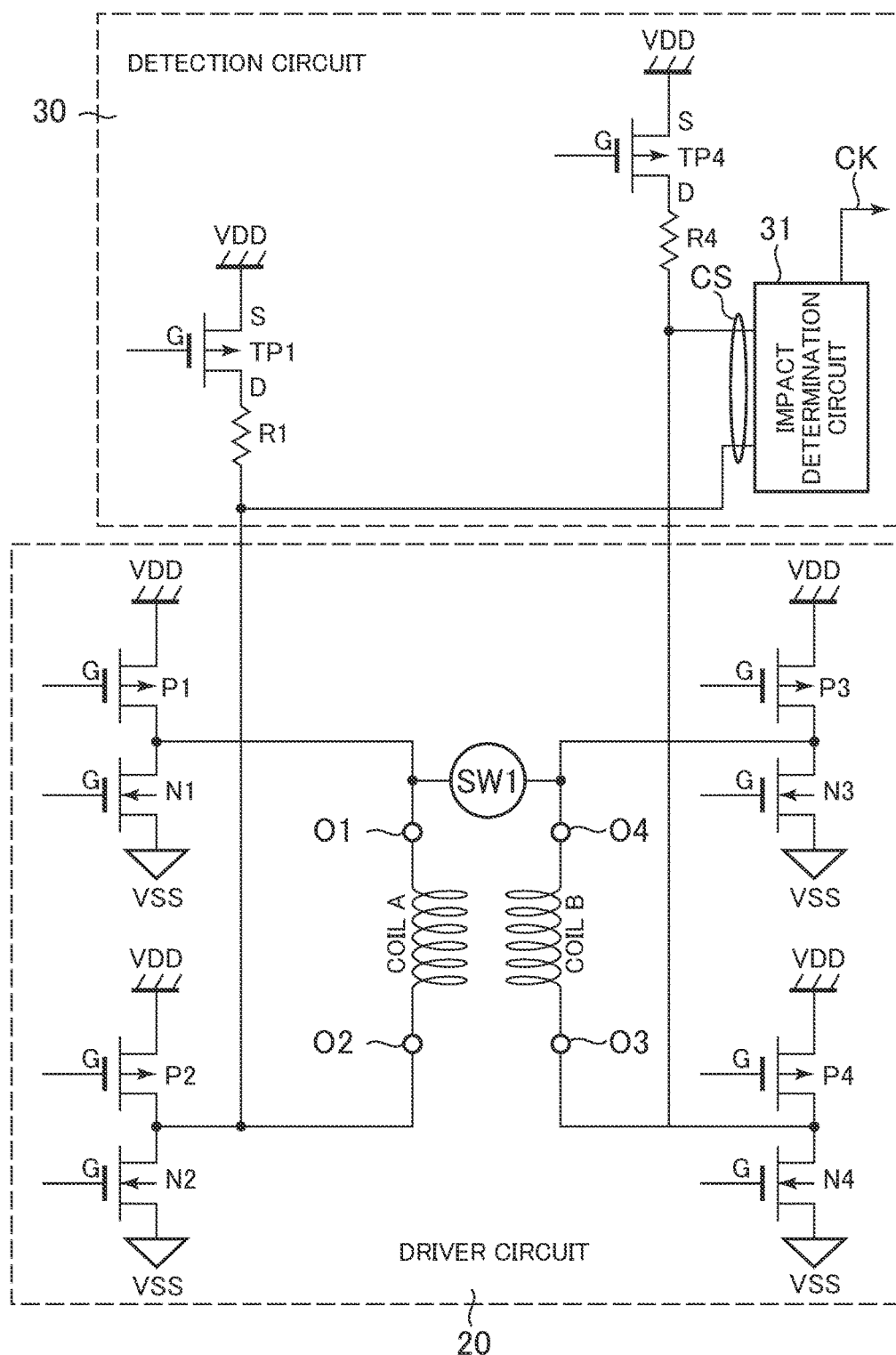
FIG. 30 is a circuit diagram for illustrating a driver circuit and a detection circuit according to a fourth embodiment of the present invention.

[Description of Circuit Configurations of Driver Circuit and Detection Circuit of Fourth Embodiment: FIG. 30]

Next, the circuit configurations of the driver circuit 20 and the detection circuit 30 of a fourth embodiment of the present invention are described with reference to FIG. 30. The fourth embodiment also differs from the first embodiment and the third embodiment in the circuit configuration of the detection circuit 30 configured to detect the movement of the rotor 41. Specifically, an analog switch SW1 is provided for switching between short-circuit and disconnection between the coil terminal O1 of the coil A and the coil terminal O4 of the coil B. Further, the source terminal S of the transistor TP1 is connected to the power supply VDD, the drain terminal D thereof is connected to one terminal of the detection resistor R1, and the other terminal of the detection resistor R1 is connected to the coil terminal O2 of the coil A. Similarly, the source terminal S of the transistor TP4 is connected to the power supply VDD, the drain terminal D thereof is connected to one terminal of the detection resistor R4, and the other terminal of the detection resistor R4 is connected to the coil terminal O3 of the coil B. The transistors TP2 and TP3 and the detection resistors R2 and R3 described in the first embodiment are not particularly required. Other components are similar to those of the first embodiment, and hence overlapping components are denoted by like reference symbols to omit the description thereof.

The mode of the analog switch SW1 is not particularly limited as long as the short-circuit and the disconnection between the coil terminal O1 and the coil terminal O4 can be switched, but the analog switch SW1 is a MOSFET, for example. Similarly to the transistors TP1 and TP4, the ON/OFF state of the analog switch SW1 is also controlled based on the control signal CN4 output from the control circuit 3.

Also in the fourth embodiment, the basic operation of the stepper motor 40, the rotation of the rotor caused by the impact, and the generation state of the counter-electromotive currents caused by the rotation are similar to those in the first embodiment described above with reference to FIG. 3, FIG. 4, and FIG. 6 to FIG. 9. The fourth embodiment differs from the first embodiment in the configuration and the operation for detecting the movement of the rotor 41, and thus the different points are described below. During the basic operation of the stepper motor 40, that is, during the drive of the rotor 41, the state of the driver circuit 20 is equivalent to the state described in the first embodiment, and hence the analog switch SW1 is turned off.

[Description of Operation of Detection Circuit Configured to Detect Counter-Electromotive Currents: FIG. 31 to FIG. 34]

In the fourth embodiment, the counter-electromotive currents generated from the stepper motor illustrated in FIGS. 6 to FIG. 9 are detected based on the shapes of counter-electromotive voltages. With reference to FIG. 31 to FIG. 34, description is given of how the detection circuit 30 of the fourth embodiment detects the counter-electromotive voltages. FIG. 31 is an operation table of each transistor of the driver circuit 20 and the detection circuit 30, and the analog switch illustrated in FIG. 30, and FIG. 32 to FIG. 34 are timing charts for illustrating the operation of the detection circuit 30.

In FIG. 31, the SW state 2 represents the operation (ON/OFF) of each transistor due to the arrival of the detection pulse CP when the N-pole of the rotor 41 is at the stationary position of 0°, and the SW state 2 represents the operation (ON/OFF) of each transistor due to the arrival of the detection pulse CP when the N-pole of the rotor 41 is at the stationary position of 180°. The point that the driver circuit 20 and the detection circuit 30 switch each transistor between the SW state 2 and the SW state 2 in accordance with the stationary position (0° or 180°) of the rotor 41 is similar to the case in the first embodiment.

In the SW state 1, when the detection pulse CP arrives, each transistor on the coil A side is controlled as follows. The transistors N1, N2, P1, P2, N3, N4, P3, and P4 of the driver circuit 20 are all turned off, and the transistors TP1 and TP4 of the detection circuit 30 are both turned on. Further, the analog switch SW1 is turned on.

With the ON/OFF operation of each transistor and the analog switch in the SW state 1, on the coil A side, the coil terminal O2 is connected to the power supply VDD via the detection resistor R1 by the transistor TP1, and on the coil B side, the coil terminal O3 is connected to the power supply VDD via the detection resistor R4 by the transistor TP4. Further, the coil terminal O1 of the coil A and the coil terminal O4 of the coil B are short-circuited by the analog switch SW1.

This state corresponds to a state in which the coil A and the coil B are connected in series at the coil terminal O1 and the coil terminal O4. The detection pulse CP is output to both ends of the coil A and the coil B connected in series.

In this case, as is apparent from the description so far, the winding direction of the coil A is set to a direction in which a positive magnetic flux φ is generated when a current is caused to flow from the coil terminal O2 to the coil terminal O1. Further, the winding direction of the coil B is set to a direction in which a positive magnetic flux φ is generated when a current is caused to flow from the coil terminal O3 to the coil terminal O4.

That is, short-circuiting the coil terminal O1 and the coil terminal O4 by the analog switch SW1 means that the coil A and the coil B are connected in series so that the magnetic flux φ generated in the coil A and the magnetic flux φ generated in the coil B are directed opposite to each other when a current is caused to flow between the coil terminal O2 and the coil terminal O3 corresponding to both the ends. Further, as is apparent with reference to FIG. 2, this series connection is in a direction for forming a closed loop in which the magnetic flux φ generated by the current flowing in series through the coil A and the coil B connected in series passes through the first magnetic-pole portion 42a and the second magnetic-pole portion 42b of the stator 42 of the two-coil stepper motor 40.

Similar series connection can also be obtained by short-circuiting the coil terminal O2 of the coil A and the coil terminal O3 of the coil B by the analog switch SW1. In this case, the terminal of the detection resistor R1 on the opposite side to the transistor TP1 illustrated in FIG. 30 may be connected to the coil terminal O1 side, and the terminal of the detection resistor R4 on the opposite side to the transistor TP4 may be connected to the coil terminal O4 side.

It is assumed that an impact is generated during the detection section in the SW1 state, and thus the rotor 41 is rotated in the clockwise direction. In this case, as illustrated in FIG. 6, the magnetic flux passing through the coil A changes from $+\frac{1}{2}\varphi$ to $-\varphi$, and hence the magnetic flux change amount is $-3/2\varphi$. Further, the magnetic flux passing through the coil B changes from $+\frac{1}{2}\varphi$ to $+\varphi$, and hence the magnetic flux change amount is $+\frac{1}{2}\varphi$. Then, counter-electromotive voltages are generated in the coil A and the coil B due to electromagnetic induction based on the amount of change in magnetic flux.

Figure 32:
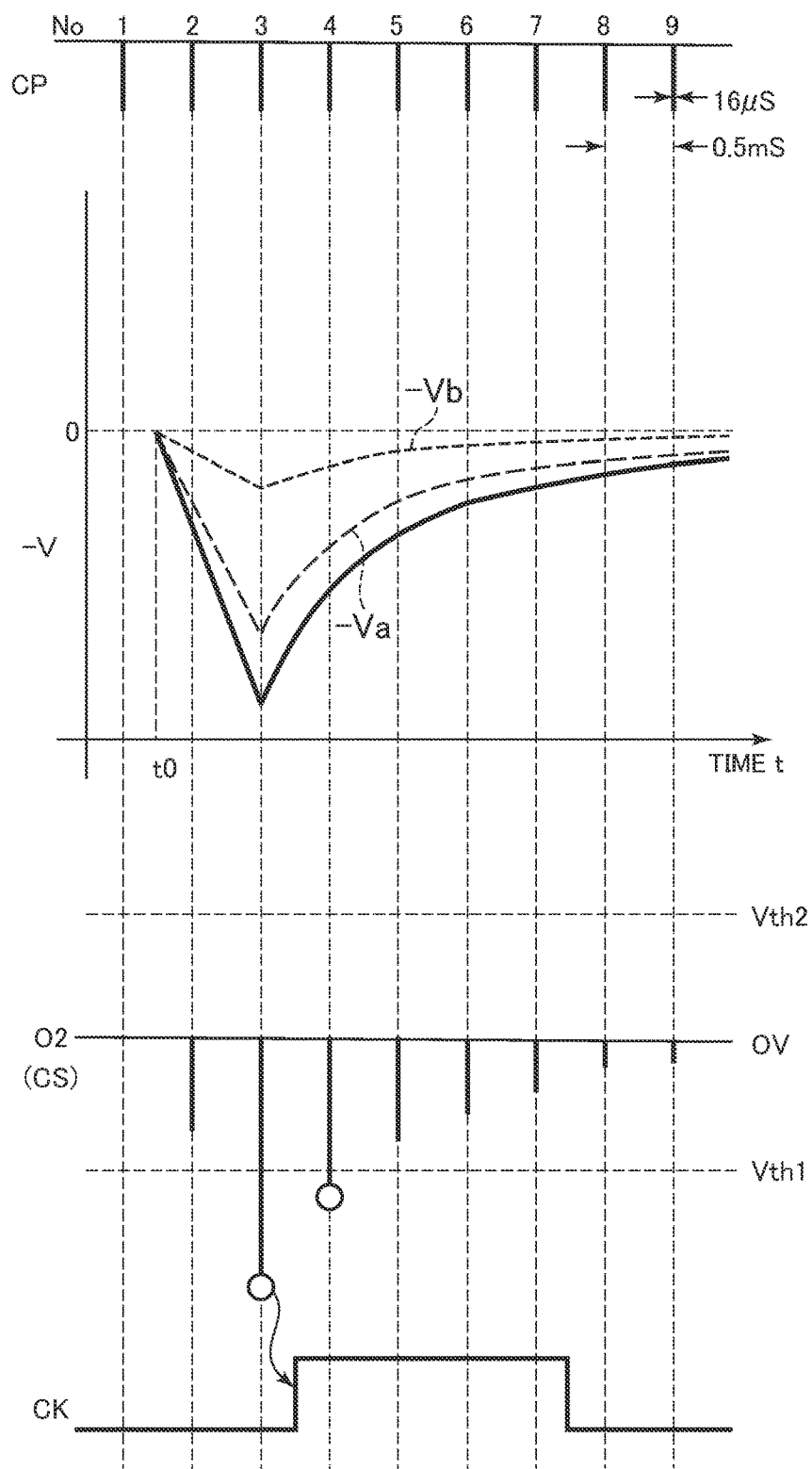
FIG. 32 is a timing chart for illustrating the operation of the detection circuit according to the fourth embodiment of the present invention.

FIG. 32 is an example of the detection operation of the detection circuit in the SW state 1. The illustration of FIG. 32 also follows that of FIG. 11, but in this case, FIG. 32 represents the transition of a counter-electromotive voltage to be detected at the coil terminal O2 of the coil A (terminal at the end on the coil A side of the coil A and the coil B connected in series) through sampling based on the detection pulse CP when the N-pole of the rotor 41 is at the stationary position of 0° after the stepper motor 40 is driven based on the drive pulse SP. Similarly to FIG. 11, the cycle of the detection pulse CP is about 0.5 mS, and the pulse width is about 16 µS.

Now, it is assumed that an impact is generated at the timing of the time t0, and the rotor 41 is rotated in the clockwise direction due to the impact as in the above-mentioned example. At this time, a large counter-electromotive voltage −Va is generated in the coil A. Further, a small counter-electromotive voltage +Vb is generated in the coil B, but the coil terminal O4 of the coil B is short-circuited to the coil terminal O1 of the coil A, and hence the voltage detected at the coil terminal O2 is in a reverse direction, and is thus −Vb. Then, at the coil terminal O2, −V=−(Va+Vb), which is a sum of the counter-electromotive voltage −Va generated in the coil A and the reverse voltage −Vb of the counter-electromotive voltage generated in the coil B, is generated. As a result, at the coil terminal O1, a pulsed detection signal CS is generated in the negative direction at the timing of the detection pulse CP based on the magnitude of the counter-electromotive voltage −V.

Also at this time, when the detection threshold value Vth1 is set to an appropriate negative value, at the timing of the detection pulses CP of No. 3 and No. 4 near the peak of the counter-electromotive voltage −V, the impact determination circuit 31 can detect that the detection signal CS from the coil terminal O2 has exceeded the detection threshold value Vth1. Therefore, the impact determination circuit 31 that has received the detection signal CS from the coil terminal O2 as input immediately outputs, to the control circuit 3, the impact signal CK at the timing of the detection pulse CP of No. 3 at which the impact determination circuit 31 can determine that the detection signal CS from the coil terminal O2 has exceeded the detection threshold value Vth1. Thus, the impact determination circuit 31 issues a notification that the rotor 41 has been rotated in the clockwise direction. The subsequent operation of the control circuit 3 and the subsequent operation based on the lock pulse LP output from the lock pulse generation circuit 10 are similar to those of the above-mentioned first embodiment and second embodiment.

The impact determination circuit 31 also sets the detection threshold value Vth2 separately from the detection threshold value Vth1. The sign of the detection threshold value Vth2 is opposite to that of the detection threshold value Vth1, and the absolute value of the detection threshold value Vth2 is substantially equal to that of the detection threshold value Vth1. This setting is made in order to detect the rotation in a case where an impact is generated during the detection section in the SW state 1, and thus the rotor 41 is rotated in the counterclockwise direction. At this time, as illustrated in FIG. 7, the magnetic flux passing through the coil A changes from $+\frac{1}{2}\varphi$ to $+\varphi$, and hence the magnetic flux change amount is $+\frac{1}{2}\varphi$. Further, the magnetic flux passing through the coil B changes from $+\frac{1}{2}\varphi$ to $-\varphi$, and hence the magnetic flux change amount is $-3/2\varphi$. Then, counter-electromotive voltages are generated in the coil A and the coil B due to electromagnetic induction based on the amount of change in magnetic flux.

Figure 33:
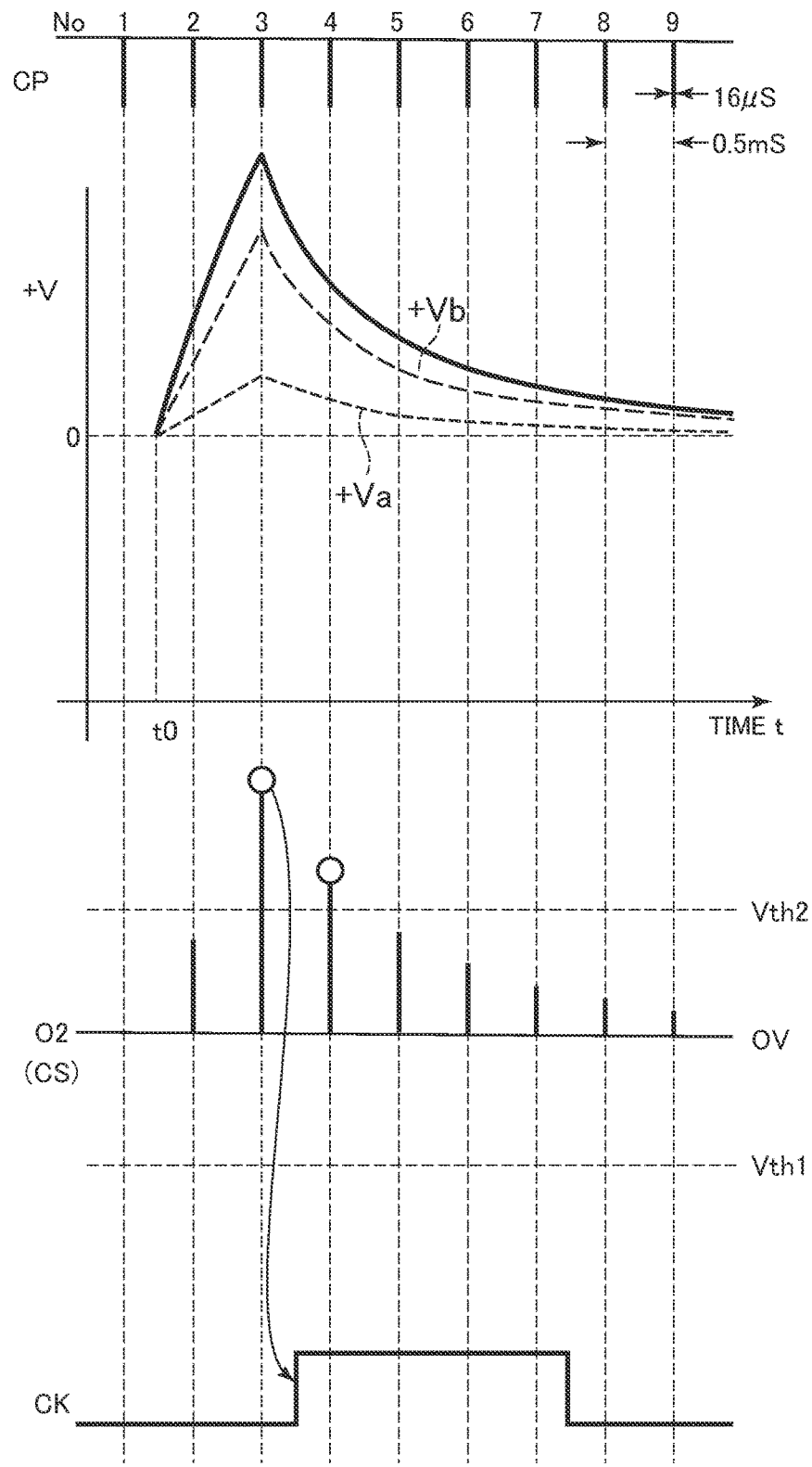
FIG. 33 is a timing chart for illustrating the operation of the detection circuit according to the fourth embodiment of the present invention.

FIG. 33 is an example of the detection operation of the detection circuit in the SW state 1. Similarly to FIG. 32, FIG. 33 represents the transition of a counter-electromotive voltage to be detected at the coil terminal O2 of the coil A through sampling based on the detection pulse CP. In this case, it is assumed that an impact is generated at the timing of the time t0, and thus the rotor 41 is rotated in the counterclockwise direction due to the impact. At this time, a small counter-electromotive voltage +Va is generated in the coil A. Further, a large counter-electromotive voltage −Vb is generated in the coil B, but the counter-electromotive voltage generated in the coil B is detected to have a reversed sign at the coil terminal O2, and hence +V=+(Va+Vb), which is a sum of the counter-electromotive voltage +Va generated in the coil A and the reverse voltage +Vb of the counter-electromotive voltage generated in the coil B, is finally generated at the coil terminal O2. With this, at the coil terminal O1, a pulsed detection signal CS is generated in the positive direction at the timing of the detection pulse CP based on the magnitude of the counter-electromotive voltage +V.

Therefore, when the detection threshold value Vth2 is set to an appropriate positive value, similarly to the case of FIG. 32, the impact determination circuit 31 immediately outputs, to the control circuit 3, the impact signal CK at the timing of the detection pulse CP of No. 3 at which the impact determination circuit 31 can determine that the detection signal CS from the coil terminal O2 has exceeded the detection threshold value Vth2. Thus, the impact determination circuit 31 issues a notification that the rotor 41 has been rotated in the counterclockwise direction. The rotational direction of the rotor 41 can be determined based on which of the detection threshold value Vth1 and the detection threshold value Vth2 the detection signal CS has exceeded.

Further, description is given of the detection operation in the SW state 2, that is, in a case where the N-pole of the rotor 41 is at the stationary position of 180°. At this time, in the fourth embodiment, as shown in FIG. 31, the state of each transistor when the detection pulse CP arrives in the SW state 2 is completely the same as that in the case of the SW state 1. That is, the transistors N1, N2, P1, P2, N3, N4, P3, and P4 of the driver circuit 20 are all turned off, the transistors TP1 and TP4 of the detection circuit 30 are both turned on, and the analog switch SW1 is turned on. Therefore, the connection state in which the coil A and the coil B are connected in series is the same as that in the case of the SW state 1.

When an impact is generated during the detection section in the SW state 2, and thus the rotor 41 is rotated in the clockwise direction, the magnetic flux amount change of the coil A and the magnetic flux amount change of the coil B are +3/2φ and −½φ, respectively. As a result, a large counter-electromotive voltage +Va is generated in the coil A, and a small counter-electromotive voltage −Vb is generated in the coil B.

As a result, the voltage detected at the coil terminal O2 of the coil A is +V=+(Va+Vb) whose waveform is substantially the same as that illustrated in FIG. 33. Therefore, in the SW state 2, the impact determination circuit 31 that has received the detection signal CS from the coil terminal O2 as input outputs the impact signal CK to the control circuit 3 when the impact determination circuit 31 determines that the detection signal CS from the coil terminal O2 has exceeded the threshold value Vth2. Thus, the impact determination circuit 31 issues a notification that the rotor 41 has been rotated in the clockwise direction.

Further, when an impact is generated during the detection section in the SW state 2, and thus the rotor 41 is rotated in the counterclockwise direction, the magnetic flux amount change of the coil A and the magnetic flux amount change of the coil B are −½φ and +3/2φ, respectively. As a result, a small counter-electromotive voltage −Va is generated in the coil A, and a large counter-electromotive voltage +Vb is generated in the coil B.

As a result, the voltage detected at the coil terminal O2 of the coil A is −V=−(Va+Vb) whose waveform is substantially the same as that illustrated in FIG. 32. Therefore, in the SW state 2, the impact determination circuit 31 that has received the detection signal CS from the coil terminal O2 as input outputs the impact signal CK to the control circuit 3 when the impact determination circuit 31 determines that the detection signal CS from the coil terminal O2 has exceeded the threshold value Vth1. Thus, the impact determination circuit 31 issues a notification that the rotor 41 has been rotated in the counterclockwise direction.

Further, in the fourth embodiment described above, the coil A and the coil B are connected in series in a direction for forming a closed loop in which the magnetic flux φ generated by a current flowing in series through the coil A and the coil B connected in series passes through the first magnetic-pole portion 42a and the second magnetic-pole portion 42b of the stator 42 of the two-coil stepper motor 40. With this, at the terminal at the end of the coil A and the coil B connected in series, in this example, at the coil terminal O2, the counter-electromotive voltages generated in the coil A and the coil B can be added for detection while being assumed to have the same sign. With this, the absolute value of the counter-electromotive voltage that is required to be detected is increased, and hence the detection sensitivity can be enhanced. The same holds true even when the coil terminal O4 of the coil B is used to detect the detection signal CS instead of the coil terminal O2 of the coil A.

The rotation can be detected even when the coil A and the coil B are connected in series in a direction for not forming a closed loop in which the magnetic flux φ generated by a current flowing through the coil A and the coil B connected in series passes through the first magnetic-pole portion 42a and the second magnetic-pole portion 42b of the stator 42 of the two-coil stepper motor 40. This connection specifically corresponds to, in the case of the fourth embodiment, series connection obtained by short-circuit between the coil terminal O1 of the coil A and the coil terminal O3 of the coil B, or by short-circuit between the coil terminal O2 of the coil A and the coil terminal O4 of the coil B.

Figure 34:
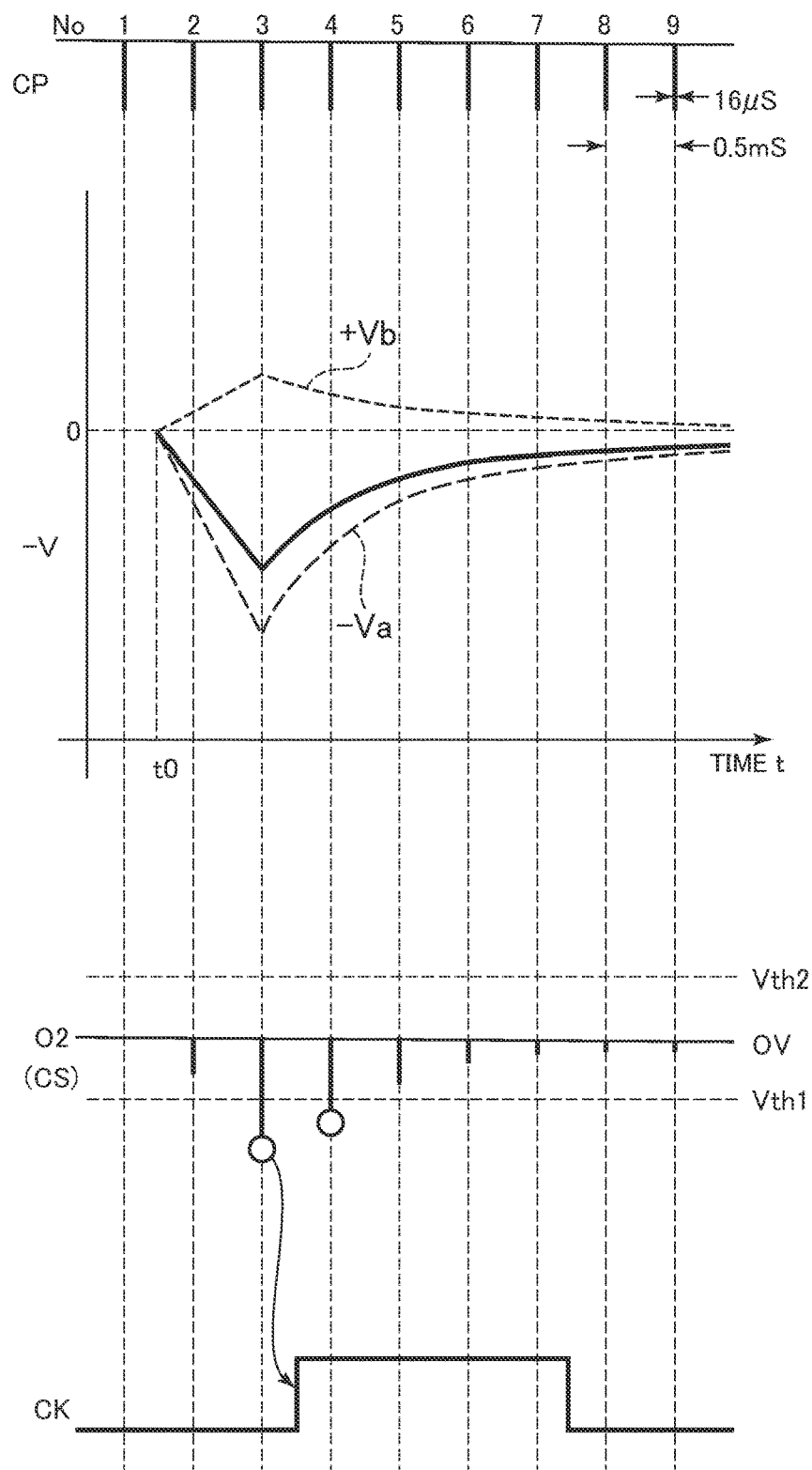
FIG. 34 is a timing chart for illustrating the operation of the detection circuit according to the fourth embodiment of the present invention.

There is now considered this case in the SW state 1, that is, when the rotor 41 is at the stationary position of 0°, and the rotor 41 is rotated in the clockwise direction due to an impact generated at the timing of the time t0. FIG. 34 is an example of the detection operation of the detection circuit in this case. Here, the coil terminal O1 of the coil A and the coil terminal O3 of the coil B are short-circuited by the analog switch SW1, and the detection signal CS is detected at the coil terminal O2 of the coil A.

At this time, as described above, the magnetic flux amount change of the coil A and the magnetic flux amount change of the coil B are −3/2φ and +½φ, respectively. As a result, in the coil A and the coil B, a large counter-electromotive voltage −Va is generated in the coil A, and a small counter-electromotive voltage +Vb is generated in the coil B based on the amount of change in magnetic flux.

As a result, the counter-electromotive voltage detected at the coil terminal O2 is −V=−(Va−Vb), which is a sum of the counter-electromotive voltage generated in the coil A and the counter-electromotive voltage generated in the coil B. Therefore, the absolute value of the detection signal CS detected at the coil terminal O2 is smaller than that in the case where only the counter-electromotive voltage −Va generated in the coil A is detected. Therefore, when the impact determination circuit 31 determines the rotation of the rotor 41, the detection threshold value Vth1 is required to be set to an appropriate negative value having a small absolute value. The detection threshold value Vth2 for detecting the rotation of the rotor 41 in the counterclockwise direction is similarly required to be set to an appropriate positive value having a small absolute value.

In view of the above, when the coil A and the coil B are connected in series in a direction for not forming a closed loop in which the magnetic flux φ generated by a current flowing in series through the coil A and the coil B connected in series passes through the first magnetic-pole portion 42a and the second magnetic-pole portion 42b of the stator 42 of the two-coil stepper motor 40, the absolute value of the detection signal to be detected at the terminal at the end of the coil A and the coil B connected in series is decreased, and hence the detection sensitivity is degraded. However, such series connection does not entirely prevent the rotation of the rotor 41 from being detected.

The operation of the fourth embodiment is similar to that of the first embodiment described with reference to FIG. 12 and FIG. 13, and hence description thereof is omitted herein.

[Fifth Embodiment]

Figure 35:
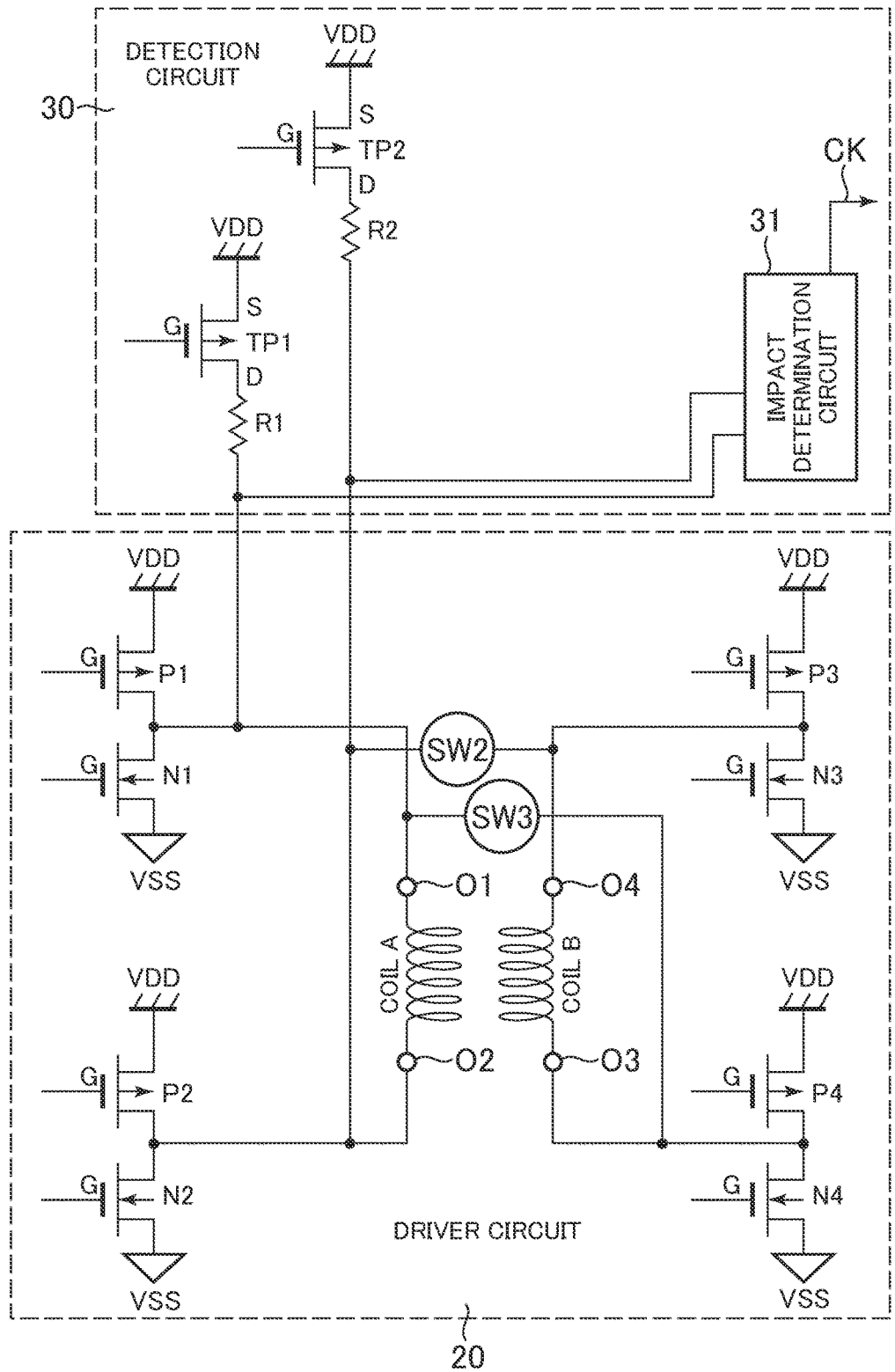
FIG. 35 is a circuit diagram for illustrating a driver circuit and a detection circuit according to a fifth embodiment of the present invention.

[Description of Circuit Configurations of Driver Circuit and Detection Circuit of Fifth Embodiment: FIG. 35]

Next, the circuit configurations of the driver circuit 20 and the detection circuit 30 of a fifth embodiment of the present invention are described with reference to FIG. 35. The fifth embodiment also differs from the first embodiment, the third embodiment, and the fourth embodiment in the circuit configuration of the detection circuit 30 configured to detect the movement of the rotor 41. Specifically, an analog switch SW2 is provided for switching between short-circuit and disconnection between the coil terminal O2 of the coil A and the coil terminal O4 of the coil B, and an analog switch SW3 is provided for switching between short-circuit and disconnection between the coil terminal O1 of the coil A and the coil terminal O3 of the coil B. Further, the source terminal S of the transistor TP1 is connected to the power supply VDD, the drain terminal D thereof is connected to one terminal of the detection resistor R1, and the other terminal of the detection resistor R1 is connected to the coil terminal O1 of the coil A. Similarly, the source terminal S of the transistor TP2 is connected to the power supply VDD, the drain terminal D thereof is connected to one terminal of the detection resistor R2, and the other terminal of the detection resistor R2 is connected to the coil terminal O2 of the coil A. The transistors TP3 and TP4 and the detection resistors R3 and R4 described in the first embodiment are not particularly required. Other components are similar to those of the first embodiment, and hence overlapping components are denoted by like reference symbols to omit the description thereof.

The mode of the analog switches SW2 and SW3 is not particularly limited as long as the short-circuit and the disconnection between the coil terminal O2 and the coil terminal O4, and between the coil terminal O1 and the coil terminal O3 can be switched. The analog switches SW2 and SW2 are MOSFETs, for example. Similarly to the transistors TP1 and TP2, the ON/OFF state of the analog switches SW2 and SW3 is also controlled based on the control signal CN4 output from the control circuit 3.

Also in the fifth embodiment, the basic operation of the stepper motor 40, the rotation of the rotor due to the impact, and the generation state of the counter-electromotive currents due to the rotation are similar to those in the first embodiment described above with reference to FIG. 3, FIG. 4, and FIG. 6 to FIG. 9. The fifth embodiment differs from the first embodiment in the configuration and the operation for detecting the movement of the rotor 41, and thus the different points are described below. During the basic operation of the stepper motor 40, that is, during the drive of the rotor 41, the state of the driver circuit 20 is equivalent to the state described in the first embodiment, and hence the analog switches SW2 and SW3 are both turned off.

[Description of Operation of Detection Circuit Configured to Detect Counter-Electromotive Currents: FIG. 31 to FIG. 34]

With reference to FIG. 36 to FIG. 39, description is given of how the detection circuit 30 of the fifth embodiment detects the counter-electromotive currents generated from the stepper motor illustrated in FIG. 6 to FIG. 9. FIG. 36 is an operation table of each transistor of the driver circuit 20 and the detection circuit 30, and the analog switch illustrated in FIG. 35, and FIG. 37 to FIG. 39 are timing charts for illustrating the operation of the detection circuit 30.

Also in FIG. 36, the SW state 2 represents the operation (ON/OFF) of each transistor due to the arrival of the detection pulse CP when the N-pole of the rotor 41 is at the stationary position of 0°, and the SW state 2 represents the operation (ON/OFF) of each transistor due to the arrival of the detection pulse CP when the N-pole of the rotor 41 is at the stationary position of 180°. The point that the driver circuit 20 and the detection circuit 30 switch each transistor between the SW state 2 and the SW state 2 in accordance with the stationary position (0° or 180°) of the rotor 41 is similar to the case in the first embodiment.

In the SW state 1, when the detection pulse CP arrives, each transistor on the coil A side is controlled as follows. The transistors N1, N2, P1, P2, N3, N4, P3, and P4 of the driver circuit 20 are all turned off, and the transistors TP1 and TP2 of the detection circuit 30 are both turned on. Further, the analog switches SW2 and SW3 are turned on.

With the ON/OFF operation of each transistor and each analog switch in the SW state 1, the coil terminal O2 of the coil A and the coil terminal O4 of the coil B are short-circuited by the analog switch SW2, and the coil terminal O1 of the coil A and the coil terminal O3 of the coil B are short-circuited by the analog switch SW3. Further, the coil terminals O1 and O3 are connected to the power supply VDD via the detection resistor R1 by the transistor TP1, and the coil terminals O2 and O4 are connected to the power supply VDD via the detection resistor R2 by the transistor TP2.

This state corresponds to a state in which the coil A and the coil B are connected in parallel. The detection pulse CP is output to both ends of the coil A and the coil B connected in parallel.

In this case, there are two connection directions for connecting the coil A and the coil B in parallel, but as illustrated in FIG. 35, short-circuiting the coil terminal O2 of the coil A and the coil terminal O4 of the coil B by the analog switch SW2, and short-circuiting the coil terminal O1 of the coil A and the coil terminal O3 of the coil B by the analog switch SW3 mean that the coil A and the coil B are connected in parallel so that the magnetic flux φ generated in the coil A and the magnetic flux φ generated in the coil B are directed opposite to each other when a current is caused to flow between the coil terminal O1 (which is short-circuited to the coil terminal O3) and the coil terminal O2 (which is short-circuited to the coil terminal O4) corresponding to both ends. Further, as is apparent with reference to FIG. 2, this parallel connection is in a direction for forming a closed loop in which the magnetic flux φ generated by the current flowing in parallel through the coil A and the coil B connected in parallel passes through the first magnetic-pole portion 42a and the second magnetic-pole portion 42b of the stator 42 of the two-coil stepper motor 40.

It is assumed that an impact is generated during the detection section in the SW1 state, and thus the rotor 41 is rotated in the clockwise direction. In this case, as illustrated in FIG. 6, the magnetic flux passing through the coil A changes from $+\frac{1}{2}\varphi$ to $-\varphi$, and hence the magnetic flux change amount is $-3/2\varphi$. Further, the magnetic flux passing through the coil B changes from $+\frac{1}{2}\varphi$ to $+\varphi$, and hence the magnetic flux change amount is $+\frac{1}{2}\varphi$. Then, counter-electromotive currents are generated in the coil A and the coil B due to electromagnetic induction based on the amount of change in magnetic flux.

Figure 37:
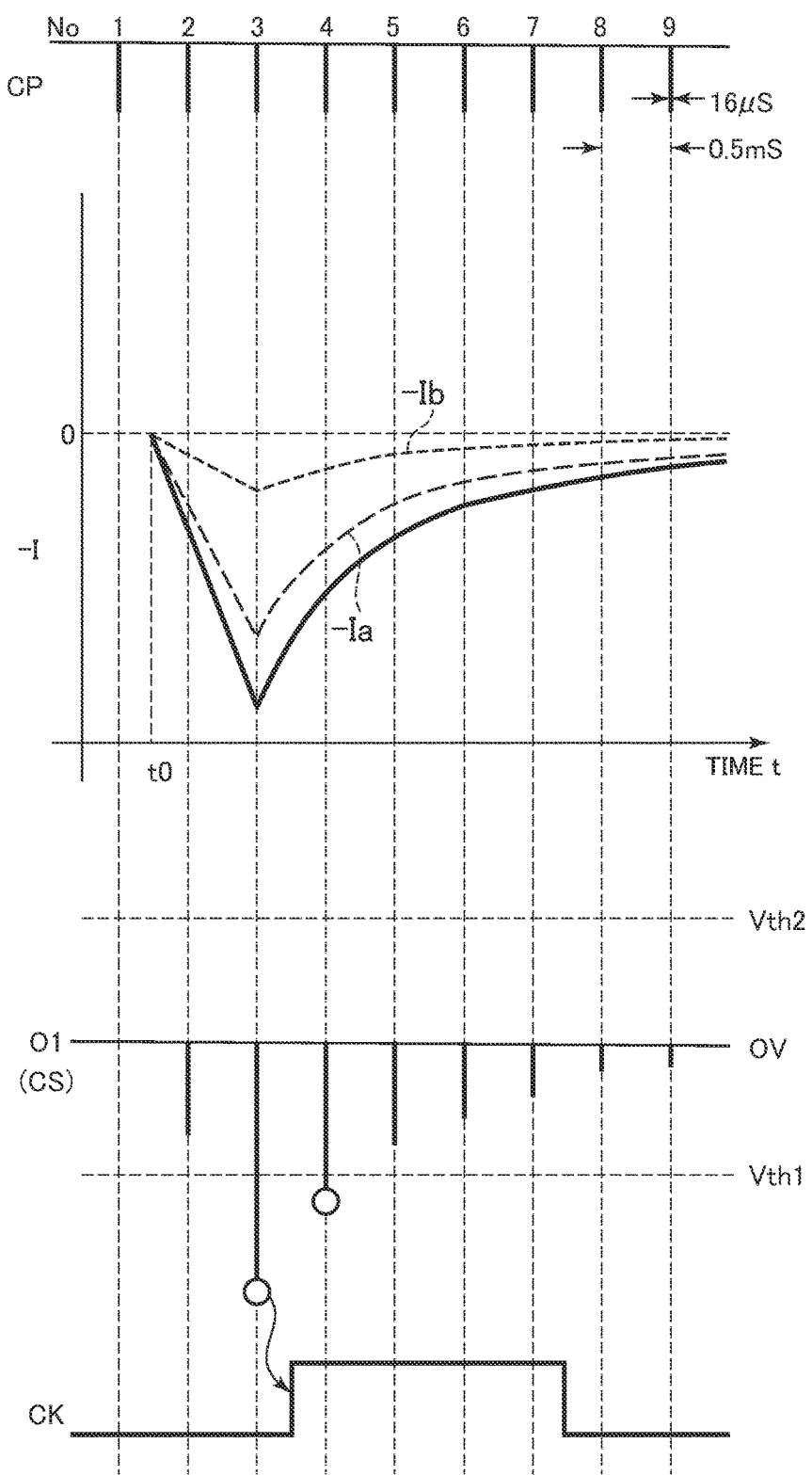
FIG. 37 is a timing chart for illustrating the operation of the detection circuit according to the fifth embodiment of the present invention.

FIG. 37 is an example of the detection operation of the detection circuit in the SW state 1 . The illustration of FIG. 37 also follows that of FIG. 11. FIG. 37 represents the transition of a counter-electromotive current to be detected at the coil terminal O1 of the coil A (terminal at the end of one of the coil A and the coil B connected in parallel) through sampling based on the detection pulse CP when the N-pole of the rotor 41 is at the stationary position of 0° after the stepper motor 40 is driven based on the drive pulse SP. Similarly to FIG. 11, the cycle of the detection pulse CP is about 0.5 mS, and the pulse width is about 16 µS.

Now, it is assumed that an impact is generated at the timing of the time t0, and the rotor 41 is rotated in the clockwise direction due to the impact as in the above-mentioned example. At this time, a large counter-electromotive current −Ia flows through the coil A. Further, a small counter-electromotive current +Ib flows through the coil B. However, the coil terminal O3 of the coil B is short-circuited to the coil terminal O1 of the coil A and the coil terminal O4 of the coil B is short-circuited to the coil terminal O2 of the coil A, and hence the current detected for the coil B at the coil terminal O1 is in a reverse direction, and is thus −Ib. Then, to the coil terminal O1, −I=−(Ia+Ib), which is a sum of the counter-electromotive current −Ia in the coil A and the reverse current −Ib of the counter-electromotive current in the coil B, flows. As a result, at the coil terminal O1, a pulsed detection signal CS is generated in the negative direction at the timing of the detection pulse CP based on the magnitude of the counter-electromotive current −I, due to the voltage drop caused by the detection resistor R1 through which the counter-electromotive current −I flows.

Further, when the detection threshold value Vth1 is set to an appropriate negative value, at the timing of the detection pulses CP of No. 3 and No. 4 near the peak of the counter-electromotive current −I, the impact determination circuit 31 can detect that the detection signal CS from the coil terminal O1 has exceeded the detection threshold value Vth1. Therefore, the impact determination circuit 31 that has received the detection signal CS from the coil terminal O1 as input immediately outputs, to the control circuit 3, the impact signal CK at the timing of the detection pulse CP of No. 3 at which the impact determination circuit 31 can determine that the detection signal CS from the coil terminal O1 has exceeded the detection threshold value Vth1. Thus, the impact determination circuit 31 issues a notification that the rotor 41 has been rotated in the clockwise direction. The subsequent operation of the control circuit 3 and the subsequent operation based on the lock pulse LP output from the lock pulse generation circuit 10 are similar to those of the above-mentioned first embodiment and second embodiment.

Further, similarly to the fourth embodiment, the impact determination circuit 31 also sets the detection threshold value Vth2 separately from the detection threshold value Vth1. The sign of the detection threshold value Vth2 is opposite to that of the detection threshold value Vth1, and the absolute value of the detection threshold value Vth2 is substantially equal to that of the detection threshold value Vth1. This setting is also made in order to detect the rotation in a case where an impact is generated during the detection section in the SW state 1, and thus the rotor 41 is rotated in the counterclockwise direction. At this time, as illustrated in FIG. 7, the magnetic flux passing through the coil A changes from $+\frac{1}{2}\varphi$ to $-\varphi$, and hence the magnetic flux change amount is $+\frac{1}{2}\varphi$. Further, the magnetic flux passing through the coil B changes from $+\frac{1}{2}\varphi$ to $-\varphi$, and hence the magnetic flux change amount is $-3/2\varphi$. Then, counter-electromotive currents are generated in the coil A and the coil B due to electromagnetic induction based on the amount of change in magnetic flux.

Figure 38:
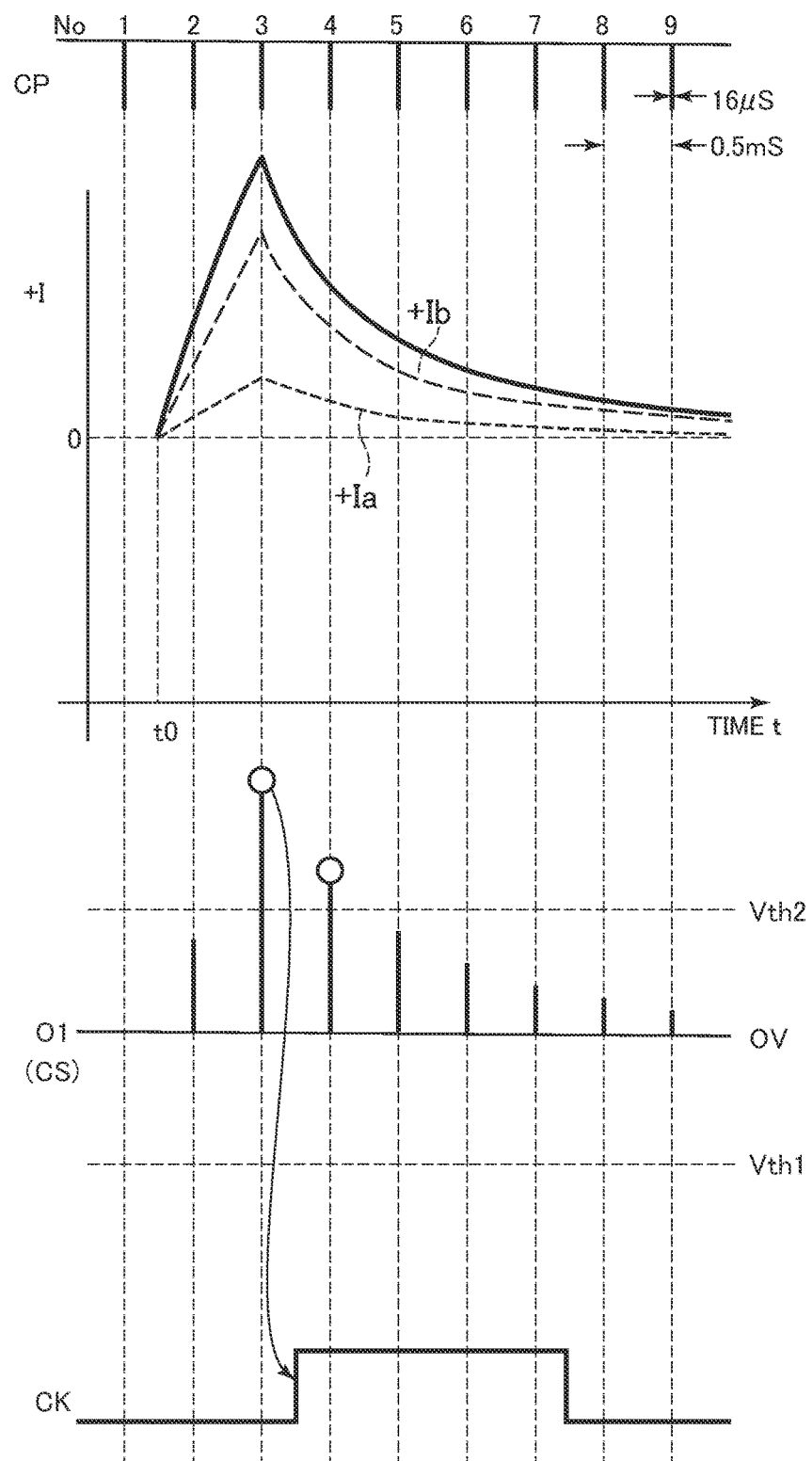
FIG. 38 is a timing chart for illustrating the operation of the detection circuit according to the fifth embodiment of the present invention.

FIG. 38 is an example of the detection operation of the detection circuit in the SW state 1. Similarly to FIG. 37, FIG. 38 represents the transition of a counter-electromotive current to be detected at the coil terminal O1 of the coil A through sampling based on the detection pulse CP. In this case, it is assumed that an impact is generated at the timing of the time t0, and thus the rotor 41 is rotated in the counterclockwise direction due to the impact. At this time, a small counter-electromotive current +Ia is generated in the coil A. Further, a large counter-electromotive current −Ib is generated in the coil B, but the counter-electromotive current generated in the coil B to be input to the coil terminal O1 has a reversed sign, and hence +I=+(Ia+Ib), which is a sum of the counter-electromotive current +Ia generated in the coil A and the reverse current +Ib of the counter-electromotive current in the coil B, is finally generated at the coil terminal O1. With this, at the coil terminal O1, a pulsed detection signal CS is generated in the positive direction at the timing of the detection pulse CP based on the magnitude of the counter-electromotive current +I.

Therefore, when the detection threshold value Vth2 is set to an appropriate positive value, similarly to the case of FIG. 37, the impact determination circuit 31 immediately outputs, to the control circuit 3, the impact signal CK at the timing of the detection pulse CP of No. 3 at which the impact determination circuit 31 can determine that the detection signal CS from the coil terminal O1 has exceeded the detection threshold value Vth2. Thus, the impact determination circuit 31 issues a notification that the rotor 41 has been rotated in the counterclockwise direction. The rotational direction of the rotor 41 can be determined based on which of the detection threshold value Vth1 and the detection threshold value Vth2 the detection signal CS has exceeded.

Further, description is given of the detection operation in the SW state 2, that is, in a case where the N-pole of the rotor 41 is at the stationary position of 180°. At this time, in the fifth embodiment, as shown in FIG. 36, the state of each transistor when the detection pulse CP arrives in the SW state 2 is completely the same as that in the case of the SW state 1. That is, the transistors N1, N2, P1, P2, N3, N4, P3, and P4 of the driver circuit 20 are all turned off, the transistors TP1 and TP2 of the detection circuit 30 are both turned on, and the analog switches SW2 and SW3 are both turned on. Therefore, the connection state in which the coil A and the coil B are connected in parallel is the same as that in the case of the SW state 1.

When an impact is generated during the detection section in the SW state 2, and thus the rotor 41 is rotated in the clockwise direction, the magnetic flux amount change of the coil A and the magnetic flux amount change of the coil B are $+3/2\varphi$ and $-\frac{1}{2}\varphi$, respectively. As a result, a large counter-electromotive current +Ia is generated in the coil A, and a small counter-electromotive current −Ib is generated in the coil B.

As a result, the current detected at the coil terminal O1 of the coil A is +I=+(Ia+Ib) whose waveform is substantially the same as that illustrated in FIG. 37. Therefore, in the SW state 2, the impact determination circuit 31 that has received the detection signal CS from the coil terminal O1 as input outputs the impact signal CK to the control circuit 3 when the impact determination circuit 31 determines that the detection signal CS from the coil terminal O1 has exceeded the threshold value Vth2. Thus, the impact determination circuit 31 issues a notification that the rotor 41 has been rotated in the clockwise direction.

Further, when an impact is generated during the detection section in the SW state 2, and thus the rotor 41 is rotated in the counterclockwise direction, the magnetic flux amount change of the coil A and the magnetic flux amount change of the coil B are $-\frac{1}{2}\varphi$ and $+3/2\varphi$, respectively. As a result, a small counter-electromotive current −Ia is generated in the coil A, and a large counter-electromotive current +Ib is generated in the coil B.

As a result, the current detected at the coil terminal O1 of the coil A is −I=−(Ia+Ib) whose waveform is substantially the same as that illustrated in FIG. 38. Therefore, in the SW state 2, the impact determination circuit 31 that has received the detection signal CS from the coil terminal O1 as input outputs the impact signal CK to the control circuit 3 when the impact determination circuit 31 determines that the detection signal CS from the coil terminal O1 has exceeded the threshold value Vth1. Thus, the impact determination circuit 31 issues a notification that the rotor 41 has been rotated in the counterclockwise direction.

Further, in the fifth embodiment described above, the coil A and the coil B are connected in parallel in a direction for forming a closed loop in which the magnetic flux φ generated by a current flowing in parallel through the coil A and the coil B connected in parallel passes through the first magnetic-pole portion 42a and the second magnetic-pole portion 42b of the stator 42 of the two-coil stepper motor 40. With this, at the terminal at the end of the coil A and the coil B connected in parallel, in this example, at the coil terminal O1, the counter-electromotive currents generated in the coil A and the coil B can be added for detection while being assumed to have the same sign. With this, the absolute value of the counter-electromotive current that is required to be detected is increased, and hence the detection sensitivity can be enhanced. The coil terminal O2 of the coil A may be used to detect the detection signal CS instead of the coil terminal O1 of the coil A. The detection signal CS can also be detected with use of the coil terminals O3 and O4 on the coil B side. Further, the transistors TP1 and TP2 and the detection resistors R1 and R2 may be provided on the coil B side instead of providing those transistors and detection resistors on the coil A side.

The rotation can be detected even when the coil A and the coil B are connected in parallel in a direction for not forming a closed loop in which the magnetic flux φ generated by a current flowing in parallel through the coil A and the coil B connected in parallel passes through the first magnetic-pole portion 42a and the second magnetic-pole portion 42b of the stator 42 of the two-coil stepper motor 40. This connection specifically corresponds to, in the case of the fifth embodiment, parallel connection obtained by short-circuit between the coil terminal O1 of the coil A and the coil terminal O4 of the coil B, or by short-circuit between the coil terminal O2 of the coil A and the coil terminal O3 of the coil B.

Figure 39:
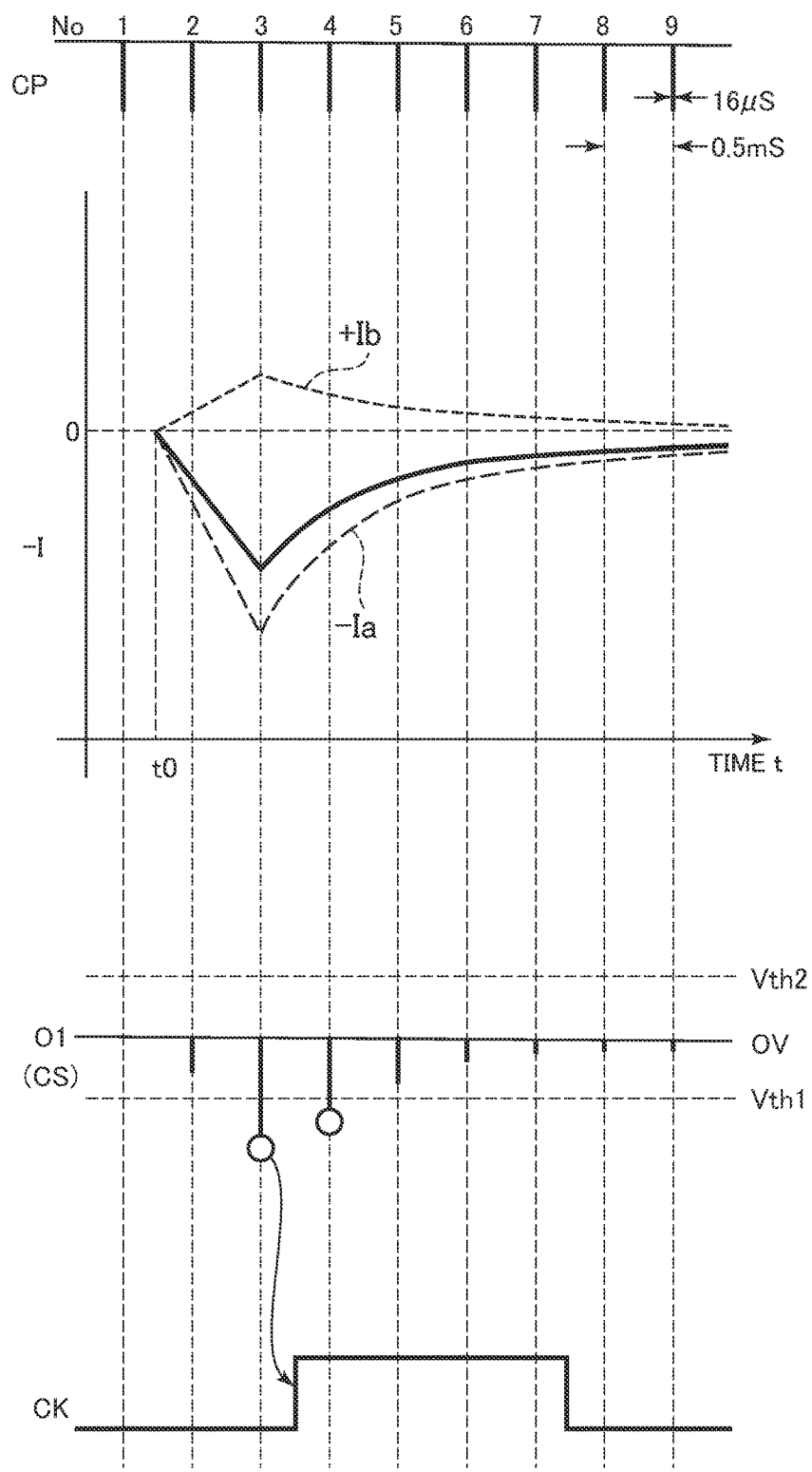
FIG. 39 is a timing chart for illustrating the operation of the detection circuit according to the fifth embodiment of the present invention.

There is now considered this case in the SW state 1, that is, when the rotor 41 is at the stationary position of 0°, and the rotor 41 is rotated in the clockwise direction due to an impact generated at the timing of the time t0. FIG. 39 is an example of the detection operation of the detection circuit in this case. Here, the coil terminal O2 of the coil A and the coil terminal O4 of the coil B are short-circuited by the analog switch SW2, and the coil terminal O1 of the coil A and the coil terminal O3 of the coil B are short-circuited by the analog switch SW3. The detection signal CS is detected at the coil terminal O1 of the coil A.

At this time, as described above, the magnetic flux amount change of the coil A and the magnetic flux amount change of the coil B are $-3/2\varphi$ and $+\frac{1}{2}\varphi$, respectively. As a result, in the coil A and the coil B, a large counter-electromotive current $-Ia$ is generated in the coil A, and a small counter-electromotive current $+Ib$ is generated in the coil B based on the amount of change in magnetic flux.

As a result, the counter-electromotive current detected at the coil terminal O1 is $-I=-(Ia-Ib)$, which is a sum of the counter-electromotive current generated in the coil A and the counter-electromotive current generated in the coil B. Therefore, the absolute value of the detection signal CS detected at the coil terminal O1 is smaller than that in the case where only the counter-electromotive current $-Ia$ generated in the coil A is detected. Therefore, when the impact determination circuit 31 determines the rotation of the rotor 41, the detection threshold value Vth1 is required to be set to an appropriate negative value having a small absolute value. The detection threshold value Vth2 for detecting the rotation of the rotor 41 in the counterclockwise direction is similarly required to be set to an appropriate positive value having a small absolute value.

In view of the above, when the coil A and the coil B are connected in parallel in a direction for not forming a closed loop in which the magnetic flux φ generated by a current flowing in parallel through the coil A and the coil B connected in parallel passes through the first magnetic-pole portion 42a and the second magnetic-pole portion 42b of the stator 42 of the two-coil stepper motor 40, the absolute value of the detection signal to be detected at the terminal at the end of the coil A and the coil B connected in parallel is decreased, and hence the detection sensitivity is degraded. However, such parallel connection does not entirely prevent the rotation of the rotor 41 from being detected.

Further, the operation of the fifth embodiment is similar to that of the first embodiment described with reference to FIG. 12 and FIG. 13, and hence description thereof is omitted herein.

The configuration diagram of the drive circuit, the configuration of the stepper motor, the flow chart, the timing chart, and the like represented in each embodiment of the present invention are not limited to those described above, and can be changed as appropriate as long as the gist of the present invention is satisfied. Further, the drive circuit for a two-coil stepper motor of the present invention is not limited to use in an electronic clock, and may be widely used as a drive circuit for an apparatus including the stepper motor that is susceptible to an impact.

The invention claimed is:

1. A drive circuit for a two-coil stepper motor, comprising:
   a rotor that is magnetized into at least two poles in a radial direction of the rotor;
   a first stator magnetic-pole portion and a second stator magnetic-pole portion, which are formed to be substantially opposed to each other through intermediation of the rotor;
   a third stator magnetic-pole portion formed between the first stator magnetic-pole portion and the second stator magnetic-pole portion so as to face the rotor;
   a first coil to be magnetically coupled to the first stator magnetic-pole portion and the third stator magnetic-pole portion;
   a second coil to be magnetically coupled to the second stator magnetic-pole portion and the third stator magnetic-pole portion;
   a drive pulse generation circuit configured to output a drive pulse for driving the first coil and the second coil;
   a detection pulse generation circuit configured to output a detection pulse to at least one of the first coil or the second coil in order to detect a counter-electromotive current generated in at least one of the first coil or the second coil along with a movement of the rotor after the rotor is driven based on the drive pulse; and
   a detection circuit configured to receive a detection signal generated based on the detection pulse as input, to thereby detect the movement of the rotor;
   where the detection pulse generation circuit is configured to output the detection pulse to any one of the first coil and the Second coil, or both of the first coil and the second coil.

2. The drive circuit for a two-coil stepper motor according to claim 1, wherein the detection pulse generation circuit is configured to output the detection pulse to the first coil and output the detection pulse to the second coil independently and simultaneously.

3. The drive circuit for a two-coil stepper motor according to claim 1, wherein the detection pulse generation circuit is configured to output the detection pulse to both ends of the first coil and the second coil connected in series or in parallel.

4. The drive circuit for a two-coil stepper motor according to claim 1, further comprising a lock pulse generation circuit configured to output a lock pulse for braking the rotor, wherein, when the detection circuit detects output of the detection signal, the lock pulse generation circuit outputs the lock pulse.

5. The drive circuit for a two-coil stepper motor according to claim 1, further comprising a lock pulse generation circuit configured to output a lock pulse for braking the rotor,
wherein, when the detection circuit detects output of the detection signal, the lock pulse generation circuit outputs the lock pulse.

6. The drive circuit for a two-coil stepper motor according to claim 1, further comprising a lock pulse generation circuit configured to output a lock pulse for braking the rotor,
wherein, when the detection circuit detects output of the detection signal, the lock pulse generation circuit outputs the lock pulse.

7. The drive circuit for a two-coil stepper motor according to claim 1, wherein the detection circuit comprises switching means for switching a detection direction of the counter-electromotive current generated in the first coil and the second coil in accordance with a stationary position of the rotor of the two-coil stepper motor.

8. The drive circuit for a two-coil stepper motor according to claim 2, further comprising a lock pulse generation circuit configured to output a lock pulse for braking the rotor,
wherein, when the detection circuit detects output of the detection signal, the lock pulse generation circuit outputs the lock pulse.

9. The drive circuit for a two-coil stepper motor according to claim 3, wherein, when the detection pulse generation circuit outputs the detection pulse, the first coil and the second coil are connected in series in a direction for forming a closed loop in which a magnetic flux generated by a current flowing in series through the first coil and the second coil passes through the first stator magnetic-pole portion and the second stator magnetic-pole portion.

10. The drive circuit for a two-coil stepper motor according to claim 3, wherein, when the detection pulse generation circuit outputs the detection pulse, the first coil and the second coil are connected in parallel in a direction for forming a closed loop in which a magnetic flux generated by a current flowing in parallel through the first coil and the second coil passes through the first stator magnetic-pole portion and the second stator magnetic-pole portion.

11. The drive circuit for a two-coil stepper motor according to claim 3, further comprising a lock pulse generation circuit configured to output a lock pulse for braking the rotor,
wherein, when the detection circuit detects output of the detection signal, the lock pulse generation circuit outputs the lock pulse.

12. The drive circuit for a two-coil stepper motor according to claim 4,
wherein the drive pulse comprises a plurality of small drive pulses, and
wherein the lock pulse has the same combination of voltages applied on both terminals of the first and second coils as such combination in the last applied small drive pulse among the small drive pulses which construct the drive pulse.

13. The drive circuit for a two-coil stepper motor according to claim 4,
wherein the lock pulse comprises a first lock pulse and a second lock pulse, and
wherein, in any one of the first coil and the second coil, the first lock pulse and the second lock pulse are used to cause a current to flow through the one of the first coil and the second coil in different voltage polarities.

14. The drive circuit for a two-coil stepper motor according to claim 9, further comprising a lock pulse generation circuit configured to output a lock pulse for braking the rotor,
wherein, when the detection circuit detects output of the detection signal, the lock pulse generation circuit outputs the lock pulse.

15. The drive circuit for a two-coil stepper motor according to claim 10, further comprising a lock pulse generation circuit configured to output a lock pulse for braking the rotor,
wherein, when the detection circuit detects output of the detection signal, the lock pulse generation circuit outputs the lock pulse.

16. The drive circuit for a two-coil stepper motor according to claim 13, wherein the second lock pulse has the same combination of voltages applied on both terminals of the first and second coils as such combination in the last applied small drive pulse among the small drive pulses which construct the drive pulse.

\* \* \* \* \*